(12) United States Patent
Fujita et al.

(10) Patent No.: US 10,070,006 B2
(45) Date of Patent: Sep. 4, 2018

(54) IMAGE PROCESSING APPARATUS AND IMAGE PROCESSING METHOD

(71) Applicants: Hayato Fujita, Kanagawa (JP); Muneaki Iwata, Kanagawa (JP)

(72) Inventors: Hayato Fujita, Kanagawa (JP); Muneaki Iwata, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 15/493,300

(22) Filed: Apr. 21, 2017

(65) Prior Publication Data

US 2017/0339308 A1 Nov. 23, 2017

(30) Foreign Application Priority Data

May 17, 2016 (JP) ................. 2016-099010

(51) Int. Cl.
| | | |
|---|---|---|
| *G06F 15/00* | (2006.01) | |
| *H04N 1/40* | (2006.01) | |
| *H04N 1/29* | (2006.01) | |
| *H04N 1/409* | (2006.01) | |
| *G03G 15/043* | (2006.01) | |

(52) U.S. Cl.
CPC ....... *H04N 1/40068* (2013.01); *G03G 15/043* (2013.01); *H04N 1/29* (2013.01); *H04N 1/4092* (2013.01); *H04N 2201/0094* (2013.01)

(58) Field of Classification Search
CPC .... H04N 1/40068; H04N 1/29; H04N 1/4092; H04N 2201/0094; G03G 15/043
USPC .......................................................... 358/1.2
See application file for complete search history.

(56) References Cited

U.S. PATENT DOCUMENTS

| | | | | |
|---|---|---|---|---|
| 6,289,137 B1* | 9/2001 | Sugiyama | ............... | G06T 5/009 358/451 |
| 6,804,417 B1* | 10/2004 | Lund | ...................... | G06K 15/02 382/254 |
| 2012/0099165 A1 | 4/2012 | Omori et al. | | |
| 2012/0189328 A1 | 7/2012 | Suzuki et al. | | |
| 2014/0139603 A1 | 5/2014 | Fujita et al. | | |
| 2014/0176656 A1 | 6/2014 | Omori et al. | | |
| 2014/0333941 A1 | 11/2014 | Iwata et al. | | |
| 2014/0347708 A1 | 11/2014 | Omori et al. | | |

(Continued)

FOREIGN PATENT DOCUMENTS

| | | |
|---|---|---|
| JP | 2005-039802 | 2/2005 |
| JP | 2010-021898 | 1/2010 |
| JP | 2016-021664 | 2/2016 |

*Primary Examiner* — Saeid Ebrahimi Dehkordy
(74) *Attorney, Agent, or Firm* — Harness, Dickey & Pierce, P.L.C.

(57) ABSTRACT

An image processing apparatus includes: a first inverter to output binary image data having first resolution, as image data having pixel values that are inverted or image data having unprocessed pixel values, in accordance with an inversion signal; a thinning processor to convert the image data output from the first inverter from the first resolution to second resolution and perform a thinning process of thinning pixels of edge portions of the image data in units of the second resolution; and a second inverter to output the image data having the second resolution for which the thinning process is performed, as image data having pixel values that are inverted or image data having unprocessed pixel values, in accordance with the inversion signal.

20 Claims, 41 Drawing Sheets

(56) References Cited

U.S. PATENT DOCUMENTS

| | | |
|---|---|---|
| 2015/0125171 A1 | 5/2015 | Iwata et al. |
| 2015/0156373 A1 | 6/2015 | Fujita et al. |
| 2015/0180200 A1 | 6/2015 | Fujita et al. |
| 2015/0251442 A1 | 9/2015 | Ishida et al. |
| 2015/0324671 A1 | 11/2015 | Iwata et al. |
| 2015/0350491 A1 | 12/2015 | Iwata et al. |
| 2016/0012322 A1 | 1/2016 | Iwata et al. |
| 2016/0147171 A1 | 5/2016 | Ishida et al. |
| 2016/0234399 A1 | 8/2016 | Omori et al. |
| 2016/0247050 A1 | 8/2016 | Fujita et al. |
| 2016/0274521 A1 | 9/2016 | Iwata et al. |
| 2017/0017177 A1 | 1/2017 | Iwata et al. |

* cited by examiner

FIG. 14
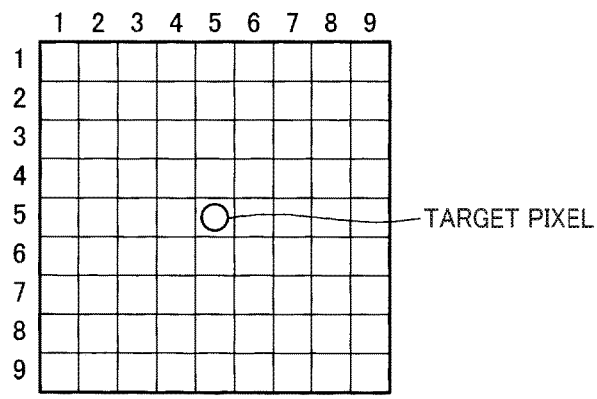
FIG. 15A                FIG. 15B
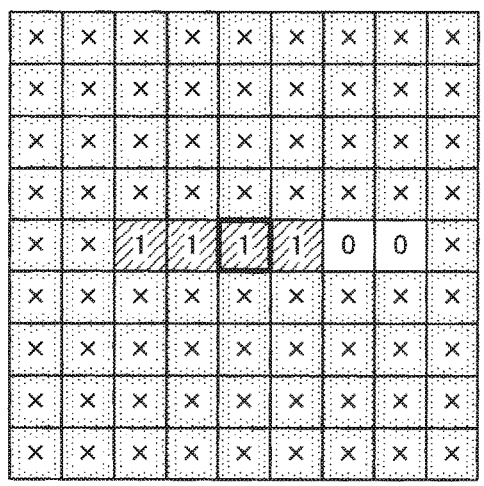    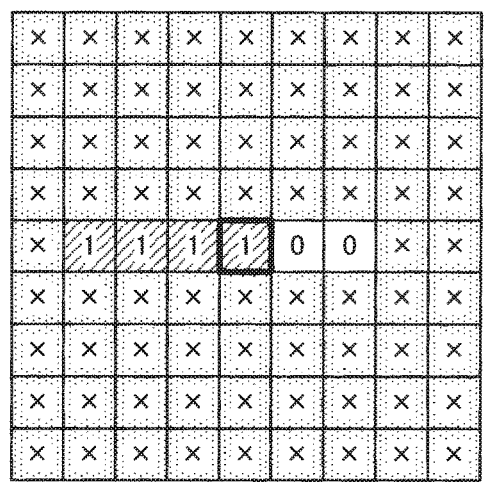

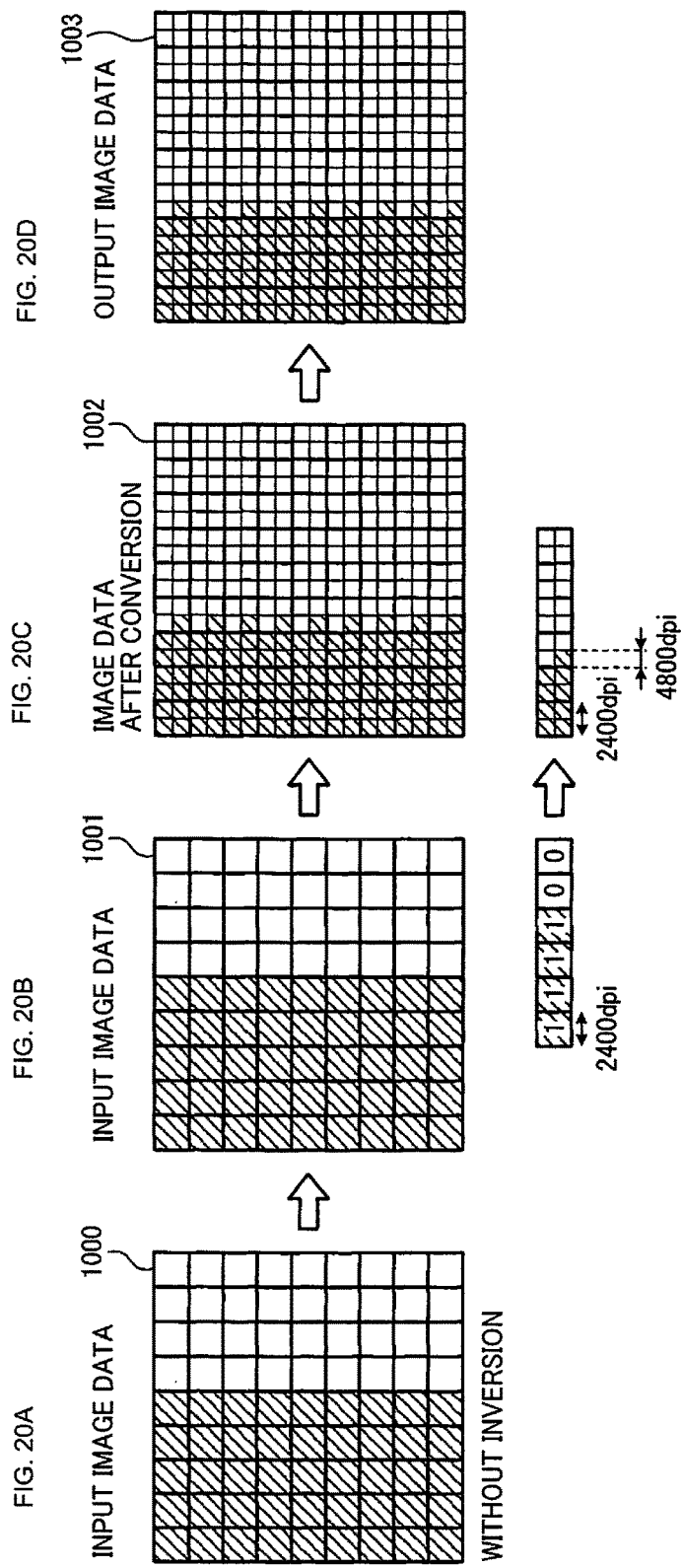

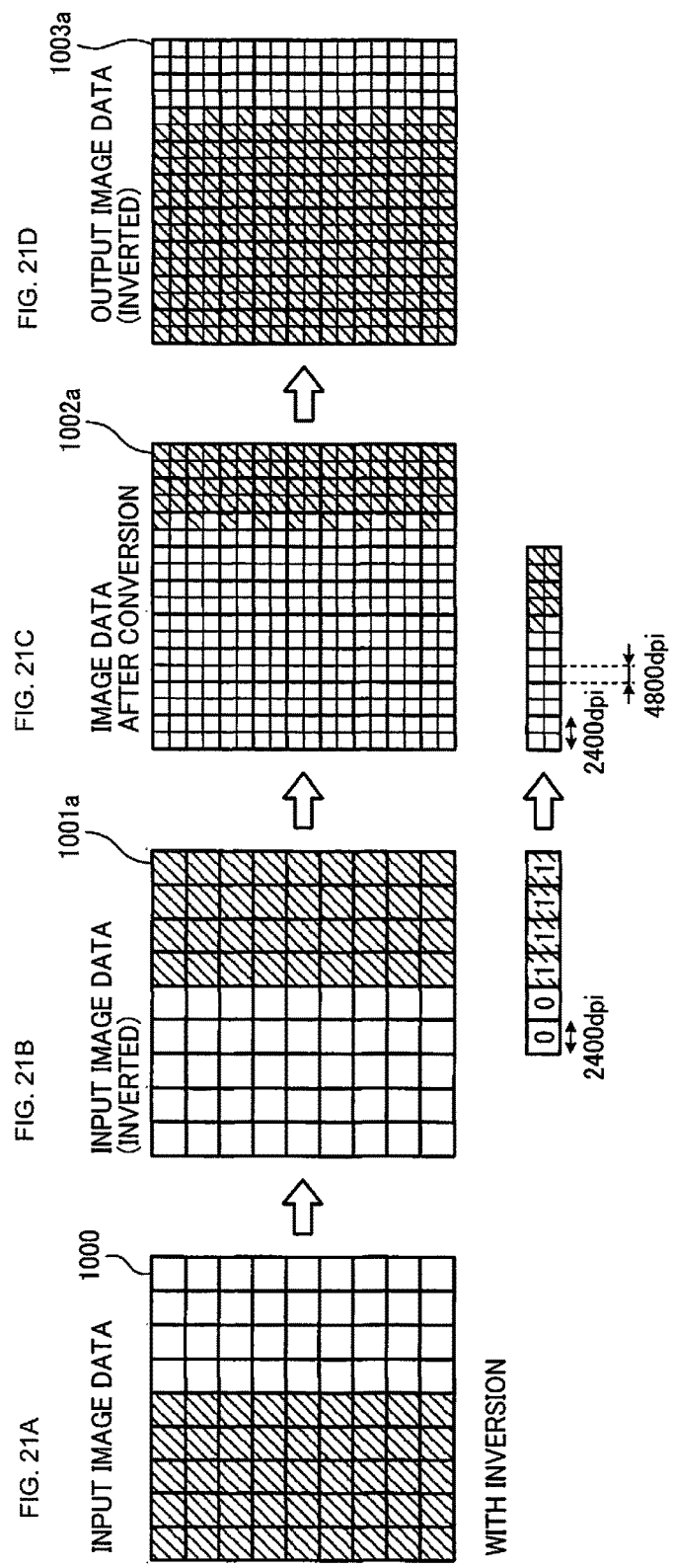

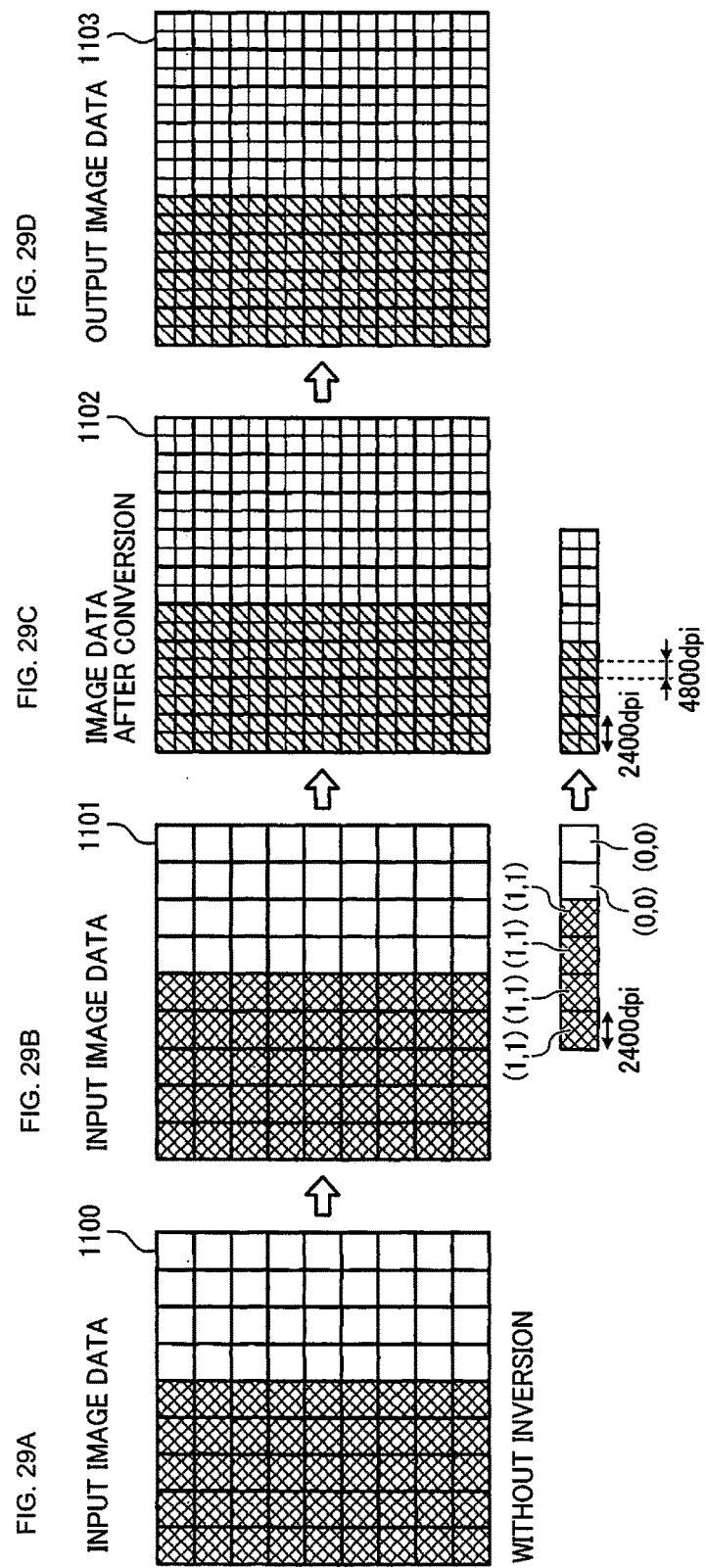

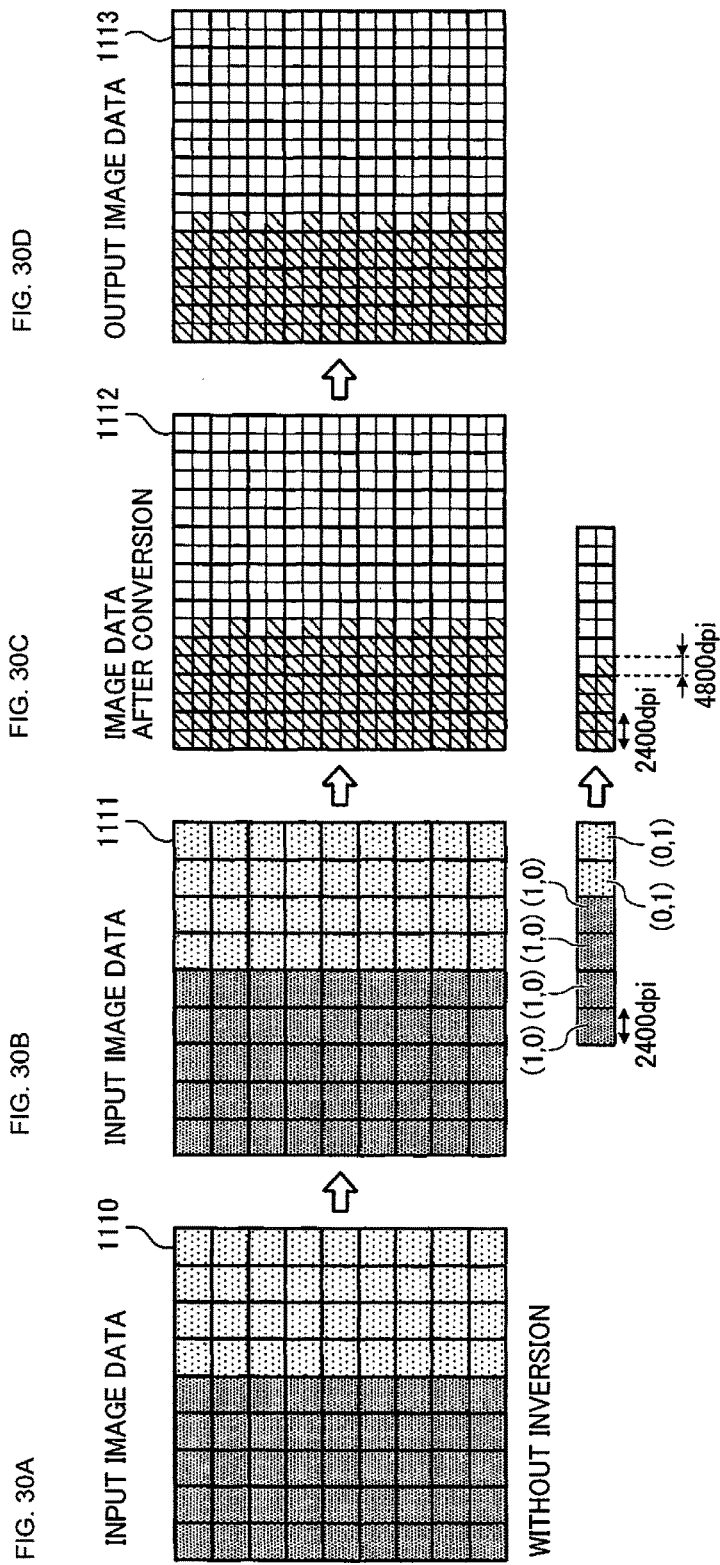

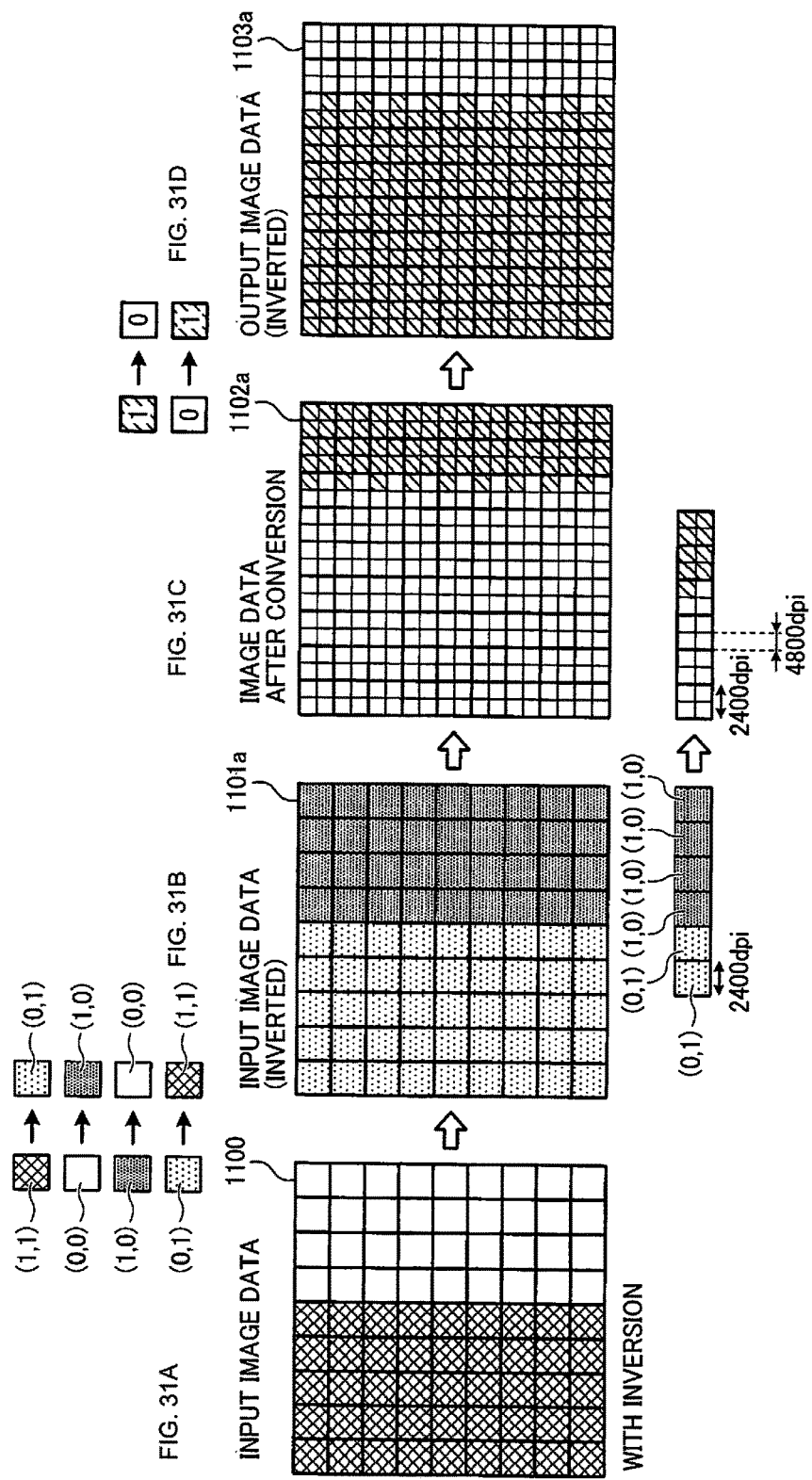

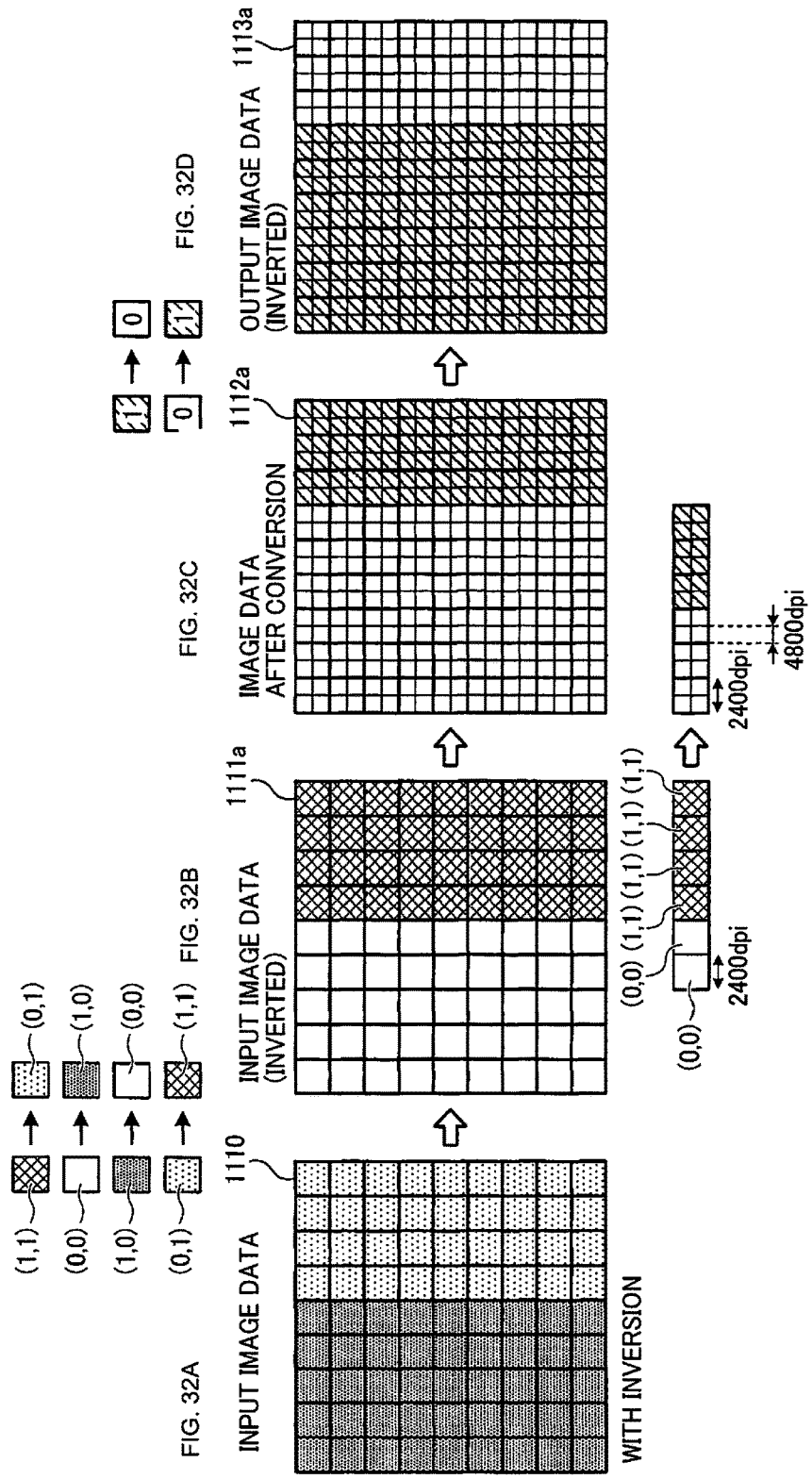

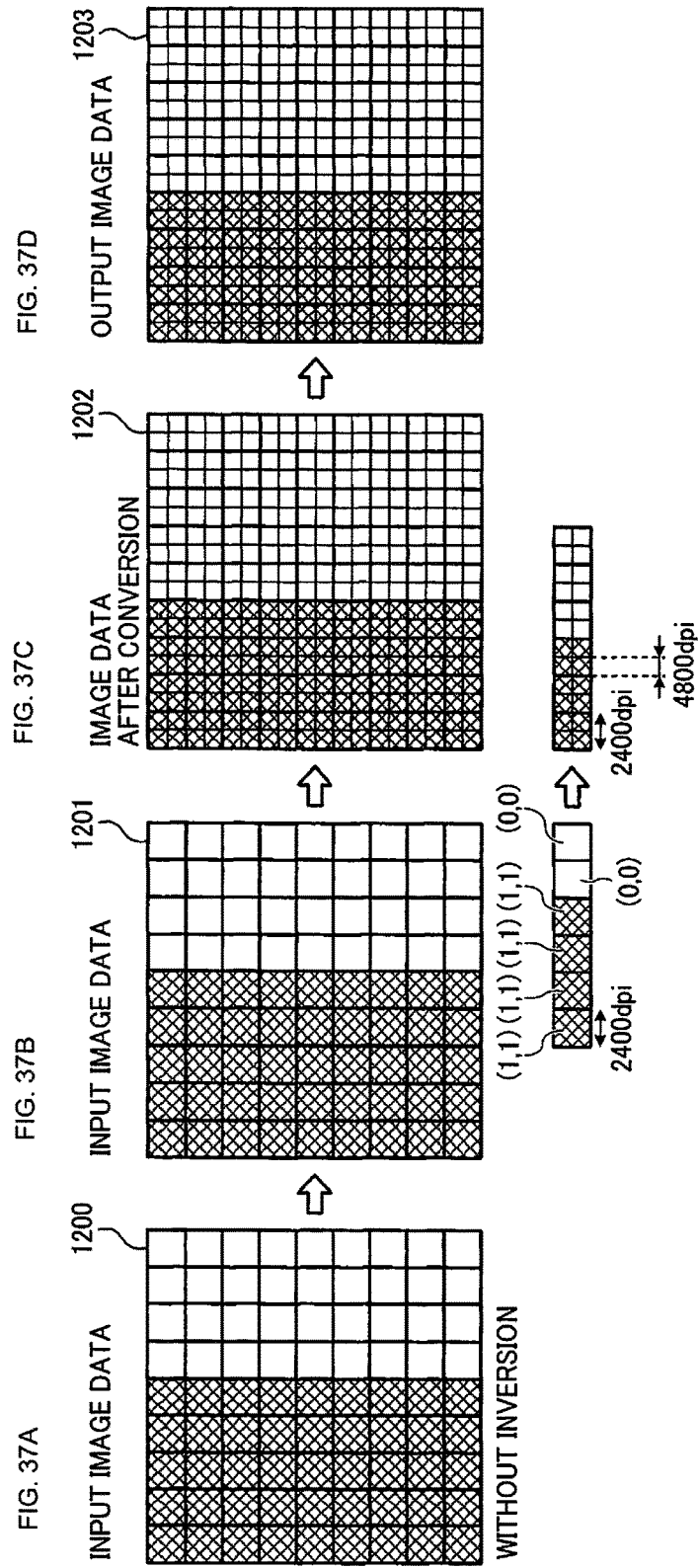

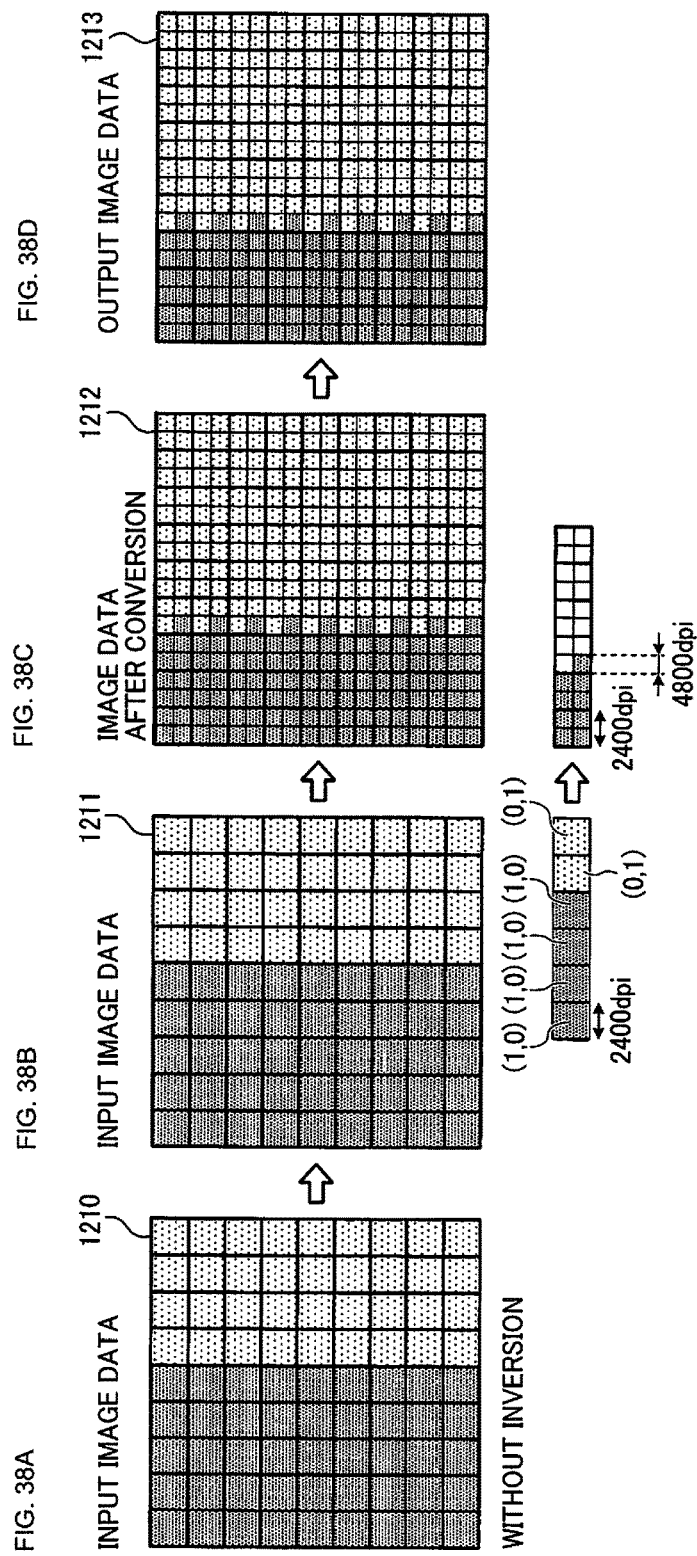

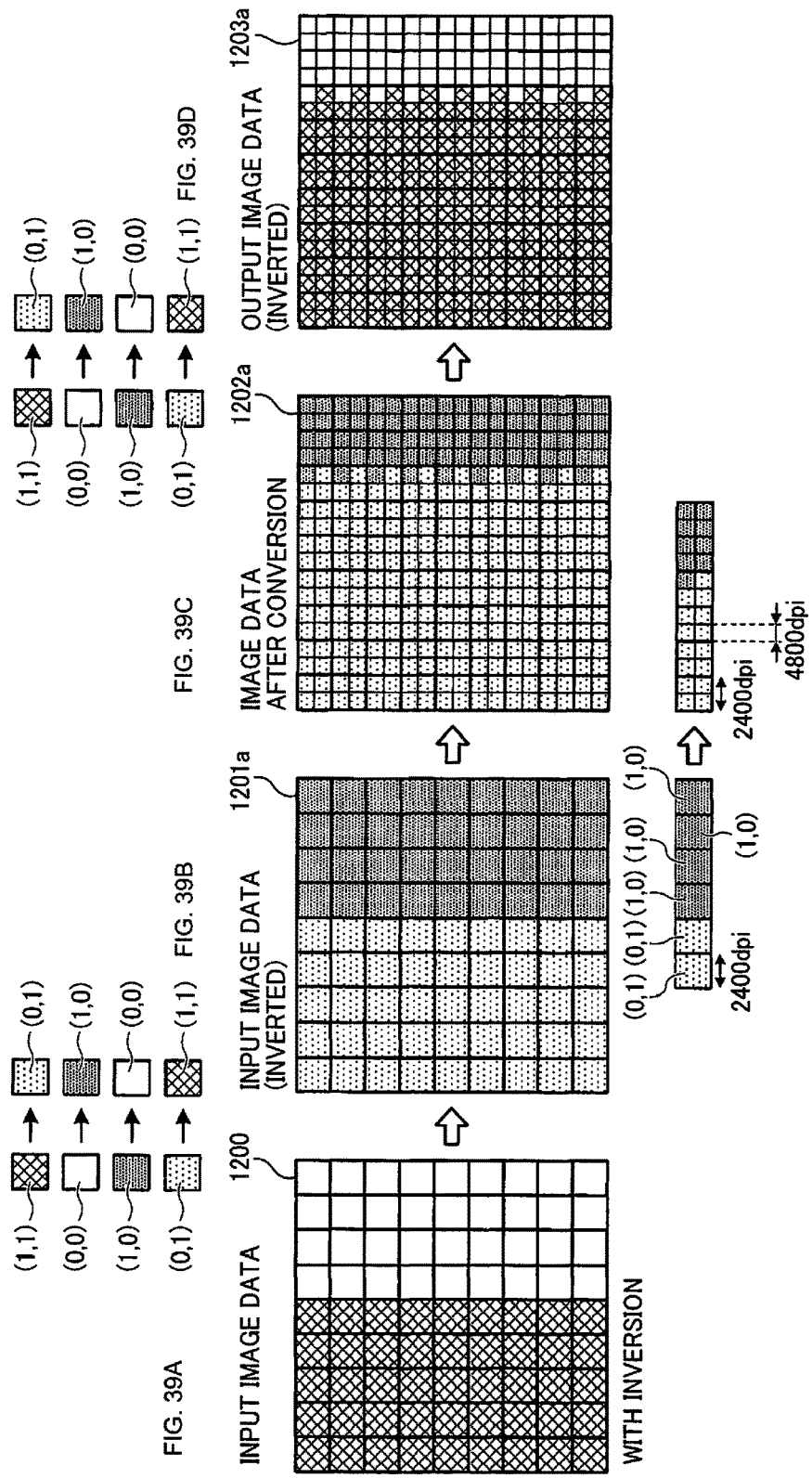

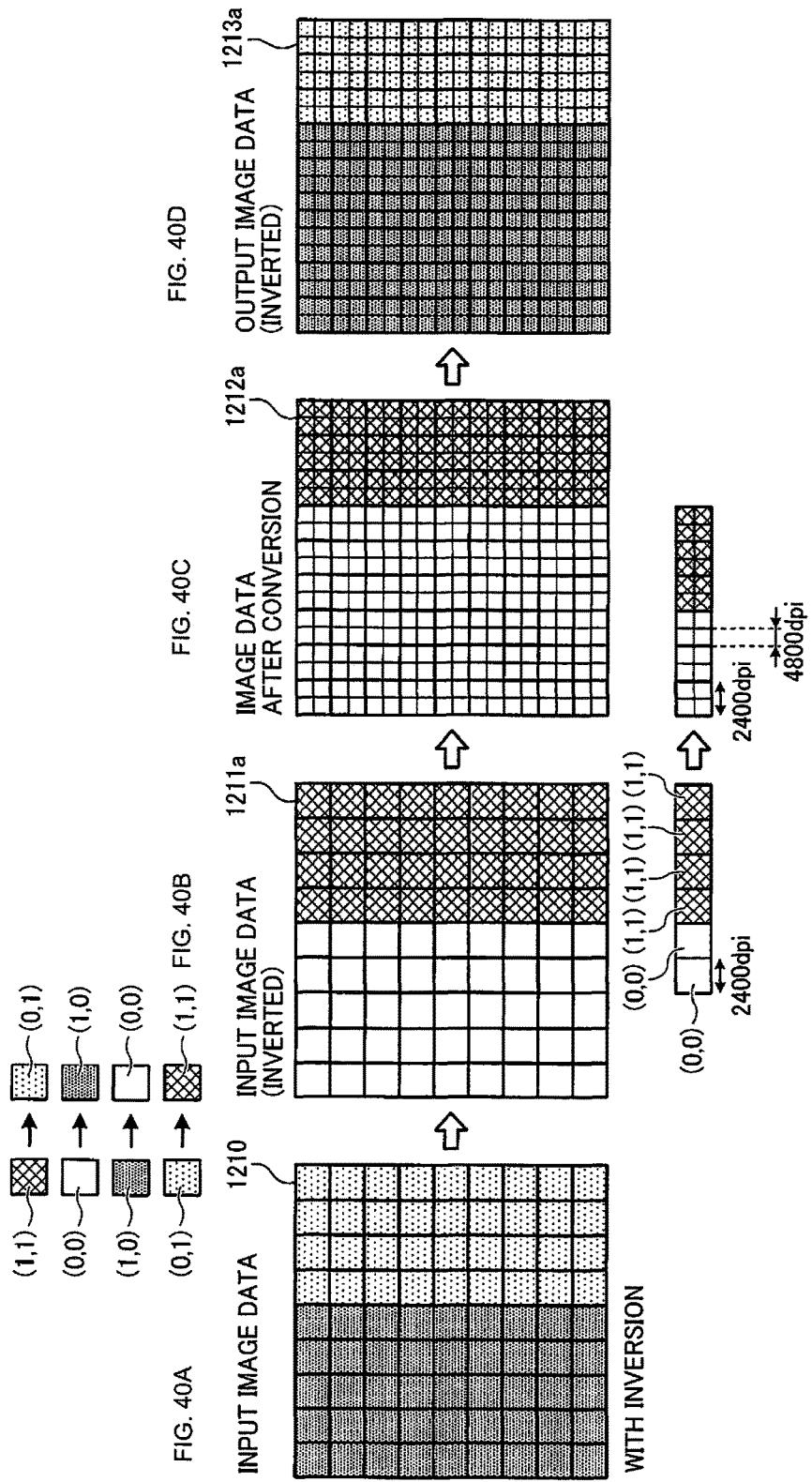

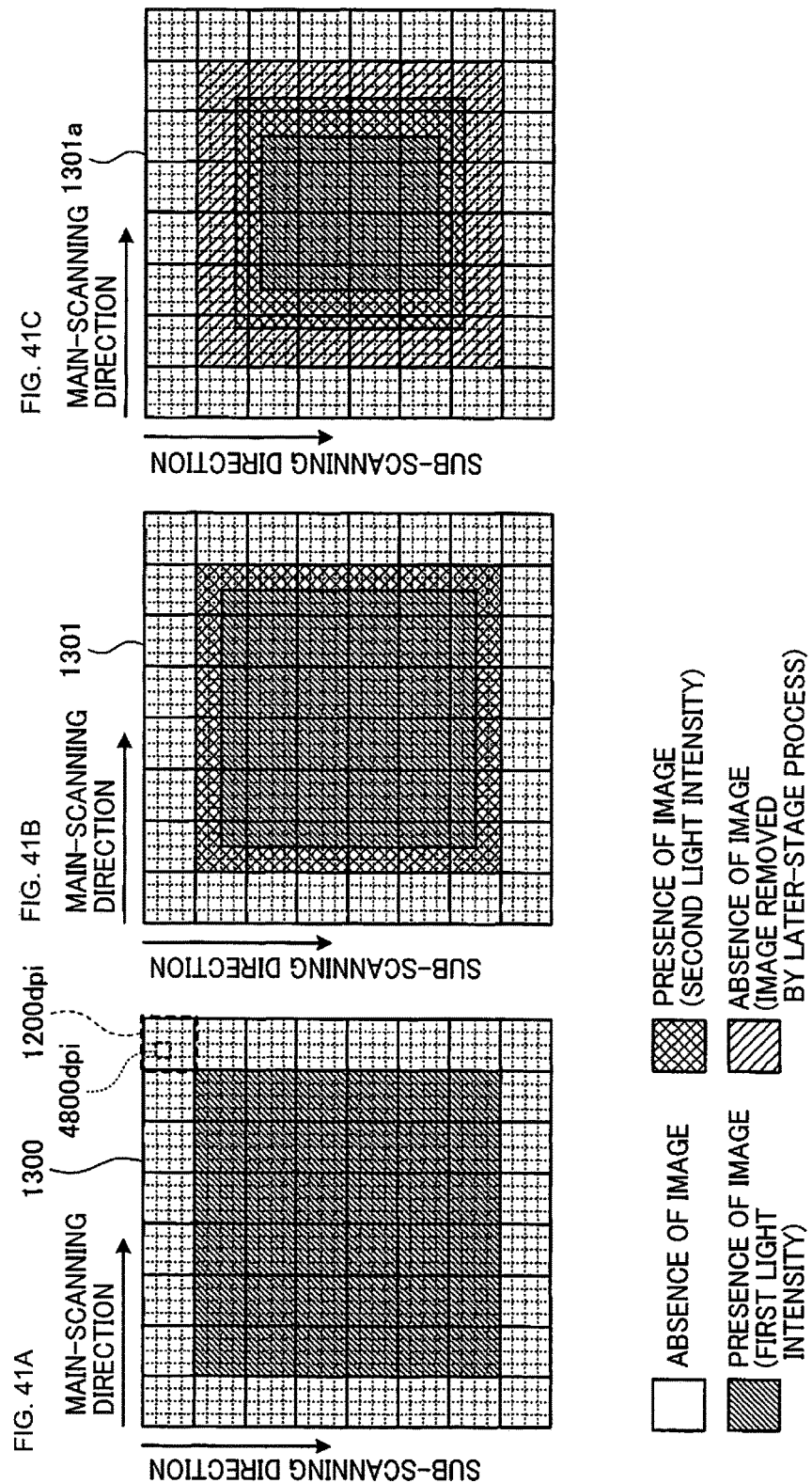

INPUT IMAGE DATA

OUTPUT IMAGE DATA

INPUT IMAGE DATA
WITHOUT INVERSION

IMAGE DATA AFTER CONVERSION

INPUT IMAGE DATA (INVERTED) 1401a

OUTPUT IMAGE DATA (INVERTED) 1403a

INPUT IMAGE DATA 1400
WITH INVERSION

IMAGE DATA AFTER CONVERSION 1402a

IMAGE PROCESSING APPARATUS AND IMAGE PROCESSING METHOD

CROSS-REFERENCE TO RELATED APPLICATIONS

This patent application is based on and claims priority pursuant to 35 U.S.C. § 119A to Japanese Patent Application No. 2016-099010, filed on May 17, 2016, in the Japan Patent Office, the entire disclosure of which is hereby incorporated by reference herein.

BACKGROUND

Technical Field

The present invention relates to an image processing apparatus and an image processing method.

Description of the Related Art

In an electrophotographic process, the improvement of reproducibility of thin lines and the improvement of reproducibility of characters are requested, and an image processing method performing a thinning process and smoothing processing of black characters and black lines by using pattern matching is already known. However, in the case of an alternating current (AC) developing system, a high VL control (bare skin electric potential control) system, or the like, the amount of attachment of toner is decreased, and blurs of black lines and black characters remarkably occur. However, in a conventional image processing method, only a function for a thinning process of black characters and black lines is included, and there is a disadvantage in that a countermeasure for the degradation of the reproducibility of thin lines and the reproducibility of characters cannot be made.

SUMMARY

Example embodiments of the present invention include an image processing apparatus, which includes: a first inverter to output binary image data having first resolution, as image data having pixel values that are inverted or image data having unprocessed pixel values, in accordance with an inversion signal; a thinning processor to convert the image data output from the first inverter from the first resolution to second resolution and perform a thinning process of thinning pixels of edge portions of the image data in units of the second resolution; and a second inverter to output the image data having the second resolution for which the thinning process is performed, as image data having pixel values that are inverted or image data having unprocessed pixel values, in accordance with the inversion signal.

Example embodiments of the present invention include an apparatus including the image processing apparatus, which may be implemented by a drive control apparatus, a light source control apparatus, and an image forming apparatus.

Example embodiments of the present invention include an image processing method performed by the image processing apparatus.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 14 is a diagram that illustrates an example of an image matrix according to the first embodiment;

FIGS. 15A and 15B are diagrams that illustrate examples of a pattern used for a pattern matching process according to the first embodiment;

FIGS. 20A to 20D are diagrams that illustrate an example of the operation of image processing (without inversion) of the high-resolution processor according to the first embodiment;

FIGS. 21A to 21D are diagrams that illustrate an example of the operation of image processing (with inversion) of the high-resolution processor according to the first embodiment;

FIGS. 29A to 29D are diagrams that illustrate an example of the operation of image processing (without inversion) of the high-resolution processor according to the second embodiment;

FIGS. 30A to 30D are diagrams that illustrate an example of the operation of image processing (without inversion) of the high-resolution processor according to the second embodiment;

FIGS. 31A to 31D are diagrams that illustrate an example of the operation of image processing (with inversion) of the high-resolution processor according to the second embodiment;

FIGS. 32A to 32D are diagrams that illustrate an example of the operation of image processing (with inversion) of the high-resolution processor according to the second embodiment;

FIGS. 37A to 37D are diagrams that illustrate an example of the operation of image processing (without inversion) of a high-resolution processor according to the third embodiment;

FIGS. 38A to 38D are diagrams that illustrate an example of the operation of image processing (without inversion) of the high-resolution processor according to the third embodiment;

FIGS. 39A to 39D are diagrams that illustrate an example of the operation of image processing (with inversion) of the high-resolution processor according to the third embodiment;

FIGS. 40A to 40D are diagrams that illustrate an example of the operation of image processing (with inversion) of the high-resolution processor according to the third embodiment;

FIGS. 41A to 41C are diagrams that illustrate an example of the operation of image processing of a later-stage image processor of a modulated signal generator according to the third embodiment;

FIGS. 44A to 44C are diagrams that illustrate an example of a pattern used for a pattern matching process according to the fourth embodiment;

Figure 1:
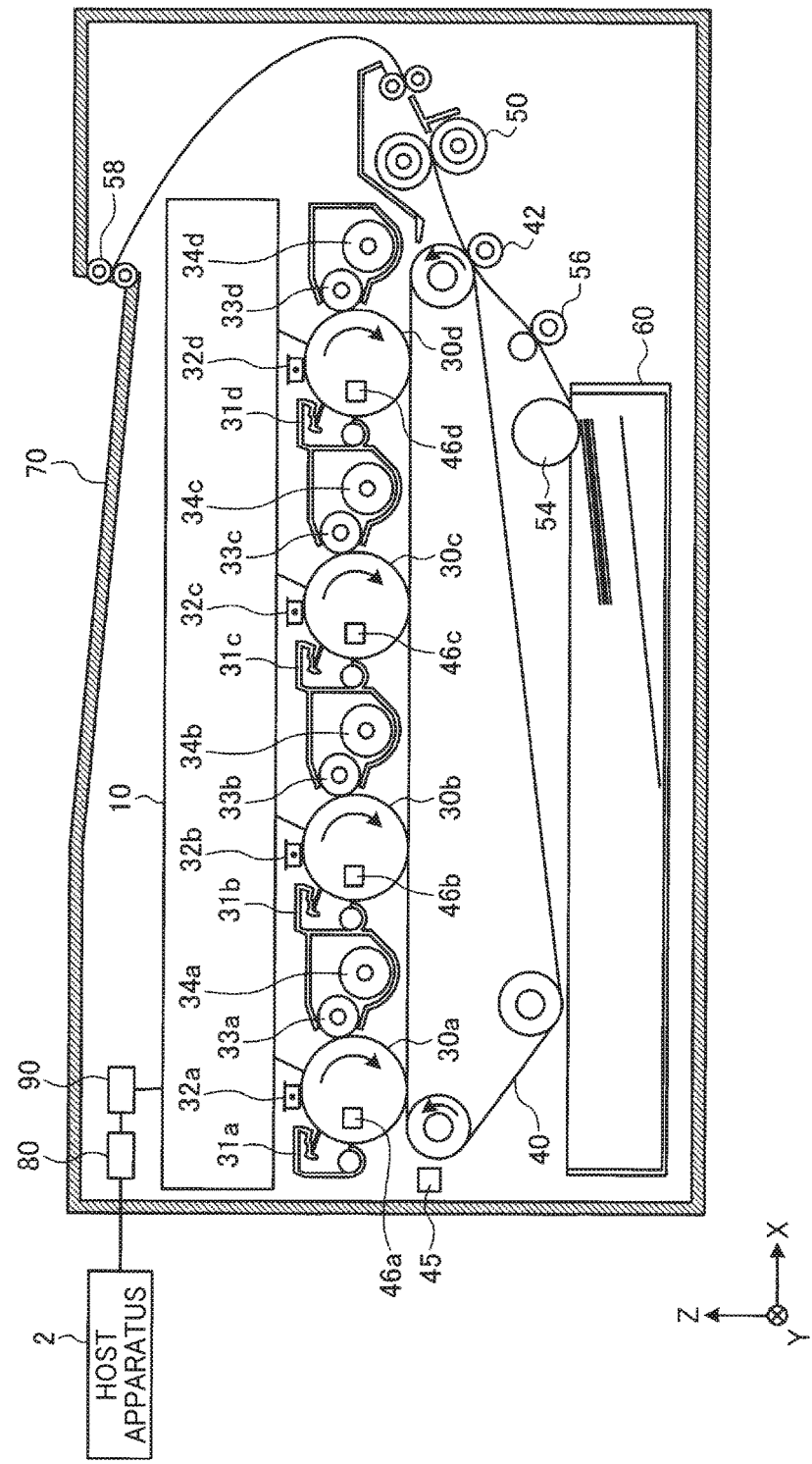
FIG. 1 is a diagram that illustrates a schematic configuration of an image forming apparatus according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, an image processing apparatus, a drive control apparatus, a light source control apparatus, an image forming apparatus, and an image processing method according to embodiments of the present invention will be described with reference to FIGS. 1 to 48D. The present invention is not limited to the following embodiments, and in each constituent element of the following embodiments, an element that can be easily acquired by a person skilled in the art, a substantially same element, and an element in a so-called equivalent range are included. In addition, various omissions, substitutions, changes, and combinations of constituent elements in a range not departing from the concepts of the following embodiments may be performed.

In addition, in the following embodiments, as an image forming apparatus according to the present invention, a multifunction peripheral (MFP) having at least two functions among a copy function, a printer function, a scanner function, and a facsimile function may be applied, and an image forming apparatus such as a copier or a printer other than that may be applied as well.

First Embodiment (Schematic Configuration of Image Forming Apparatus)

FIG. 1 is a diagram that illustrates a schematic configuration of an image forming apparatus according to a first embodiment. The schematic configuration of an image forming apparatus 1 according to this embodiment will be described with reference to FIG. 1.

The image forming apparatus 1 illustrated in FIG. 1 is an apparatus that forms a printed matter by transferring toner to a recording sheet (target object). The image forming apparatus 1 is an apparatus of a tandem system that forms a full-color image by superimposing four colors (cyan, magenta, yellow, and black).

As illustrated in FIG. 1, the image forming apparatus 1 includes: a light scanning apparatus 10 (i.e., a latent image forming device); four photoconductor drums 30a, 30b, 30c, and 30d; four cleaning units 31a, 31b, 31c, and 31d; four charging devices 32a, 32b, 32c, and 32d; four developing rollers 33a, 33b, 33c, and 33d; and four toner cartridges 34a, 34b, 34c, and 34d. In addition, as illustrated in FIG. 1, the image forming apparatus 1 includes: a transfer belt 40; a transfer roller 42; a density detector 45; four home position sensors 46a, 46b, 46c, and 46d; a fixing roller 50; a sheet feeding roller 54; a registration roller pair 56; a sheet ejecting roller 58; a sheet feeding tray 60; a sheet ejecting tray 70; a communication control device 80; and a printer control device 90.

The photoconductor drum 30a, the cleaning unit 31a, the charging device 32a, the developing roller 33a, and the toner cartridge 34a are used as one set. These configure an image forming station (also referred to as a K station) that forms a black image.

The photoconductor drum 30b, the cleaning unit 31b, the charging device 32b, the developing roller 33b, and the toner cartridge 34b are used as one set. These configure an image forming station (also referred to as a C station) that forms a cyan image.

The photoconductor drum 30c, the cleaning unit 31c, the charging device 32c, the developing roller 33c, and the toner cartridge 34c are used as one set. These configure an image forming station (also referred to as an M station) that forms a magenta image.

The photoconductor drum 30d, the cleaning unit 31d, the charging device 32d, the developing roller 33d, and the toner cartridge 34d are used as one set. These configure an image forming station (also referred to as a Y station) that forms a yellow image.

In a case where an arbitrary photoconductor drum among the photoconductor drums 30a, 30b, 30c, and 30d is to be represented or in a case where the photoconductor drums are collectively referred to, it may be simply referred to as a "photoconductor drum 30". In addition, in a case where an arbitrary cleaning unit among the cleaning units 31a, 31b, 31c, and 31d is to be represented or in a case where the cleaning units are collectively referred to, it may be simply referred to as a "cleaning unit 31". Furthermore, in a case where an arbitrary charging device among the charging devices 32a, 32b, 32c, and 32d is to be represented or in a case where the charging devices are collectively referred to, it may be simply referred to as a "charging device 32". In addition, in a case where an arbitrary developing roller among the developing rollers 33a, 33b, 33c, and 33d is to be represented or in a case where the developing rollers are collectively referred to, it may be simply referred to as a "developing roller 33". Furthermore, in a case where an arbitrary toner cartridge among the toner cartridges 34a, 34b, 34c, and 34d is to be represented or in a case where the toner cartridges are collectively referred to, it may be simply referred to as a "toner cartridge 34". In addition, in a case where an arbitrary home position sensor among the home position sensors 46a, 46b, 46c, and 46d is to be represented or in a case where the home position sensors are collectively referred to, it may be simply referred to as a "home position sensor 46".

The light scanning apparatus 10 is an optical apparatus that emits light (laser) modulated for each color based on image data (cyan image data, magenta image data, yellow image data, and black image data) onto the surface of a corresponding charged photoconductor drum 30. Accordingly, on the surface of each photoconductor drum 30, electric charge is lost only in a portion to which light is emitted, and a latent image corresponding to the image data is formed on the surface of each photoconductor drum 30. The latent image formed on the surface of each photoconductor drum 30 is moved in a direction of a corresponding developing roller 33 in accordance with the rotation of the photoconductor drum 30. The configuration of the light scanning apparatus 10 will be described later in detail.

The photoconductor drum 30 is an example of a latent image bearer and has a photoconductive layer formed on the surface thereof. In other words, the surface of the photoconductor drum 30 is a scanning target face. The photoconductor drums 30a, 30b, 30c, and 30d, for example, are arranged to be aligned to have a parallel rotation axis and rotate in a same direction (for example, the direction of an arrow illustrated in FIG. 1).

Here, in an orthogonal coordinate system of three dimensions of XYZ, a direction parallel to the center axis of each photoconductor drum 30 will be described as a Y-axis direction, and a direction along a direction in which the photoconductor drums 30 are arranged will be described as an X-axis direction.

The cleaning unit 31 is a unit that removes toner (residual toner) remaining on the surface of a corresponding photoconductor drum 30. The surface of the photoconductor drum 30 from which residual toner is removed is returned to a position facing a corresponding charging device 32 again.

The charging device 32 is a device that uniformly charges the surface of a corresponding photoconductor drum 30.

The developing roller 33 is a roller of which the surface is thinly and uniformly coated with toner supplied from a corresponding toner cartridge 34 in accordance with the rotation thereof. Then, when brought into contact with the surface of a corresponding photoconductor drum 30, the toner on the surface of the developing roller 33 is attached to a portion of the surface to which light is emitted. In other words, the developing roller 33 attaches toner to a latent image formed on the surface of a corresponding photoconductor drum 30 to develop the latent image.

The toner cartridge 34a is a cartridge that supplies black toner to the developing roller 33a. The toner cartridge 34b is a cartridge that supplies cyan toner to the developing roller 33b. The toner cartridge 34c is a cartridge that supplies magenta toner to the developing roller 33c. The toner cartridge 34d is a cartridge that supplies yellow toner to the developing roller 33d.

The transfer belt 40 is a belt that is stretched over a belt rotation mechanism and rotates in a predetermined direction. The outer surface of the transfer belt 40 is brought into contact with the surface of each photoconductor drum 30 at a position on the opposite side of the light scanning apparatus 10, toner images on the photoconductor drums 30 are sequentially transferred to be multiply superimposed, and a color toner image is transferred. In addition, the outer surface of the transfer belt 40 is brought into contact with the transfer roller 42.

The transfer roller 42 is a roller that is brought into contact with the outer surface of the transfer belt 40 through a recording sheet and transfers a color toner image formed on the transfer belt 40 to the recording sheet.

The density detector 45 is a sensor that is arranged on the −X side (a position located on a further upstream side in the advancing direction of the transfer belt 40 than the fixing roller 50 and on a further downstream side than the four photoconductor drums 30) of the transfer belt 40 and detects the density of a color toner image formed on the transfer belt 40.

The home position sensor 46 is a sensor that detects a home position (original position) of rotation of a corresponding photoconductor drum 30.

The fixing roller 50 is a roller that applies heat and pressure to a recording sheet so as to fix toner on the recording sheet. Recording sheets on which toner is fixed are sent to the sheet ejecting tray 70 through the sheet ejecting roller 58 and are sequentially stacked on the sheet ejecting tray 70.

The sheet feeding roller 54 is a member that is arranged near the sheet feeding tray 60, ejects recoding sheets from the sheet feeding tray 60 one at each time, and conveys the ejected sheets to the registration roller pair 56.

The registration roller pair 56 is a roller pair that sends out a recording sheet toward a nip between the transfer belt 40 and the transfer roller 42 at predetermined timing. In this way, the color toner image on the transfer belt 40 is transferred to the recording sheet. Here, the recording sheet to which the color toner image is transferred is sent to the fixing roller 50.

The sheet ejecting roller 58 is a roller that ejects the recording sheet, to which the color toner image is transferred, sent out from the fixing roller 50 to the sheet ejecting tray 70.

The sheet feeding tray 60 is a tray that stores a recording sheet. The sheet ejecting tray 70 is a tray that is used for stacking a recording sheet, to which a color toner image is transferred, ejected from the sheet ejecting roller 58.

The communication control device 80 is a device that controls bi-directional communication with a host apparatus 2 (for example, a computer) through a network or the like.

The printer control device 90 is a control device that performs overall control of each device included in the image forming apparatus 1. The printer control device 90 includes: a central processing unit (CPU); a read only memory (ROM) in which a program described using codes executed by the CPU and various kinds of data used at the time of executing the program are stored; a random access memory (RAM) that is a work memory; an AD converting circuit that converts analog data into digital data; and the like. Then, the printer control device 90 controls each device in response to a request from the host apparatus 2 and sends image data supplied from the host apparatus 2 to the light scanning apparatus 10.

(Configuration and Operation of Light Scanning Apparatus)

Figure 2:
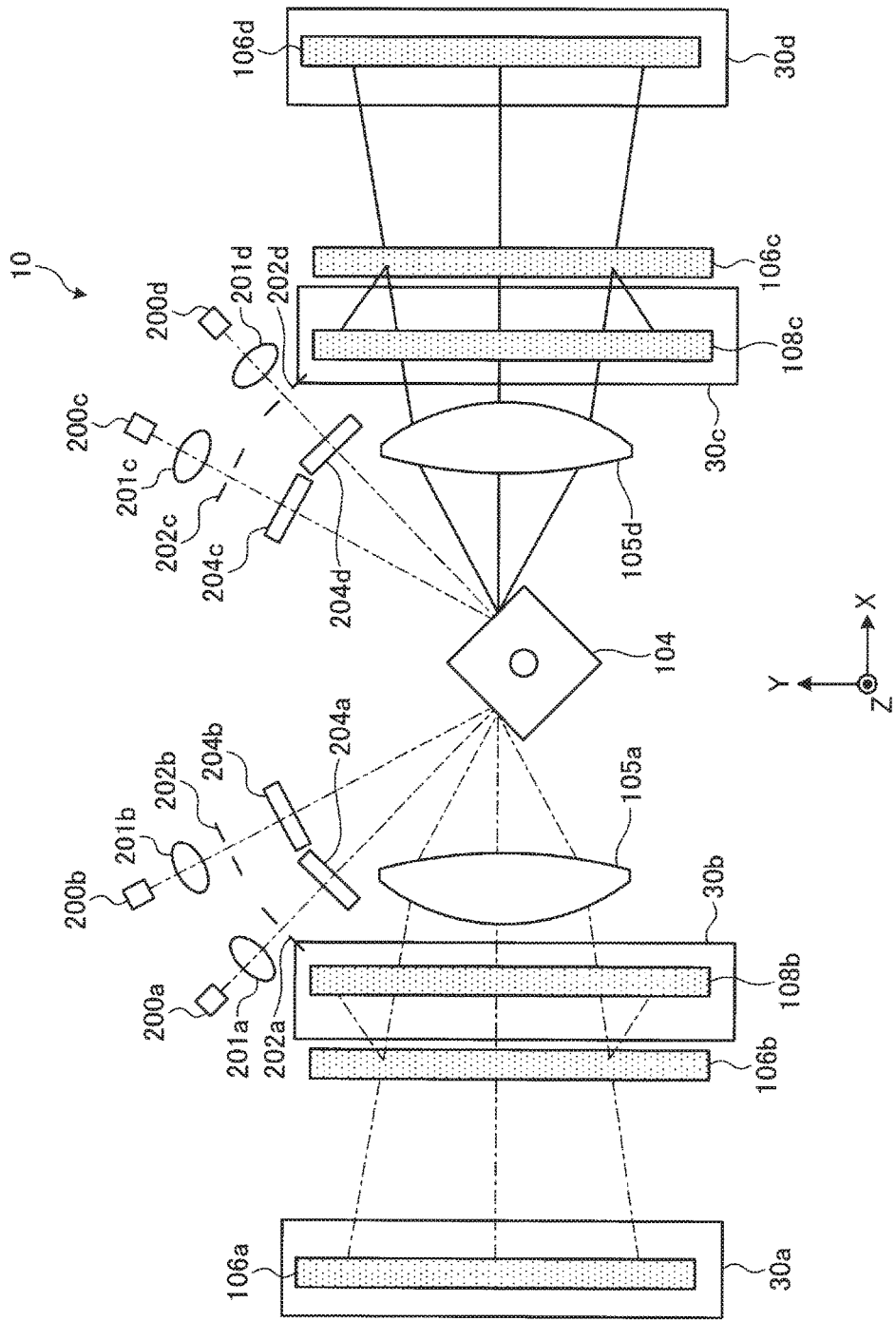
FIG. 2 is a diagram that illustrates the configuration of an optical system of a light scanning apparatus according to the first embodiment.
Figure 3:
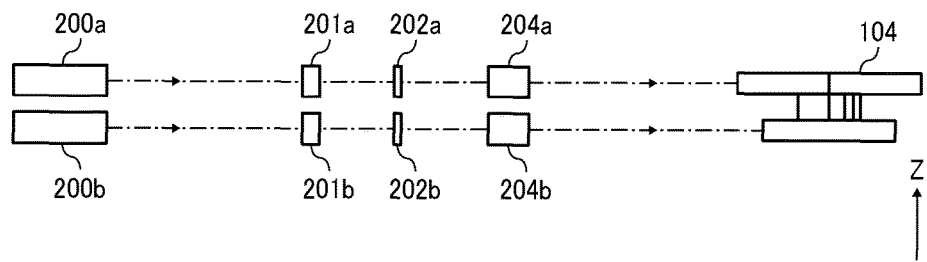
FIG. 3 is a diagram that illustrates an example of an optical path from a light source to a polygon mirror.
Figure 4:
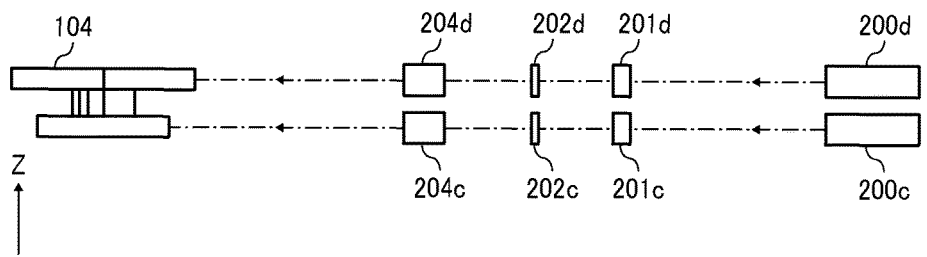
FIG. 4 is a diagram that illustrates an example of an optical path from a light source to a polygon mirror.
Figure 5:
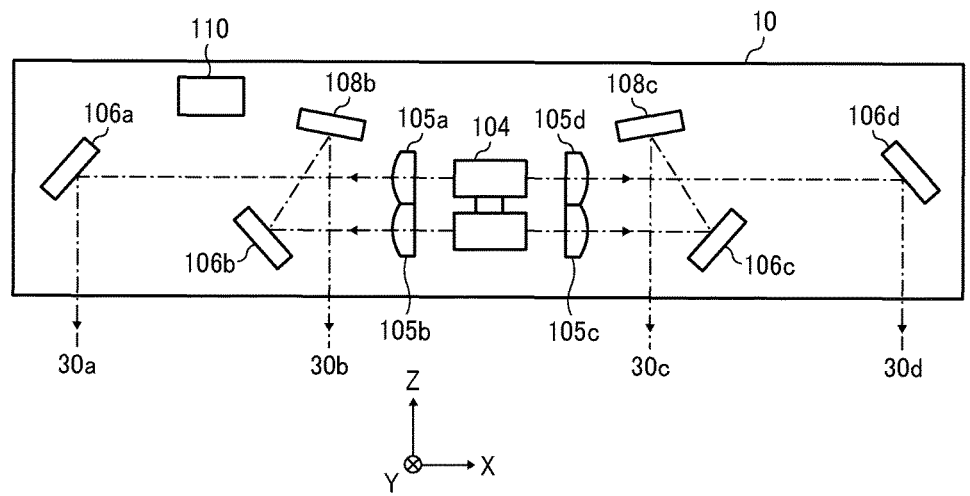
FIG. 5 is a diagram that illustrates an example of an optical path from a polygon mirror to each photoconductor drum.

FIG. 2 is a diagram that illustrates the configuration of an optical system of a light scanning apparatus according to the first embodiment. FIGS. 3 and 4 are diagrams that illustrate examples of an optical path from a light source to a polygon mirror. FIG. 5 is a diagram that illustrates an example of an optical path from a polygon mirror to each photoconductor drum. The configuration and the operation of the light scanning apparatus 10 will be described with reference to FIGS. 2 to 5.

As illustrated in FIG. 2, the light scanning apparatus 10 includes: four light sources 200a, 200b, 200c, and 200d; four coupling lenses 201a, 201b, 201c, and 201d; four aperture plates 202a, 202b, 202c, and 202d; and four cylindrical lenses 204a, 204b, 204c, and 204d as an optical system. In addition, the light scanning apparatus 10 includes: a polygon mirror 104; four scanning lenses 105a, 105b, 105c, and 105d; and six turning-back mirrors 106a, 106b, 106c, 106d, 108b, and 108c as an optical system. Such optical members are assembled at predetermined positions in an optical housing of the light scanning apparatus 10. In addition, the light scanning apparatus 10 includes a light source control apparatus 110 as a circuit of an electrical system, and details of the light source control apparatus 110 will be described later with reference to FIGS. 6 to 11.

In a case where an arbitrary light source among the light sources 200a, 200b, 200c, and 200d is to be represented or in a case where the light sources are collectively referred to, it may be simply referred to as a "light source 200". In addition, in a case where an arbitrary coupling lens among the coupling lenses 201a, 201b, 201c, and 201d is to be represented or in a case where the coupling lenses are collectively referred to, it may be simply referred to as a "coupling lens 201". Furthermore, in a case where an arbitrary aperture plate among the aperture plates 202a, 202b, 202c, and 202d is to be represented or in a case where the aperture plates are collectively referred to, it may be simply referred to as an "aperture plate 202". In addition, in a case where an arbitrary cylindrical lens among the cylindrical lenses 204a, 204b, 204c, and 204d is to be represented or in a case where the cylindrical lenses are collectively referred to, it may be simply referred to as a "cylindrical lens 204". Furthermore, in a case where an arbitrary scanning lens among the scanning lenses 105a, 105b, 105c, and 105d is to be represented or in a case where the scanning lenses are collectively referred to, it may be simply referred to as a "scanning lens 105".

The light source 200 is a laser light source that includes a plane emission laser array in which a plurality of light emitters are two-dimensionally arranged. The plurality of light emitters of the plane emission laser array are arranged such that the light emitters are equally spaced when all the light emitters emit orthographic projection of light onto a virtual line growing in a direction corresponding to sub scanning. The light source 200, for example, is configured by a vertical cavity surface emitting laser (VCSEL). However, the light source 200 is not limited to the VCSEL but, for example, may be a single laser (laser diode (LD)) or a laser diode array (LDA).

The coupling lens 201 is a lens that is arranged on an optical path of light fluxes emitted from a corresponding light source 200 and causes light fluxes passing through it to be approximately-parallel light fluxes.

The aperture plate 202 is a member that includes an opening portion and shapes light fluxes through a corresponding coupling lens 201.

The cylindrical lens 204 is a lens that images light fluxes passing through the opening portion of a corresponding aperture plate 202 near a deflective reflection surface of the polygon mirror 104 with respect to the Z-axis direction.

An optical system including the coupling lens 201a, the aperture plate 202a, and the cylindrical lens 204a is a pre-deflector optical system of a K station. An optical system including the coupling lens 201b, the aperture plate 202b, and the cylindrical lens 204b is a pre-deflector optical system of a C station. An optical system including the coupling lens 201c, the aperture plate 202c, and the cylindrical lens 204c is a pre-deflector optical system of an M station. An optical system including the coupling lens 201d, the aperture plate 202d, and the cylindrical lens 204d is a pre-deflector optical system of a Y station.

The polygon mirror 104 is an optical member that includes four-surface mirrors each having a two-stage structure rotating around an axis parallel to the Z axis and has each of the mirrors to function as a deflective reflection surface. Then, the four-surface mirrors are arranged such that light fluxes from the cylindrical lens 204b and light fluxes from the cylindrical lens 204c are deflected by the four-surface mirror of the first stage, and light fluxes from the cylindrical lens 204a and light fluxes from the cylindrical lens 204d are deflected by the four-surface mirror of the second stage (upper stage). The light fluxes from the cylindrical lens 204a and the cylindrical lens 204b are deflected to the −X side of the polygon mirror 104, and the light fluxes from the cylindrical lens 204c and the cylindrical lens 204d are deflected to the +X side of the polygon mirror 104.

The scanning lens 105 is a lens that has optical power for collecting light fluxes to a position near a corresponding photoconductor drum 30 and optical power for moving a light spot on the surface of a corresponding photoconductor drum 30 in a main-scanning direction at an equal speed in accordance with the rotation of the polygon mirror 104.

The scanning lens 105a and the scanning lens 105b are arranged on the −X side of the polygon mirror 104. In addition, the scanning lens 105a and the scanning lens 105b are stacked in the Z-axis direction. The scanning lens 105b faces the four-surface mirror of the first stage. The scanning lens 105a faces the four-surface mirror of the second stage.

The scanning lens 105c and the scanning lens 105d are arranged on the +X side of the polygon mirror 104. In addition, the scanning lens 105c and the scanning lens 105d are stacked in the Z-axis direction. The scanning lens 105c faces the four-surface mirror of the first stage. The scanning lens 105d faces the four-surface mirror of the second stage.

The light fluxes deflected by the polygon mirror 104 and passing through the cylindrical lens 204a pass through the scanning lens 105a, are reflected by the turning-back mirror 106a, and are emitted to the photoconductor drum 30a, whereby a light spot is formed. The light spot is moved in the longitudinal direction of the photoconductor drum 30a in accordance with the rotation of the polygon mirror 104. In other words, the light spot scans the photoconductor drum 30a. The moving direction of the light spot at this time is a "main-scanning direction" on the photoconductor drum 30a, and the rotation direction of the photoconductor drum 30a is a "sub-scanning direction" on the photoconductor drum 30a.

In addition, the light fluxes deflected by the polygon mirror 104 and passing through the cylindrical lens 204b pass through the scanning lens 105b, are reflected by the turning-back mirror 106b and the turning-back mirror 108b, and are emitted to the photoconductor drum 30b, whereby a light spot is formed. The light spot is moved in the longitudinal direction of the photoconductor drum 30b in accordance with the rotation of the polygon mirror 104. In other words, the light spot scans the photoconductor drum 30b. The moving direction of the light spot at this time is a "main-scanning direction" on the photoconductor drum 30b, and the rotation direction of the photoconductor drum 30b is a "sub-scanning direction" on the photoconductor drum 30b.

Furthermore, the light fluxes deflected by the polygon mirror 104 and passing through the cylindrical lens 204c pass through the scanning lens 105c, are reflected by the turning-back mirror 106c and the turning-back mirror 108c, and are emitted to the photoconductor drum 30c, whereby a light spot is formed. The light spot is moved in the longitudinal direction of the photoconductor drum 30c in accordance with the rotation of the polygon mirror 104. In other words, the light spot scans the photoconductor drum 30c. The moving direction of the light spot at this time is a "main-scanning direction" on the photoconductor drum 30c, and the rotation direction of the photoconductor drum 30c is a "sub-scanning direction" on the photoconductor drum 30c.

Furthermore, the light fluxes deflected by the polygon mirror 104 and passing through the cylindrical lens 204d pass through the scanning lens 105d, are reflected by the turning-back mirror 106d, and are emitted to the photoconductor drum 30d, whereby a light spot is formed. The light spot is moved in the longitudinal direction of the photoconductor drum 30d in accordance with the rotation of the polygon mirror 104. In other words, the light spot scans the photoconductor drum 30d. The moving direction of the light spot at this time is a "main-scanning direction" on the photoconductor drum 30d, and the rotation direction of the photoconductor drum 30d is a "sub-scanning direction" on the photoconductor drum 30d.

The turning-back mirrors 106a, 106b, 106c, 106d, 108b, and 108c are arranged such that lengths of optical paths from the polygon mirror 104 to the corresponding photoconductor drums 30 coincide with each other, and incident positions and incident angles of light fluxes for the corresponding photoconductor drums 30 are the same.

An optical system arranged on an optical path between the polygon mirror 104 and each photoconductor drum 30 is also called a scanning optical system. An optical system including the scanning lens 105a and the turning-back mirror 106a is a scanning optical system of a K station. An optical system including the scanning lens 105b and the two turning-back mirrors 106b and 108b is a scanning optical system of a C station. As optical system including the scanning lens 105c and the two turning-back mirrors 106c and 108c, a scanning optical system of an M station is configured. An optical system including the scanning lens 105d and the turning-back mirror 106d is a scanning optical system of a Y station. In addition, in each scanning optical system, the scanning lens 105 may be configured by a plurality of lenses.

(Configuration of Light Source Control Apparatus)

Figure 6:
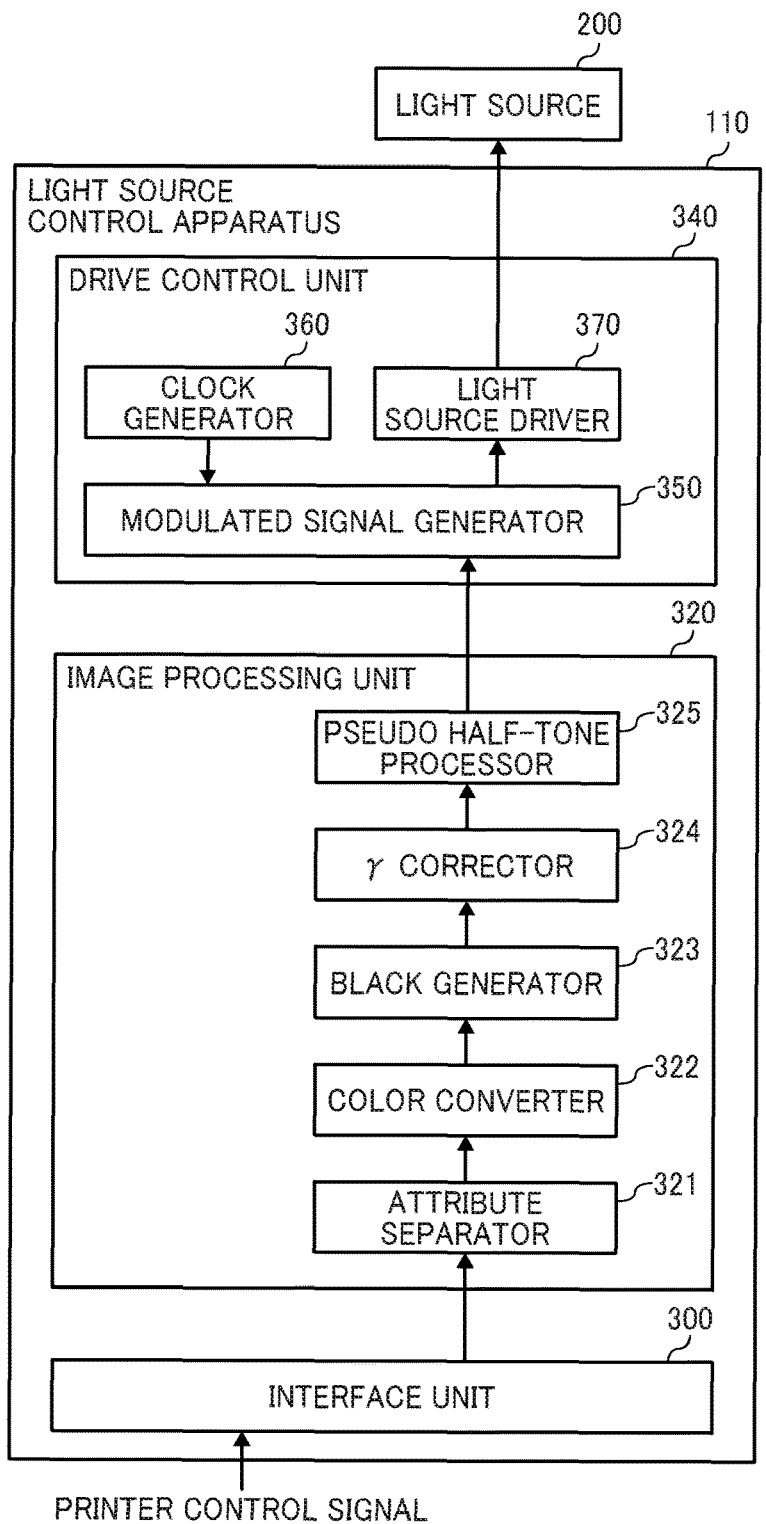
FIG. 6 is a diagram that illustrates an example of the configuration of functional blocks of a light source control apparatus according to the first embodiment.

FIG. 6 is a diagram that illustrates an example of the configuration of functional blocks of the light source control apparatus according to the first embodiment. The configuration of the functional blocks of the light source control apparatus 110 according to this embodiment will be described with reference to FIG. 6.

As illustrated in FIG. 6, the light source control apparatus 110 includes: an interface unit 300 (interface); an image processing unit 320 (processor); and a drive control unit 340 (drive control device).

The interface unit 300 acquires image data transmitted from a host apparatus 2 (for example, a computer) from the printer control device 90 and transmits the acquired image data to the image processing unit 320 of a later stage. A specific hardware configuration of the interface unit 300 will be described later with reference to FIG. 7.

The image processing unit 320 is capable of processing data, for example, with a resolution of 2,400 dots per inch (dpi) and performs various kinds of image processing for image data that is multi-bit data input from the interface unit 300. The image processing unit 320, for example, converts image data (for example, image data represented in an RGB format) input from the interface unit 300 into image data (for example, image data represented in a CMYK format) of colors corresponding to a print system. The image processing unit 320, as illustrated in FIG. 6, includes an attribute separator 321, a color converter 322, a black generator 323, a γ corrector 324, and a pseudo half-tone processor 325.

The attribute separator 321 separates attribute information added to image data input from the interface unit 300. The attribute information is information that represents a type of object that is a source of an area (pixel). For example, in a case where a pixel is a part of a character, the attribute information of the pixel represents an attribute of a "character". In a case where a pixel is a part of a line, the attribute information of the pixel represents an attribute of a "line". In a case where a pixel is a part of a figure, the attribute information of the pixel represents an attribute of a "figure". In a case where a pixel is a part of a photograph, the attribute information of the pixel represents an attribute of a "photograph". The attribute separator 321 sends the image data from which the attribute information is separated to the color converter 322.

The color converter 322 converts image data represented in the RGB format into image data represented in the format of CMY that are color reproduction colors for a printer or the like. The color converter 322 sends the image data converted into the CMY format to the black generator 323.

The black generator 323 extracts a black component from the image data converted into the CMY format, determines CMY colors thereafter, and finally converts the image data into image data represented in the CMYK format. The black generator 323 sends the image data converted into the CMYK format to the γ corrector 324.

The γ corrector 324 performs a gray scale correction according to output characteristics of the image forming apparatus 1 for each of CMYK for the image data converted into the CMYK format. The γ corrector 324 sends the corrected image data to the pseudo half-tone processor 325.

The pseudo half-tone processor 325 performs a pseudo half-tone process by using a two-value or multi-value dither matrix for each of CMYK and generates area gray scale data of one bit from the multi-bit image data by changing the number of pixels or values within a certain area to be continuous gray scales of a structure of half-tone dots or a line. The pseudo half-tone processor 325 sends the generated image data of one bit per one pixel to the drive control unit 340.

Each functional unit of the image processing unit 320 illustrated in FIG. 6, for example, is achieved by a hardware circuit such as an application specific integrated circuit (ASIC) or a field-programmable gate array (FPGA).

Here, the attribute separator 321, the color converter 322, the black generator 323, the γ corrector 324, and the pseudo half-tone processor 325 conceptually represent the functions, but the configurations are not limited thereto. For example, a plurality of the functional units illustrated as independent functional units of the image processing unit 320 illustrated in FIG. 6 may be configured as one functional unit. On the other hand, the function of one functional unit of the image processing unit 320 illustrated in FIG. 6 may be divided into a plurality of parts to be configured as the functions of a plurality of functional units.

The drive control unit 340 receives image data for which image processing has been performed from the image processing unit 320, generates a modulated pulse signal according to the drive of the light source 200, and drives the light source 200 by using a drive signal according to the modulated pulse signal to emit light. The drive control unit 340, for example, is configured by a single integrated device that is formed as one chip such as an ASIC disposed near each light source 200. The drive control unit 340, as illustrated in FIG. 6, includes a modulated signal generator 350, a clock generator 360, and a light source driver 370.

The modulated signal generator 350 generates a modulated pulse signal used for driving the light source 200. More specifically, the modulated signal generator 350, in the process of generating a modulated pulse signal, divides image data having a resolution (first resolution) of M received from the image processing unit 320 in the main-scanning direction and the sub-scanning direction to increase the resolution to be a resolution (second resolution) of N. In addition, the modulated signal generator 350 finds write start timing based on an output signal of a synchronization detecting sensor for each image forming station. Then, the modulated signal generator 350 superimposes dot data of the emitter of the light source 200 in a pixel clock signal supplied from the clock generator 360 in accordance with the write start timing and generates a modulated pulse signal that is independent for each light emitter based on information from the image processing unit 320 or the like. The configuration of specific functional blocks of the modulated signal generator 350 will be described later with reference to FIGS. 8 to 10.

The clock generator 360 generates the pixel clock signal described above.

The light source driver 370 outputs a drive signal of each light emitter of the light source 200 in accordance with a modulated pulse signal generated by the modulated signal generator 350. A specific hardware configuration of the light source driver 370 will be described later with reference to FIG. 11.

Here, while the light source control apparatus 110 illustrated in FIG. 6 is configured to drive a specific light source 200, the configuration is not limited thereto. Thus, for example, one light source control apparatus 110 may be configured to control driving of four light sources 200 (light sources 200a, 200b, 200c, and 200d). In description presented below, the light source control apparatus 110 will be described as an apparatus that controls a specific light source 200.

<Hardware Configuration of Interface Unit>

Figure 7:
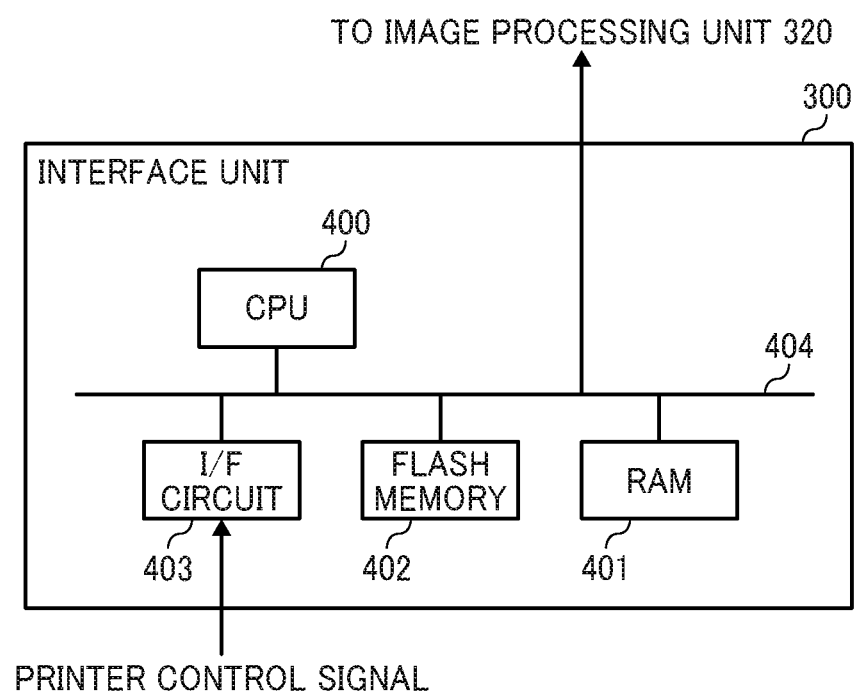
FIG. 7 is a diagram that illustrates an example of the hardware configuration of an interface unit of the light source control apparatus according to the first embodiment.

FIG. 7 is a diagram that illustrates an example of the hardware configuration of the interface unit of the light source control apparatus according to the first embodiment. The hardware configuration of the interface unit 300 according to this embodiment will be described with reference to FIG. 7.

As illustrated in FIG. 7, the interface unit 300 includes a CPU 400, a RAM 401, a flash memory 402, and an I/F circuit 403.

The CPU 400 is an arithmetic operation device that operates according to a program stored in the flash memory 402 and performs overall control of the light scanning apparatus 10. The RAM 401 is a volatile storage device that is used as a work area of the CPU 400. The flash memory 402 is a nonvolatile storage device that stores various programs executed by the CPU 400 and various kinds of data that are necessary for the execution of such programs. The I/F circuit 403 is a communication interface that bi-directionally communicates with the printer control device 90. For example, the I/F circuit 403 receives a printer control signal from the printer control device 90. Image data supplied from the host apparatus 2 is input to the light source control apparatus 110 through the I/F circuit 403.

A bus 404, as illustrated in FIG. 7, is an address bus, a data bus, or the like that connects the CPU 400, the RAM 401, the flash memory 402, and the I/F circuit 403 to be communicable with each other.

<Configuration of Functional Blocks of Modulated Signal Generator>

Figure 8:
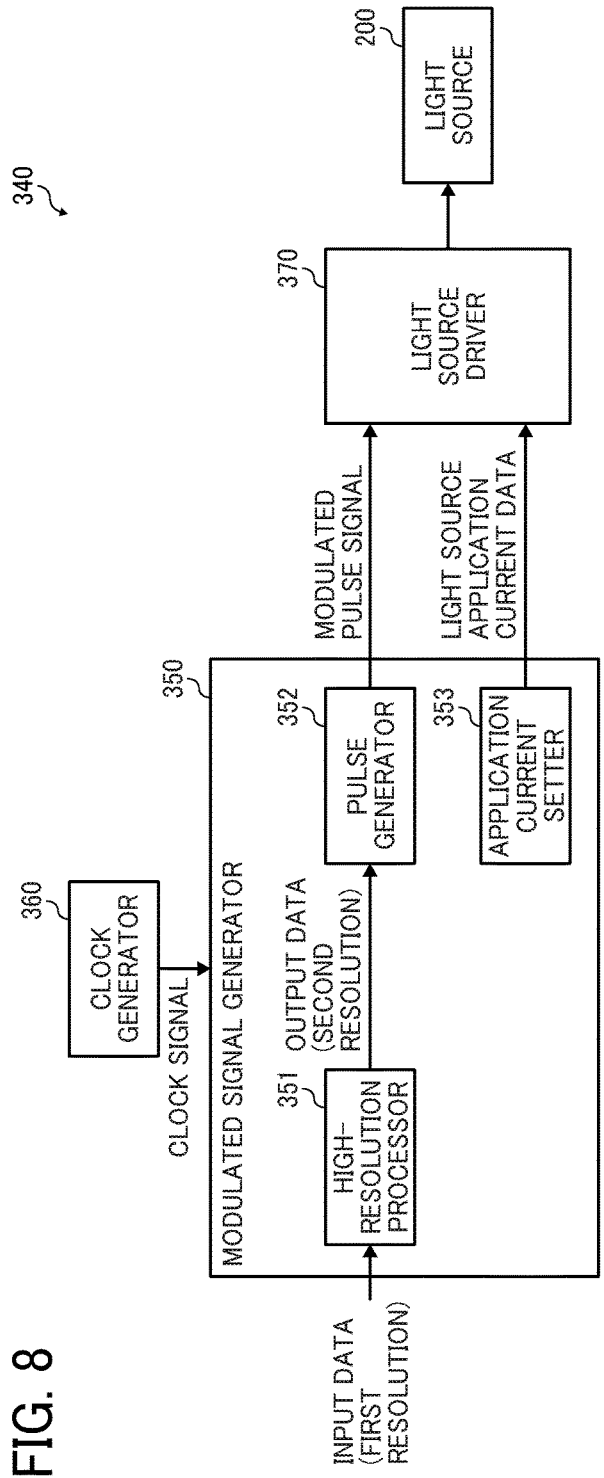
FIG. 8 is a diagram that illustrates an example of the configuration of functional blocks of a drive control unit of the light source control apparatus according to the first embodiment.
Figure 9:
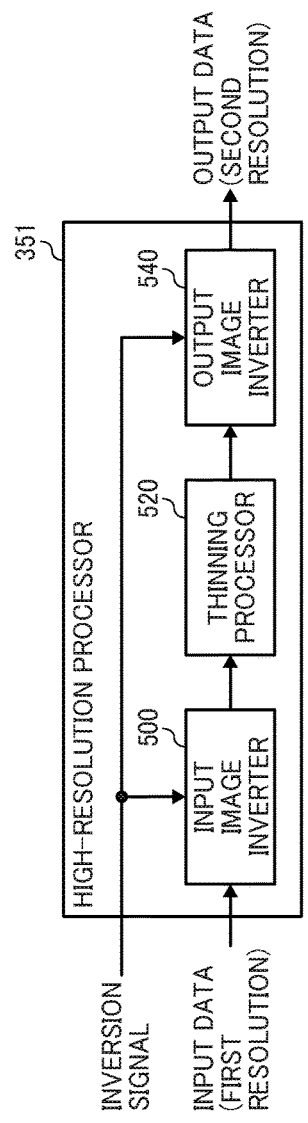
FIG. 9 is a diagram that illustrates an example of the configuration of functional blocks of a high-resolution processor of the drive control unit according to the first embodiment.
Figure 10:
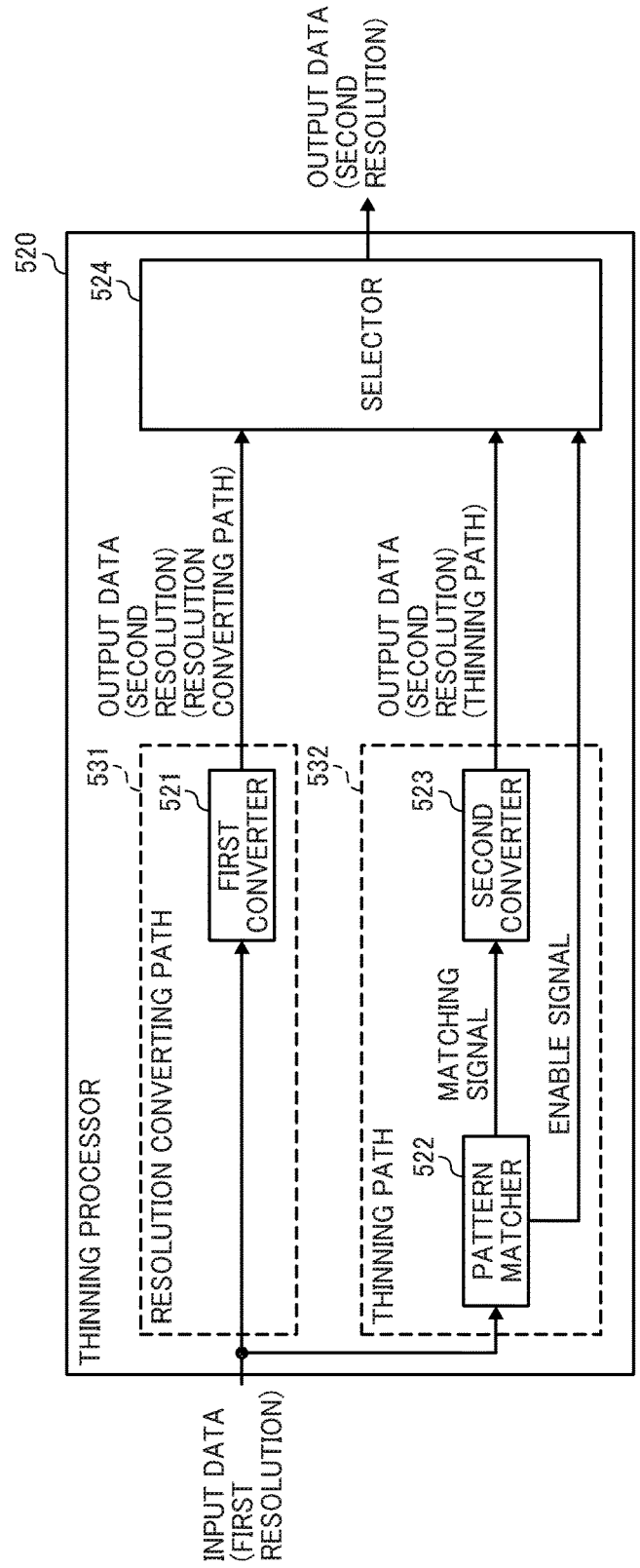
FIG. 10 is a diagram that illustrates an example of the configuration of functional blocks of a thinning processor of the high-resolution processor according to the first embodiment.

FIG. 8 is a diagram that illustrates an example of the configuration of functional blocks of the drive control unit of the light source control apparatus according to the first embodiment. FIG. 9 is a diagram that illustrates an example of the configuration of functional blocks of a high-resolution processor of the drive control unit according to the first embodiment. FIG. 10 is a diagram that illustrates an example of the configuration of functional blocks of a thinning processor of the high-resolution processor according to the first embodiment. The configuration of the functional blocks of the modulated signal generator 350 of the drive control unit 340 according to this embodiment will be described with reference to FIGS. 8 to 10.

As illustrated in FIG. 8, the modulated signal generator 350 of the drive control unit 340 includes a high-resolution processor 351, a pulse generator 352, and an application current setter 353. Here, an "image processing apparatus" according to this disclosure, for example, corresponds to the modulated signal generator 350 or the high-resolution processor 351.

The high-resolution processor 351 increases the resolution (resolution converting process) of image data (input data illustrated in FIG. 8) having the first resolution output from the image processing unit 320 to be the resolution of image data having resolution (second resolution) higher than the first resolution, sequentially selects target pixels from the image data having the first resolution, and, in a case where the target pixel is a pixel configuring an edge (a corner or a contour) of a thin line or the like, performs image processing of thinning or thickening. The high-resolution processor 351 sends the image data (output data illustrated in FIG. 8) having the second resolution, for which the image processing has been performed, to the pulse generator 352.

The pulse generator 352 converts the image data having the second resolution received from the high-resolution processor 351 into serial data to generate a modulated pulse signal that is an on/off signal. Here, the modulated pulse signal is a serial signal, and an H period and an L period thereof directly represent the switching timings of on/off. The pulse generator 352 outputs the generated modulated pulse signal to the light source driver 370.

The application current setter 353 outputs light source application current data representing a setting value of a current flowing through the light source 200 to the light source driver 370.

The light source driver 370 drives the light source 200 in accordance with the modulated pulse signal supplied from the pulse generator 352 and the light source application current data supplied from the application current setter 353.

As illustrated in FIG. 9, the high-resolution processor 351 of the modulated signal generator 350 includes an input image inverter 500 (first inverter), a thinning processor 520, and an output image inverter 540 (second inverter).

The input image inverter 500 performs an inversion process for the image data (input data illustrated in FIG. 9) having the first resolution output from the image processing unit 320 in a case where an inversion signal is input from the outside (for example, the H level state). Here, the inversion process of the image data is a process in which a pixel value is converted into "1" (black pixel) in a case where the pixel value is "0" (white pixel), and a pixel value is converted into "0" (white pixel) in a case where the pixel value is "1" (black pixel). The input image inverter 500 sends the image data having the first resolution output from the image processing unit 320 to the thinning processor 520 without any change in a case where an inversion signal is not input from the outside (for example, an L level state) and sends image data acquired by performing an inversion process for the image data having the first resolution to the thinning processor 520 in a case where an inversion signal is input.

The thinning processor 520 performs a resolution converting process of converting the resolution of image data received from the input image inverter 500 from the first resolution to the second resolution and image processing of thinning. Here, image processing performed by the thinning processor 520 may be collectively referred to as "thinning processing". The thinning processor 520 sends image data for which the thinning process has been performed to the output image inverter 540. A specific configuration of the thinning processor 520 will be described later with reference to FIG. 10.

The output image inverter 540 performs an inversion process for the image data having the second resolution received from the thinning processor 520 in a case where an inversion signal is input from the outside. The output image inverter 540 outputs the image data having the second resolution received from the thinning processor 520 to the pulse generator 352 without any change in a case where an inversion signal is not input from the outside and outputs image data acquired by performing an inversion process for the image data having the second resolution to the pulse generator 352 in a case where an inversion signal is input.

Here, while the inversion signal has been described to be input from the outside, for example, on/off may be fixed for each model of the image forming apparatus 1, or on/off may be switched according to a developing system, a type of recording sheet, or the like. Alternatively, on/off may be switched at specific timing in consideration of a change in a character transferred to a recording sheet due to gradation of a print mechanism over time or the like. In addition, a supervisor of the image forming apparatus 1 may change the on/off setting of the inversion signal through a setter not illustrated in the drawing.

As illustrated in FIG. 10, the thinning processor 520 of the high-resolution processor 351 includes a first converter 521 (resolution converter, or first converting circuit), a pattern matcher 522 (matcher, or matching circuit), a second converter 523 (thinning converter, or second converting circuit), and a selector 524 (selector, or selecting circuit). Among these, a functional block in which image processing is performed by the first converter 521 will be referred to as a resolution converting path 531, and a functional block in which image processing is performed by the pattern matcher 522 and the second converter 523 will be referred to as a thinning path 532.

First, the resolution converting path 531 will be described. The first converter 521 of the resolution converting path 531 performs a resolution converting process of converting image data having the first resolution (for example, 2,400 dpi) received from the input image inverter 500 into image data having the second resolution (for example, 4,800 dpi) that is higher than the first resolution. The first converter 521 sends the converted image data (output data of the resolution converting path illustrated in FIG. 10) having the second resolution to the selector 524. In this embodiment, the second resolution will be described as resolution that is twice the first resolution. The resolution converting process will be described later with reference to FIG. 12.

Next, the thinning path 532 will be described. The pattern matcher 522 of the thinning path 532 determines whether or not a target pixel of image data is a pixel configuring an edge (a corner or a contour) of a thin line or the like based on the arrangement of pixels of the image data having the first resolution received from the input image inverter 500. More specifically, the pattern matcher 522 acquires an image matrix (for example, a partial image having a size of 9×9 illustrated in FIG. 14 to be described later) that is a partial image having a target pixel as the center from the image data having the first resolution. Accordingly, as target pixels are sequentially selected from the image data having the first resolution by the pattern matcher 522, the arrangement of pixels configuring the acquired image matrix becomes different. A pixel value of a pixel configuring the image matrix is a value ("0" or "1") of one bit. The pattern matcher 522 performs pattern matching between each of various patterns (for example, see FIGS. 15A and 15B to be described later) stored in a buffer memory not illustrated in the drawing and the acquired image matrix, thereby determining whether or not a target pixel included in the image matrix is a pixel configuring an edge (a corner or a contour) of a thin line or the like. Here, the size of the image matrix is determined based on the size of the pattern used for the pattern matching described above. In addition, the pattern matcher 522 sends a matching signal representing a result (for example, matching a specific pattern or no matching any pattern) of a determination according to the pattern matching and data of the target pixel that is a target for the pattern matching to the second converter 523. Furthermore, the pattern matcher 522 outputs an enable signal to the selector 524 in a case where the image matrix matches one pattern as the result of the determination according to the pattern matching. In addition, the buffer memory in which the patterns described above are stored, for example, may be included in a one-chip single integrated device realizing the drive control unit 340 and be configured to be able to refer to an integrated circuit realizing the pattern matcher 522.

The second converter 523 of the thinning path 532 converts a target pixel of image data having the first resolution into a specific pixel pattern (for example, see FIG. 16 to be described later) having the second resolution based on a matching signal received from the pattern matcher 522. In other words, the second converter 523 performs a resolution converting process of increasing the resolution of the image data having the first resolution to be the resolution of image data having the second resolution and performs image processing of thinning by converting a target pixel into a pixel pattern. More specifically, the second converter 523, in a case where a matching signal represents that a target pixel is a pixel configuring an edge (a corner or a contour) of a thin line or the like, increases the resolution by converting the target pixel of the image data having the first resolution into a pixel pattern corresponding to a pattern represented by the matching signal and performs image processing of thinning. On the other hand, the second converter 523, in a case where the matching signal represents that the target pixel is not a pixel configuring an edge of a thin line or the like, increases the resolution (substantially, a process similar to the resolution converting process performed by the first converter 521) of the target pixel of the image data having the first resolution to be the second resolution. As will be described later, in this way, by associating a pixel pattern replacing the target pixel with each pattern used for pattern matching, the intensity of thinning can be increased or decreased. The second converter 523 sends the converted image data (output data of the thinning path illustrated in FIG. 10) having the second resolution to the selector 524.

The selector 524 selects image data output to the output image inverter 540 from image data having the second resolution output from the resolution converting path 531, in other words, output from the first converter 521 and image data having the second resolution output from the thinning path 532, in other words, output from the second converter 523. More specifically, the selector 524 outputs the image data having the second resolution for which image processing has been performed by the thinning path 532 in a case where there is an input of an enable signal from the pattern matcher 522 and outputs the image data having the second resolution for which image processing (resolution converting process) has been performed by the resolution converting path 531 in a case where there is no input of an enable signal.

While the selector 524 selects whether image data from the resolution converting path 531 or image data from the thinning path 532 is output based on the presence/absence of the input of an enable signal, this selection function may be switched to be valid or invalid based on the presence/absence of the input of a thinning control signal from the outside not illustrated in the drawing. In other words, the selector 524 may select the resolution converting path 531 regardless of the presence/absence of the input of an enable signal in a case where a thinning control signal is not input and perform switching between selection of the resolution converting path 531 and selection of the thinning path 532 based on the presence/absence of the input of an enable signal in a case where a thinning control signal is input.

Details of the image processing (may be also collectively referred to as "thinning processing" as described above) performed by the thinning processor 520 will be described later with reference to FIGS. 12 to 21D.

<Hardware Configuration of Light Source Driver>

Figure 11:
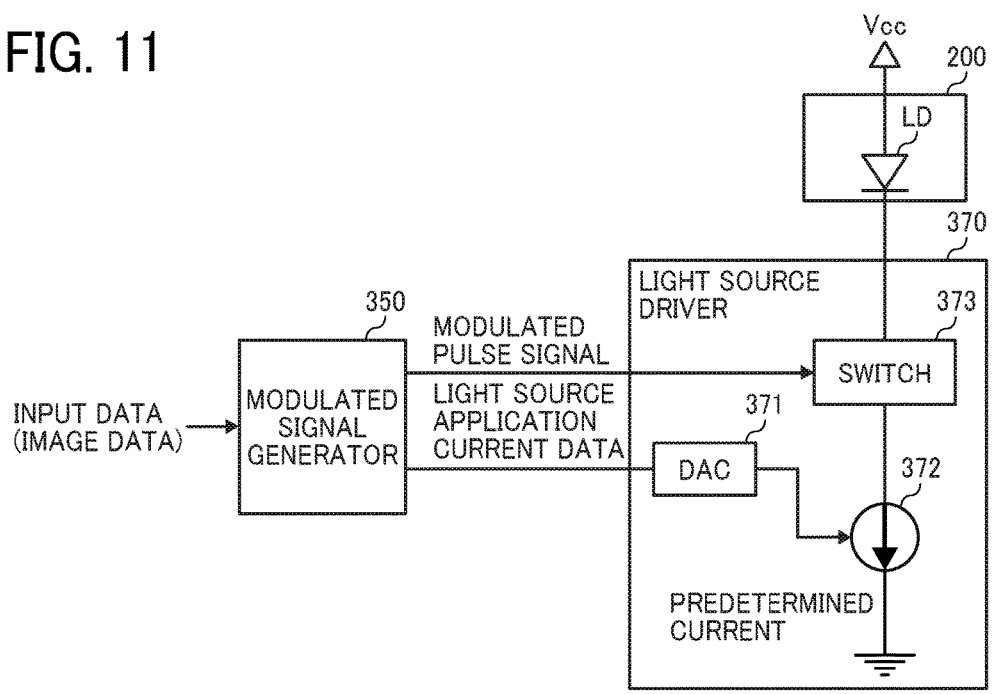
FIG. 11 is a diagram that illustrates an example of the hardware configuration of a light source driver of the drive control unit according to the first embodiment.

FIG. 11 is a diagram that illustrates an example of the hardware configuration of the light source driver of the drive control unit according to the first embodiment. The hardware configuration of the light source driver 370 of the drive control unit 340 according to this embodiment will be described with reference to FIG. 11.

As illustrated in FIG. 11, the light source driver 370 of the drive control unit 340 includes a digital-to-analog converter (DAC) 371, a current source 372, and a switch 373. A light source 200 illustrated in FIG. 11 will be described to include a single laser LD as an issuer.

The DAC 371 is an electronic component that converts light source application current data that is digital data output from the application current setter 353 of the modulated signal generator 350 into an analog signal. The DAC 371 outputs the converted analog signal to the current source 372.

The current source 372 is a device that performs adjustment such that a current flowing through the single laser LD of the light source 200 is a predetermined current based on the analog signal of the light source application current data output from the DAC 371. In other words, by controlling the light source application current data, the light intensity with which the light source 200 emits light can be controlled. For example, by increasing a current value represented by the light source application current data output from the application current setter 353 in accordance with the degree of degradation (for example, degradation of the photoconductor drum 30 over time or the like) of the print mechanism over time, the function of the electrophotographic process can be maintained.

The switch 373 is an electronic component that performs an opening/closing operation of circuits from the single laser LD to the current source 372 based on a modulated pulse signal output from the modulated signal generator 350. In a case where the switch 373 is in a closed state, a current flows through the single laser LD of the light source 200 in a forward direction from a power source Vcc to the switch 373, and accordingly, the single laser LD emits light. According to the opening/closing operation using the switch 373 based on the modulated pulse signal, the light emission of the light source 200 for the single laser LD in a desired lighting pattern can be controlled.

(Image Processing of High-Resolution Processor)

Hereinafter, the image processing of the high-resolution processor 351 of the modulated signal generator 350 of the light source control apparatus 110 according to this embodiment will be described with reference to FIGS. 12 to 21D. In FIGS. 12 to 21D, the first resolution is assumed to be 2,400 dpi, and the second resolution is assumed to be 4,800 dpi in the description.

<Resolution Converting Process>

Figure 12:
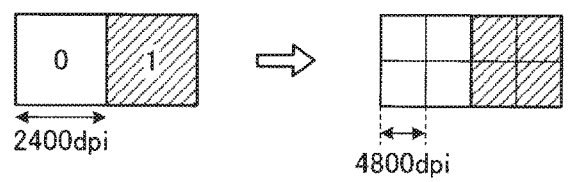
FIG. 12 is a diagram that illustrates the operation of a resolution converting process of the thinning processor according to the first embodiment.

FIG. 12 is a diagram that illustrates the operation of the resolution converting process of the thinning processor according to the first embodiment. In the thinning process of the thinning processor 520 of the high-resolution processor 351, a resolution converting process performed by the first converter 521 of the resolution converting path 531 will be described as an example with reference to FIG. 12.

The first converter 521 of the resolution converting path 531 performs a resolution converting process of converting image data having the first resolution (2,400 dpi) received from the input image inverter 500 into image data having the second resolution (4,800 dpi) higher than the first resolution. More specifically, the first converter 521, as illustrated in FIG. 12, converts a pixel having a pixel value of "0" in the image data having the first resolution (2,400 dpi) into a total of four pixels, of which pixel values are "0"s, of vertical two pixels×horizontal two pixels to have the second resolution (4,800 dpi). Similarly, the first converter 521, as illustrated in FIG. 12, converts a pixel having a pixel value of "1" in the image data having the first resolution (2,400 dpi) into a total of four pixels, of which pixel values are "1"s, of vertical two pixels×horizontal two pixels to have the second resolution (4,800 dpi).

In addition, also the process of the second converter 523 of the thinning path 532 performed in a case where the matching signal represents that a target pixel is not a pixel configuring an edge of a thin line or the like is similar to the resolution converting process performed by the first converter 521.

<Thinning Process>

Figure 13:
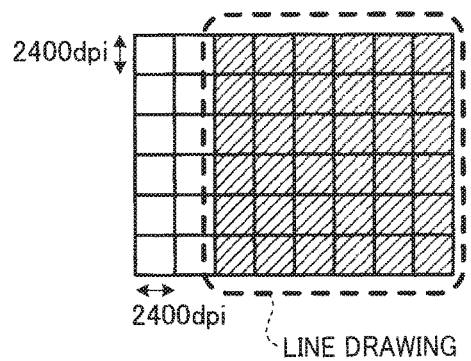
FIG. 13 is a diagram that illustrates an example of a line drawing of black pixels.
Figure 16:
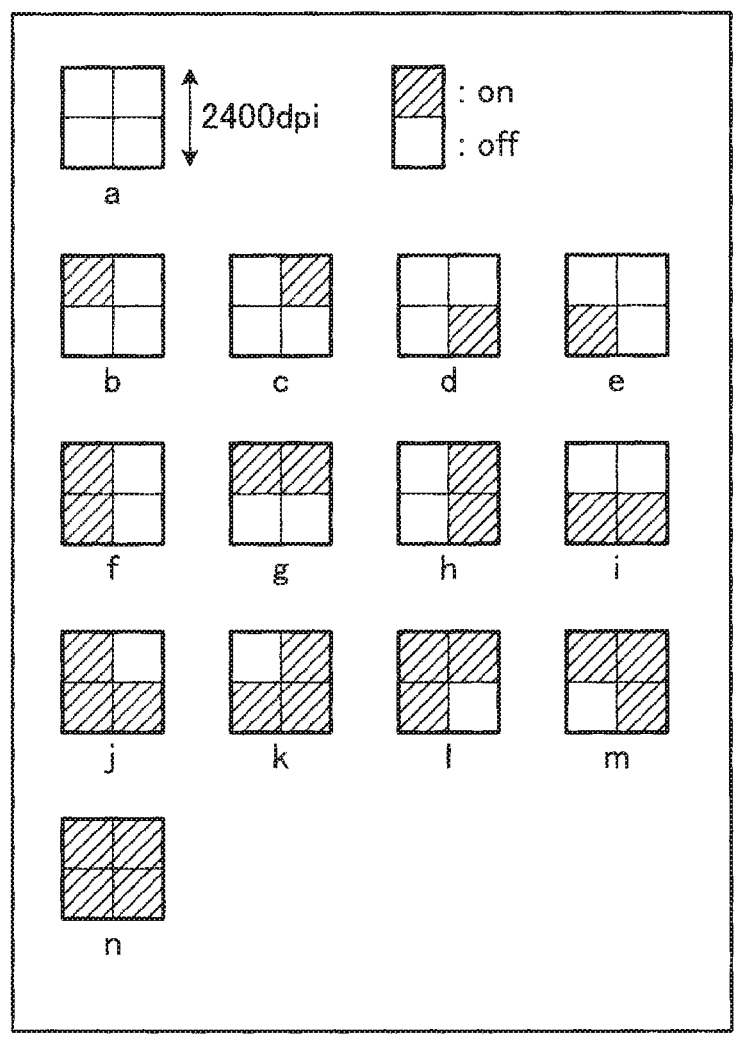
FIG. 16 is a diagram that illustrates an example of a pixel pattern of black pixels after thinning processing.

FIG. 13 is a diagram that illustrates an example of a line drawing of black pixels. FIG. 14 is a diagram that illustrates an example of the image matrix according to the first embodiment. FIGS. 15A and 15B are diagrams that illustrate examples of a pattern used for a pattern matching process according to the first embodiment. FIG. 16 is a diagram that illustrates an example of a pixel pattern of black pixels after thinning processing. FIGS. 17A to 19D are diagrams that illustrate examples of the operation of image processing of the thinning path according to the first embodiment. In the thinning process of the thinning processor 520 of the high-resolution processor 351, the operation of the image processing of the thinning path 532 will be focused in description with reference to FIGS. 13 to 19D.

An image illustrated in FIG. 13 illustrates a part of image data having the first resolution and illustrates an edge (a corner or a contour) of a line drawing of black pixels. When the image data of the image illustrated in FIG. 13 is input to the thinning path 532, the resolution of the image is increased, and image processing of thinning is performed.

The pattern matcher 522 of the thinning path 532, as described above, determines whether or not a target pixel of the image data is a pixel configuring an edge (a corner or a contour) of a thin line or the like based on the arrangement of pixels of the image data having the first resolution (2,400 dpi) received from the input image inverter 500. More specifically, the pattern matcher 522 acquires an image matrix (for example, a partial image having a size of 9×9 illustrated in FIG. 14) that is a partial image having a target pixel as its center from the image data having the first resolution. Then, the pattern matcher 522, by performing pattern matching between each of various patterns (for example, a pattern illustrated in FIGS. 15A and 15B) stored in a buffer memory not illustrated in the drawing and the acquired image matrix, determines whether or not the target pixel included in the image matrix is a pixel configuring an edge (a corner or a contour) of a thin line or the like. In the pattern illustrated in FIGS. 15A and 15B, a pixel of which the pixel value is represented as "X" represents a pixel of which the pixel value is ignored, in other words, a pixel of which the pixel value may be either "0" or "1". Accordingly, in the pattern matching, in a case where pixel values of pixels corresponding to pixels of which the pixel values are "0" and "1" in the pattern match each of the pixels of the image matrix, the image matrix is determined to match the pattern. In addition, the pattern matcher 522 sends a matching signal representing a result (for example, matching a specific pattern or no matching any of the patterns) of a determination according to the pattern matching and data of the target pixel that is a target for the pattern matching to the second converter 523.

The second converter 523 of the thinning path 532 converts the target pixel of the image data having the first resolution into a pixel pattern (for example, one of pixel patterns a to n illustrated in FIG. 16) having the second resolution based on the matching signal received from the pattern matcher 522. In other words, the second converter 523 performs a resolution converting process of increasing the resolution of the image data having the first resolution to be the resolution of the image data having the second resolution and performs image processing of thinning by converting the target pixel into a pixel pattern. More specifically, the second converter 523, in a case where the matching signal represents that a target pixel is a pixel configuring an edge (a corner or a contour) of a thin line or the like, by converting the target pixel of the image data having the first resolution into a pixel pattern corresponding to a pattern represented by the matching signal, increases the resolution and performs image processing of thinning.

Figure 17A:
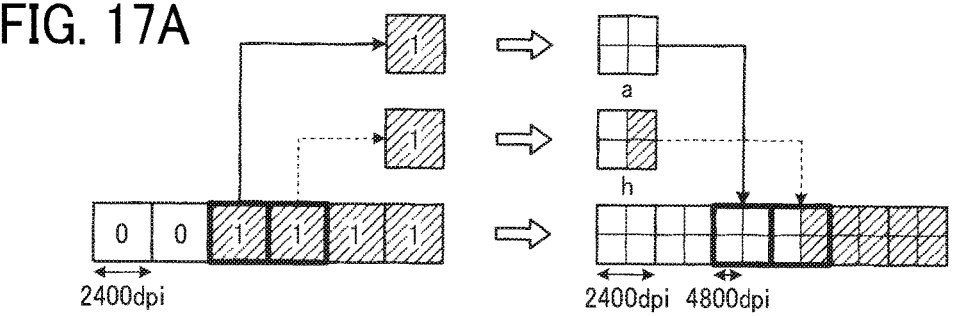
FIGS. 17A to 17D are diagrams that illustrate an example of the operation of image processing of a thinning path according to the first embodiment.

For example, FIG. 17A illustrates a partial image (first resolution) of which the left side is an edge, and two pixels disposed in the middle of six pixels are assumed to be pixels that match specific patterns according to pattern matching. The second converter 523 replaces a pixel disposed on the left side when viewing the sheet of FIG. 17A out of the two pixels matching the specific patterns with a pixel pattern (the pixel pattern a illustrated in FIG. 16) corresponding to the matching pattern. In addition, the second converter 523 replaces a pixel disposed on the right side when viewing the sheet of FIG. 17A out of the two pixels matching the specific patterns with a pixel pattern (the pixel pattern h illustrated in FIG. 16) corresponding to the matching pattern.

Figure 17B:
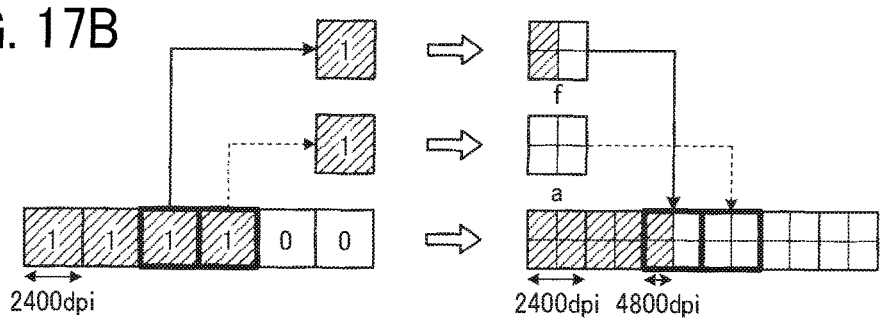

FIG. 17B illustrates a partial image (first resolution) of which the right side is an edge, and two pixels disposed in the middle of six pixels are assumed to be pixels that match specific patterns according to pattern matching. The second converter 523 replaces a pixel disposed on the left side when viewing the sheet of FIG. 17B out of the two pixels matching the specific patterns with a pixel pattern (the pixel pattern f illustrated in FIG. 16) corresponding to the matching pattern. In addition, the second converter 523 replaces a pixel disposed on the right side when viewing the sheet of FIG. 17B out of the two pixels matching the specific patterns with a pixel pattern (the pixel pattern a illustrated in FIG. 16) corresponding to the matching pattern.

Figure 17C:
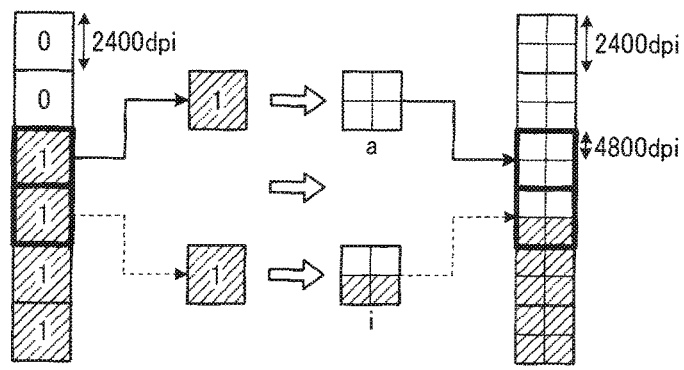

FIG. 17C illustrates a partial image (first resolution) of which the upper side is an edge, and two pixels disposed in the middle of six pixels are assumed to be pixels that match specific patterns according to pattern matching. The second converter 523 replaces a pixel disposed on the upper side when viewing the sheet of FIG. 17C out of the two pixels matching the specific patterns with a pixel pattern (the pixel pattern a illustrated in FIG. 16) corresponding to the matching pattern. In addition, the second converter 523 replaces a pixel disposed on the lower side when viewing the sheet of FIG. 17C out of the two pixels matching the specific patterns with a pixel pattern (the pixel pattern i illustrated in FIG. 16) corresponding to the matching pattern.

Figure 17D:
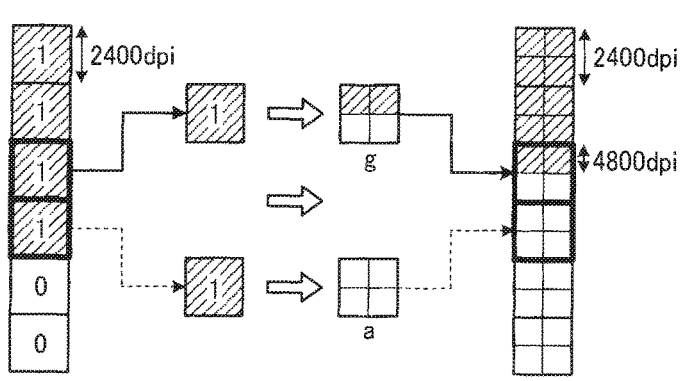
Figure 18A:
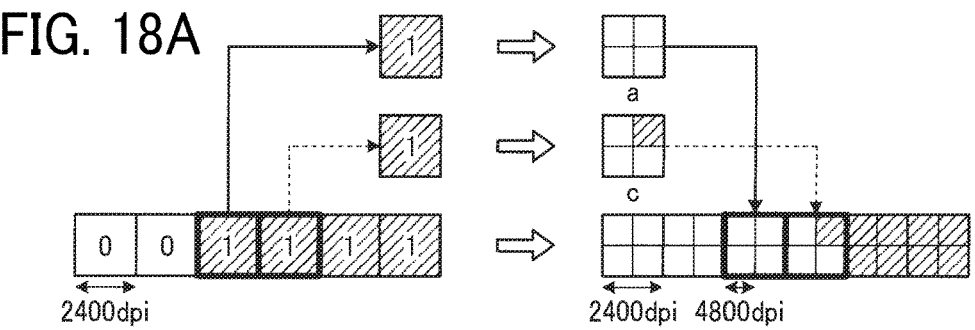
FIGS. 18A to 18D are diagrams that illustrate an example of the operation of image processing of a thinning path according to the first embodiment.
Figure 18B:
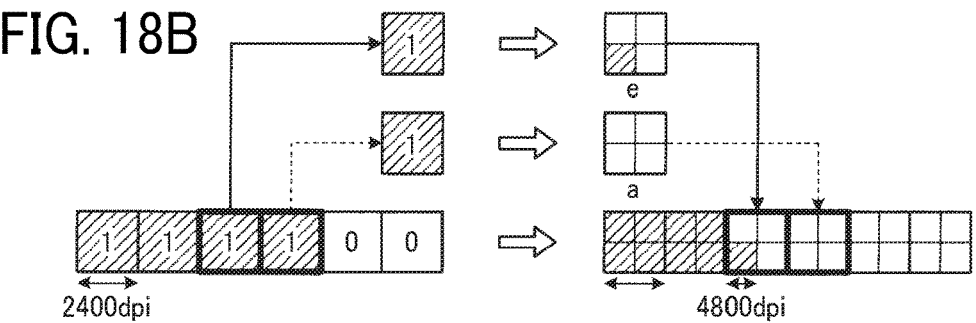
Figure 18C:
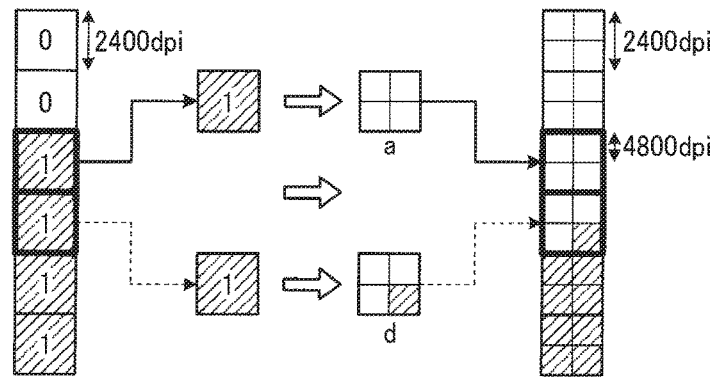
Figure 18D:
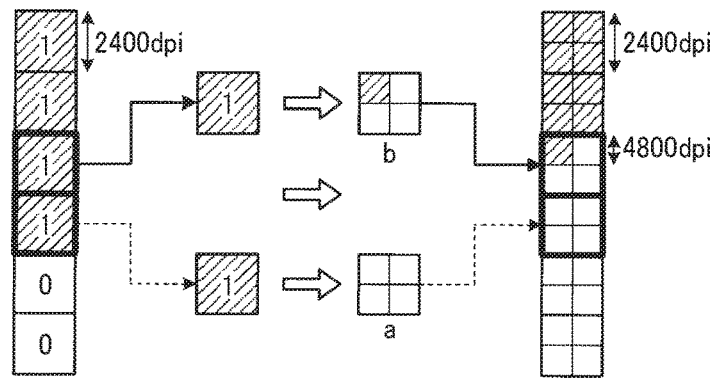
Figure 19A:
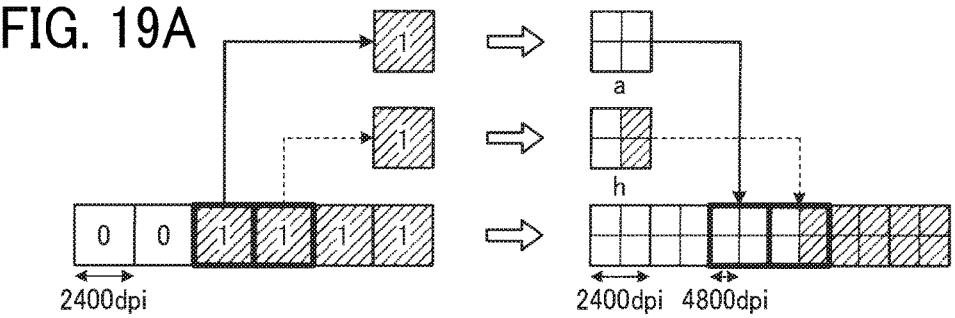
FIGS. 19A to 19D are diagrams that illustrate an example of the operation of image processing of a thinning path according to the first embodiment.
Figure 19B:
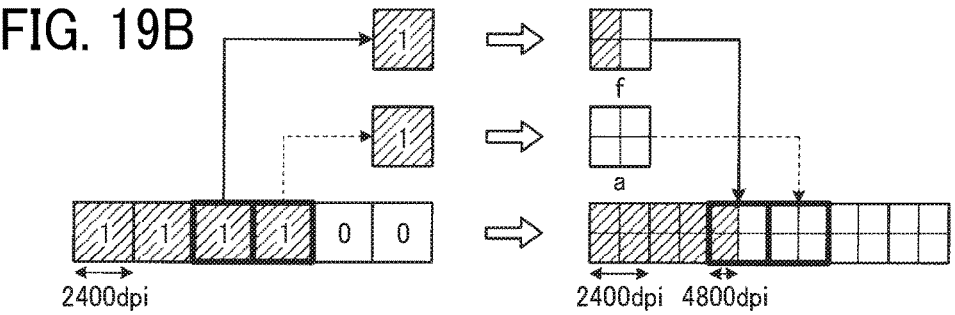
Figure 19C:
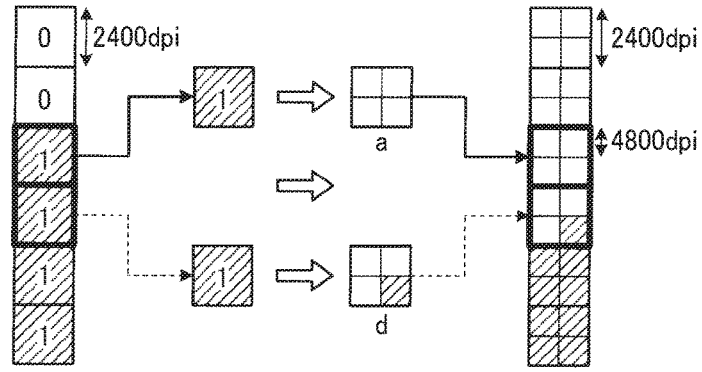
Figure 19D:
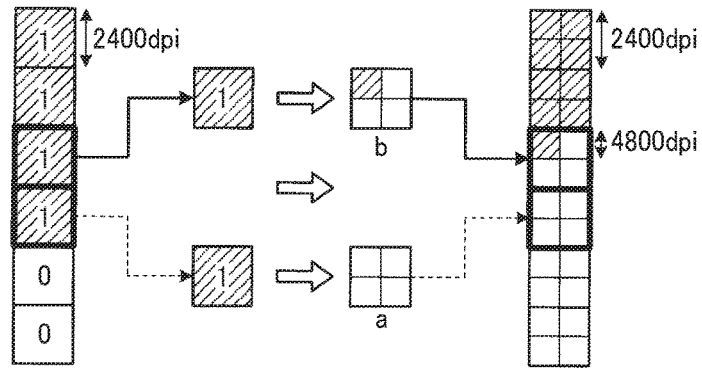

FIG. 17D illustrates a partial image (first resolution) of which the lower side is an edge, and two pixels disposed in the middle of six pixels are assumed to be pixels that match specific patterns according to pattern matching. The second converter 523 replaces a pixel disposed on the upper side when viewing the sheet of FIG. 17D out of the two pixels matching the specific patterns with a pixel pattern (the pixel pattern g illustrated in FIG. 16) corresponding to the matching pattern. In addition, the second converter 523 replaces a pixel disposed on the lower side when viewing the sheet of FIG. 17D out of the two pixels matching the specific patterns with a pixel pattern (the pixel pattern a illustrated in FIG. 16) corresponding to the matching pattern.

In FIGS. 17A to 17D, for the remaining four pixels not matching a specific pattern, a corresponding matching signal represents that each of the pixels is not a pixel configuring an edge of a thin line or the like, and thus, the resolution converting process is performed by the first converter 521 of the resolution converting path 531, and the resolution of each of the pixels is increased to be the second resolution.

As above, in the case illustrated in FIGS. 17A to 17D, in an edge portion, black pixels corresponding to six pixels are removed (converted into white pixels) in units of the second resolution, whereby thinning is performed.

FIGS. 18A to 18D illustrate an example in which black pixels corresponding to seven pixels in an edge portion are removed (converted into white pixels) in units of the second resolution, and thus, the edge portion is thinned. In the case illustrated in FIG. 18A, two pixels disposed in the middle of six pixels of a partial image (first resolution) of which the left side is an edge are respectively replaced by the pixel patterns a and c illustrated in FIG. 16. In the case illustrated in FIG. 18B, two pixels disposed in the middle of six pixels of a partial image (first resolution) of which the right side is an edge are respectively replaced by the pixel patterns e and a illustrated in FIG. 16. In the case illustrated in FIG. 18C, two pixels disposed in the middle of six pixels of a partial image (first resolution) of which the upper side is an edge are respectively replaced by the pixel patterns a and d illustrated in FIG. 16. In the case illustrated in FIG. 18D, two pixels disposed in the middle of six pixels of a partial image (first resolution) of which the lower side is an edge are respectively replaced by the pixel patterns b and a illustrated in FIG. 16.

In the case illustrated in FIGS. 19A to 19D, in an edge portion disposed in the horizontal direction when viewing the sheet, black pixels corresponding to six pixels are removed (converted into white pixels) in units of the second resolution, and, in an edge portion disposed in the vertical direction when viewing the sheet, black pixels corresponding to seven pixels are removed (converted into white pixels) in units of the second resolution, and thus, the edge portion is thinned. In the case illustrated in FIG. 19A, two pixels disposed in the middle of six pixels of a partial image (first resolution) of which the left side is an edge are respectively replaced with the pixel patterns a and h illustrated in FIG. 16. In the case illustrated in FIG. 19B, two pixels disposed in the middle of six pixels of a partial image (first resolution) of which the right side is an edge are respectively replaced with the pixel patterns f and a illustrated in FIG. 16. In the case illustrated in FIG. 19C, two pixels disposed in the middle of six pixels of a partial image (first resolution) of which the upper side is an edge are respectively replaced with the pixel patterns a and d illustrated in FIG. 16. In the case illustrated in FIG. 19D, two pixels disposed in the middle of six pixels of a partial image (first resolution) of which the lower side is an edge are respectively replaced with the pixel patterns b and a illustrated in FIG. 16. In this way, by associating a different image pattern as a pixel pattern replacing the target pixel with each pattern used for pattern matching, for example, as illustrated in FIGS. 19A to 19D, the intensity of thinning can be increased or decreased in the vertical direction and the horizontal direction.

<Flow of Image Processing of High-Resolution Processor>

FIGS. 20A to 20D are diagrams that illustrate an example of the operation of image processing (without inversion) of the high-resolution processor according to the first embodiment. FIGS. 21A to 21D are diagrams that illustrate an example of the operation of image processing (with inversion) of the high-resolution processor according to the first embodiment. The flow of the whole image processing of the high-resolution processor 351 will be described with reference to FIGS. 20A to 21D.

First, the operation performed in a case where an inversion signal is not input from the outside to the input image inverter 500 and the output image inverter 540 of the high-resolution processor 351 will be described with reference to FIGS. 20A to 20D. Since an inversion signal is not input from the outside, the input image inverter 500 of the high-resolution processor 351 does not perform an inversion process for image data 1000 ("input image data" illustrated in FIG. 20A) having the first resolution (2,400 dpi) output from the image processing unit 320 but sends the original image data (image data 1001 illustrated in FIG. 20B) to the thinning processor 520. Since an inversion process is not performed for the image data 1000, as illustrated in FIG. 20B, in the image data 1001, among pixels of the image data 1000, white pixels having a pixel value of "0" remain to be white pixels, and black pixels having a pixel value of "1" remain to be black pixels.

The thinning processor 520 of the high-resolution processor 351 performs a thinning process for the image data 1001 received from the input image inverter 500. As described above, for an edge portion of black pixels of the image data 1001, as a result of pattern matching using the thinning path 532, a resolution converting process and image processing of thinning are performed, and the data is converted into image data 1002 ("image data after conversion" illustrated in FIG. 20C) having the second resolution (4,800 dpi). The thinning processor 520 sends the image data 1002 converted from the image data 1001 by the thinning process to the output image inverter 540. In the example illustrated in FIG. 20C, an edge portion of black pixels corresponding to seven pixels is removed (converted into white pixels) in units of the second resolution and is thinned.

Since an inversion signal is not input from the outside, the output image inverter 540 of the high-resolution processor 351 does not perform an inversion process for the image data 1002 but outputs the original image data (image data 1003 illustrated in FIG. 20D) to the pulse generator 352.

As above, in the high-resolution processor 351, in a case where an inversion signal is not input, only the thinning process of the thinning processor 520 substantially functions, and, comparing the image data 1000 and the image data 1003 with each other, an edge portion of a black line or a black character is thinned. On the other hand, in a case where an image illustrated in FIG. 20A represents an edge portion of a white line, a white character, or the like, comparing the image data 1000 and the image data 1003 with each other, an edge portion of a white line, a white character, or the like is substantially thickened by the thinning process of the thinning processor 520.

Next, the operation performed in a case where an inversion signal is input from the outside to the input image inverter 500 and the output image inverter 540 of the high-resolution processor 351 will be described with reference to FIGS. 21A to 21D. Since the inversion signal is input from the outside, the input image inverter 500 of the high-resolution processor 351 performs an inversion process for image data 1000 ("input image data" illustrated in FIG. 21A) having the first resolution (2,400 dpi) output from the image processing unit 320 and sends the inverted image data 1001*a* ("input image data (inverted)" illustrated in FIG. 21B) to the thinning processor 520. In the image data 1001*a*, as illustrated in FIG. 21B, among pixels of the image data 1000, white pixels having a pixel value of "0" are inverted into black pixels, and black pixels having a pixel value of "1" are inverted into white pixels.

The thinning processor 520 of the high-resolution processor 351 performs a thinning process for the image data 1001*a* received from the input image inverter 500. As described above, for an edge portion of black pixels of the image data 1001*a*, as a result of pattern matching using the thinning path 532, a resolution converting process and image processing of thinning are performed, and accordingly, the edge portion is converted into image data 1002*a* ("image data after conversion" illustrated in FIG. 21C) having the second resolution (4,800 dpi). The thinning processor 520 sends the image data 1002*a* converted from image data 1001*a* by the thinning process to the output image inverter 540. In the example illustrated in FIG. 21C, an edge portion of black pixels, which are white pixels before the inversion process, corresponding to seven pixels is removed (converted into white pixels) in units of the second resolution and thus is thinned.

Since an inversion signal is input from the outside, the output image inverter 540 of the high-resolution processor 351 performs an inversion process for the image data 1002*a* and outputs inverted image data 1003*a* ("output image data (inverted)" illustrated in FIG. 21D) to the pulse generator 352.

As above, in the high-resolution processor 351, in a case where an inversion signal is input, the inversion processes of the input image inverter 500 and the output image inverter 540 function, and the thinning process of the thinning processor 520 functions. Thus, comparing the image data 1000 and the image data 1003*a* with each other, as a result, an edge portion of a black line, a black character, or the like is thickened. On the other hand, in a case where the image illustrated in FIG. 21A represents an edge portion of a white line, a white character, or the like, comparing the image data 1000 and the image data 1003*a* with each other, by performing the inversion processes of the input image inverter 500 and the output image inverter 540 and a thinning process of the thinning processor 520, an edge portion of a white line, a white character, or the like is substantially thinned.

As above, in this embodiment, in addition to the thinning processor 520 having the functions of the resolution converting process and a thinning process of thinning an edge portion of a black line, a character, or the like, the input image inverter 500 and the output image inverter 540 each having the function of the inversion process are included on the former stage side and the later stage side of the thinning processor 520. Accordingly, in a case where an inversion signal is not input, a black line, a black character, or the like can be thinned, and a white line, a white character, or the like can be thickened. On the other hand, in a case where an inversion signal is input, a black line, a black character, or the like can be thickened, and a white line, a white character, or the like can be thinned. Accordingly, the improvement of reproducibility of thin lines and the improvement of reproducibility of characters can be realized.

In addition, the function of the thinning processor 520 having the function of the thinning process is not changed but is used as it is, and the input image inverter 500 and the output image inverter 540 each having the function of the inversion process are included on the former stage side and the later stage side. Accordingly, an increase in the circuit scale of the thinning processor 520 can be suppressed.

In addition, by controlling the input of an inversion signal to the high-resolution processor 351, switching between thinning or thickening of black lines and thinning or thickening of white lines can be performed, and accordingly, the practical use of the image forming apparatus 1 can be improved.

Modified Example

Figure 22:
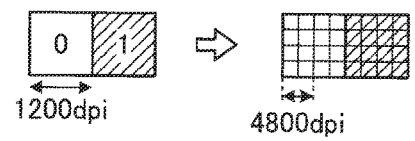
FIG. 22 is a diagram that illustrates the operation of a resolution converting process of a thinning processor according to a modified example of the first embodiment.

FIG. 22 is a diagram that illustrates the operation of a resolution converting process of a thinning processor according to a modified example of the first embodiment. FIGS. 23A to 23D are diagrams that illustrate an example of the operation of image processing of a thinning path according to a modified example of the first embodiment. The resolution converting process of the thinning processor 520 according to the modified example of this embodiment and the image processing of the thinning path 532 will be described with reference to FIGS. 22 to 23D.

In the first embodiment described above, as illustrated in FIG. 12, in the resolution converting processes of the first converter 521 of the resolution converting path 531 of the thinning processor 520 and the second converter 523 of the thinning path 532, the operation of converting the image data having the first resolution of 2,400 dpi into the image data having the second resolution of 4,800 dpi has been described. However, the first resolution and the second resolution are not respectively limited to 2,400 dpi and 4,800 dpi as described above, but, for example, as illustrated in FIG. 22, the first resolution may be 1,200 dpi, and the second resolution may be 4,800 dpi. In other words, in the example illustrated in FIG. 22, the second resolution is four times the resolution of the first resolution.

In addition, as described above, the second converter 523 of the thinning path 532 converts a target pixel of image data having the first resolution into a pixel pattern having the second resolution based on a matching signal received from the pattern matcher 522. In other words, the second converter 523 performs the resolution converting process of increasing the resolution of the image data having the first resolution to be the resolution of the image data having the second resolution and performs image processing of thinning by converting the target pixel into a pixel pattern. More specifically, in a case where a matching signal represents that the target pixel is a pixel configuring an edge (a corner or a contour) of a thin line or the like, the second converter 523 increases the resolution by converting the target pixel of the image data having the first resolution into a pixel pattern corresponding to a pattern represented by the matching signal and performs image processing of thinning.

Figure 23A:
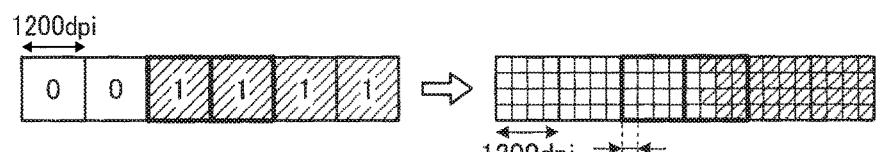
FIGS. 23A to 23D are diagrams that illustrate an example of the operation of image processing of a thinning path according to the modified example of the first embodiment.
Figure 23B:
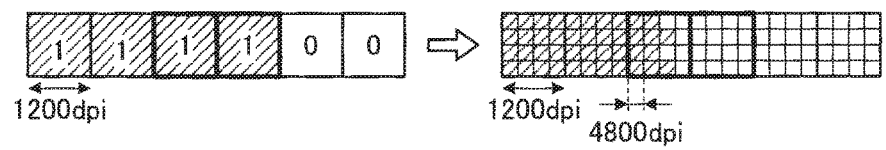
Figure 23C:
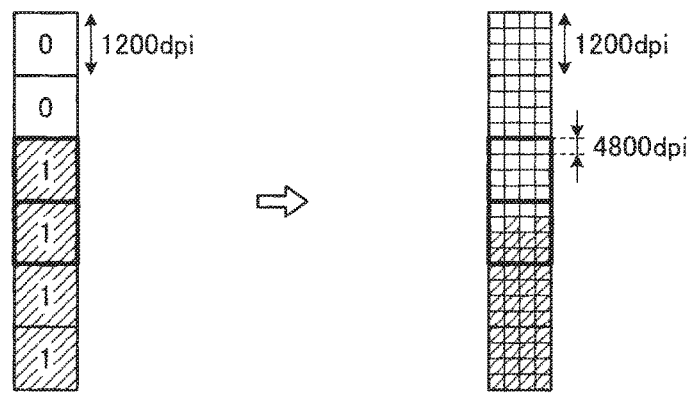
Figure 23D:
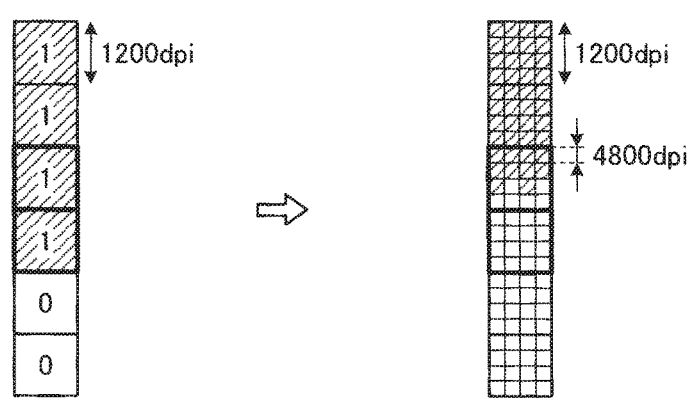

For example, FIG. 23A illustrates a partial image (first resolution) in which the left side is an edge, and it is assumed that two pixels disposed in the middle of six pixels are pixels matching specific patterns according to pattern matching. In addition, FIG. 23B illustrates a partial image (first resolution) in which the right side is an edge, and it is assumed that two pixels disposed in the middle of six pixels are pixels matching specific patterns according to pattern matching. Furthermore, FIG. 23C illustrates a partial image (first resolution) in which the upper side is an edge, and it is assumed that two pixels disposed in the middle of six pixels are pixels matching specific patterns according to pattern matching. In addition, FIG. 23D illustrates a partial image (first resolution) in which the lower side is an edge, and it is assumed that two pixels disposed in the middle of six pixels are pixels matching specific patterns according to pattern matching. The second converter 523 respectively replaces the two pixels matching the specific patterns into pixel patterns, which have the second resolution, corresponding to the patterns.

In addition, in FIGS. 23A to 23D, for each of the remaining four pixels not matching a specific pattern, a corresponding matching signal represents that the pixel is not a pixel configuring an edge of a thin line or the like, and accordingly, the resolution converting process is performed by the first converter 521 of the resolution converting path 531, and the resolution of the pixels is increased to be the second resolution (4,800 dpi).

As above, in the case illustrated in FIGS. 23A to 23D, in an edge portion, black pixels corresponding to 22 pixels are removed (converted into white pixels) in units of the second resolution, and the edge portion is thinned. As in the example illustrated in FIG. 23, for example, by raising the level of an increase in the resolution from the first resolution, the intensity of thinning or thickening can be finely set, and accordingly, the reproducibility of thin lines and the reproducibility of characters can be further improved. On the other hand, by lowering the degree of an increase in the resolution from the first resolution, the amount of data can be decreased, and the load of the subsequent process can be reduced.

Second Embodiment

An image forming apparatus according to a second embodiment will be described with points different from the image forming apparatus 1 according to the first embodiment focused on. In the first embodiment, the image processing for image data in which one pixel is one bit has been described as the image processing of the high-resolution processor 351. In this embodiment, image processing for image data in which, in addition to one bit representing whether one pixel is a black pixel or a white pixel, a bit representing the attribute of the pixel is added will be described. The whole configuration of the image forming apparatus and the configuration of a light scanning apparatus according to this embodiment are similar to those according to the first embodiment.

(Configuration of Light Source Control Apparatus)

Figure 24:
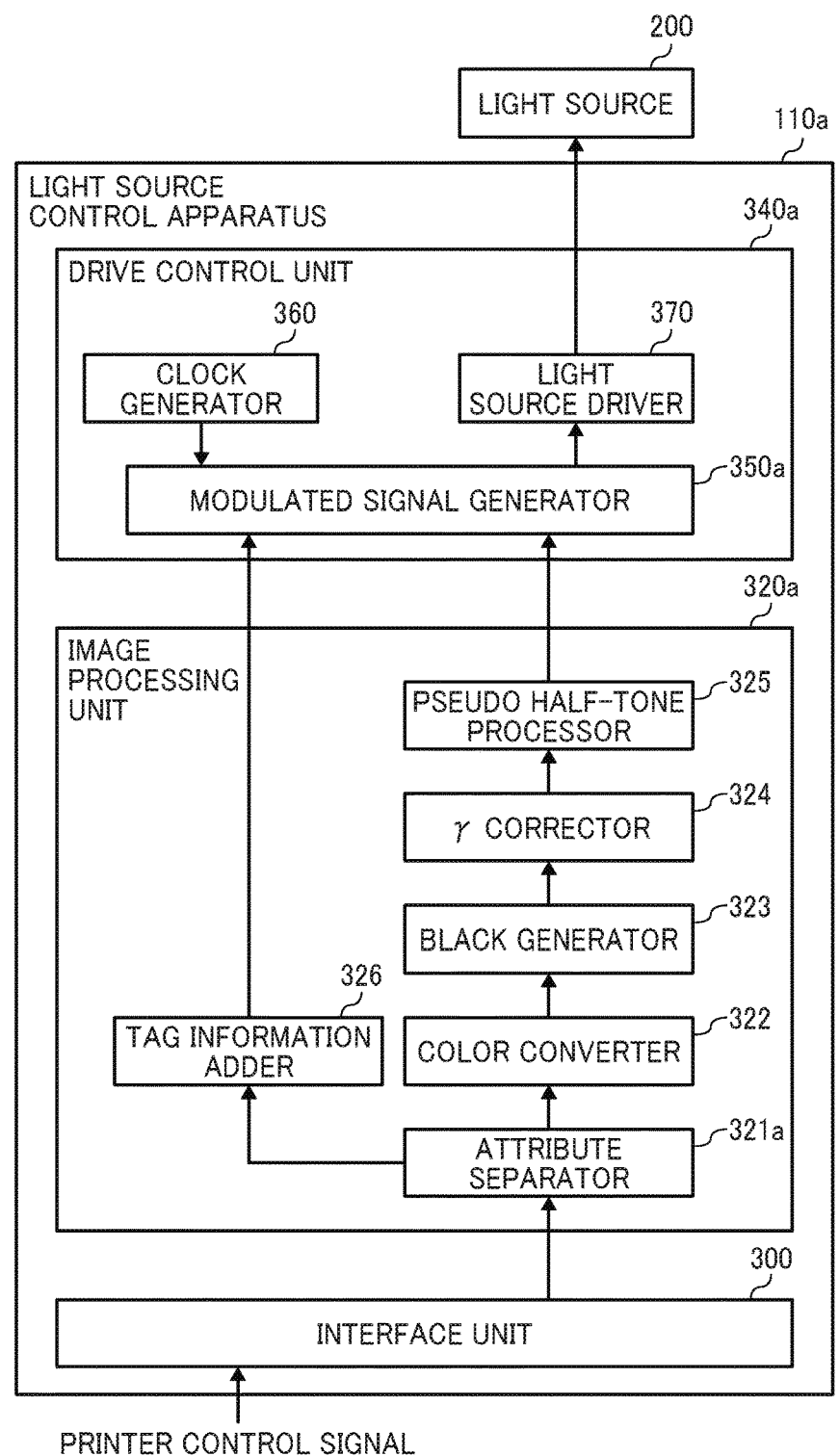
FIG. 24 is a diagram that illustrates an example of the configuration of functional blocks of a light source control apparatus according to a second embodiment.

FIG. 24 is a diagram that illustrates an example of the configuration of functional blocks of the light source control apparatus according to a second embodiment. The configuration of the functional blocks of the light source control apparatus 110a according to this embodiment will be described with reference to FIG. 24.

As illustrated in FIG. 24, the light source control apparatus 110a includes: an interface unit 300; an image processing unit 320a (processor); and a drive control unit 340a. The hardware configuration and the function of the interface unit 300 are similar to those of the interface unit 300 according to the first embodiment illustrated in FIG. 7.

The image processing unit 320a is a unit that, for example, has a resolution of 2,400 dpi and performs various kinds of image processing for image data that is multi-bit data input from the interface unit 300. The image processing unit 320a, for example, converts image data (for example, image data represented in an RGB format) input from the interface unit 300 into image data (for example, image data represented in a CMYK format) of colors corresponding to a print system. In addition, the image processing unit 320a includes tag information in the image data based on attribute information added to input image data. The image processing unit 320a, as illustrated in FIG. 24, includes an attribute separator 321a, a color converter 322, a black generator 323, a γ corrector 324, a pseudo half-tone processor 325, and a tag information adder 326. The functions of the color converter 322, the black generator 323, the γ corrector 324, and the pseudo half-tone processor 325 are similar to those described in the first embodiment.

The attribute separator 321a is a functional unit that separates attribute information added to image data input from the interface unit 300. The attribute information, for example, as described above, is information that represents the attribute of the pixel such as a "character", a "line", a "figure", or a "photograph". The attribute separator 321a sends the image data from which the attribute information is separated to the color converter 322 and sends the separated attribute information to the tag information adder 326.

The tag information adder 326 generates tag information based on the attribute information separated by the attribute separator 321a and includes tag information in each pixel of image data. In this way, for example, by including tag information representing a character, a background, or the like in the image data, image processing can be performed for a pixel corresponding to the tag information based on a content represented by the tag information. The tag information may be configured by multiple bits and represent a plurality of attributes. However, hereinafter, the tag information is assumed to be configured by one bit, and it is assumed in the description that a corresponding pixel represents a character in a case where the tag information is "1", and a corresponding pixel represents an object (for example, a background or the like) other than a character in a case where the tag information is "0". In other words, image data in which tag information is included by the tag information adder 326 will be described as image data including information of two bits that includes image information (a black pixel or a white pixel) of one bit and tag information of one bit in one pixel.

The tag information adder 326 transmits image data including tag information to the drive control unit 340a. More specifically, the tag information adder 326 may include tag information generated based on the attribute information separated from the image data by the attribute separator 321a in the image data generated by the pseudo half-tone processor 325.

Here, while the tag information adder 326 has been described to generate image data configured by each pixel of multiple bits including tag information in the pixel of the image data, the image data is not limited thereto. For example, image processing may be separately performed for image data configured by only an image component (image information) other than tag information and data configured by pixels each having tag information corresponding to each pixel of the image data as a pixel value.

Each functional unit of the image processing unit 320a illustrated in FIG. 24, for example, is achieved by a hardware circuit such as an ASIC or an FPGA.

Here, the attribute separator 321a, the color converter 322, the black generator 323, the γ corrector 324, the pseudo half-tone processor 325, and the tag information adder 326 conceptually represent the functions, but the configurations are not limited thereto. For example, a plurality of the functional units illustrated as independent functional units of the image processing unit 320a illustrated in FIG. 24 may be configured as one functional unit. On the other hand, the function of one functional unit of the image processing unit 320a illustrated in FIG. 24 may be divided into a plurality of parts to be configured as the functions of a plurality of functional units.

The drive control unit 340a receives image data including tag information for which image processing has been performed from the image processing unit 320a, generates a modulated pulse signal according to the drive of the light source 200, and drives the light source 200 by using a drive signal according to the modulated pulse signal to emit light. The drive control unit 340a, for example, is configured by a single integrated device that is formed as one chip disposed near each light source 200. The drive control unit 340a, as illustrated in FIG. 24, includes a modulated signal generator 350a, a clock generator 360, and a light source driver 370. Here, the functions of the clock generator 360 and the light source driver 370 are similar to those described in the first embodiment.

The modulated signal generator 350a generates a modulated pulse signal used for driving the light source 200. More specifically, the modulated signal generator 350a, in the process of generating a modulated pulse signal, divides image data, which includes the tag information, having a resolution (first resolution) of M received from the image processing unit 320a in the main-scanning direction and the sub-scanning direction to increase the resolution to be a resolution (second resolution) of N. In addition, the modulated signal generator 350a finds write start timing based on an output signal of a synchronization detecting sensor not illustrated in the drawing for each image forming station. Then, the modulated signal generator 350a superimposes dot data of the emitter of the light source 200 in a pixel clock signal supplied from the clock generator 360 in accordance with the write start timing and generates a modulated pulse signal that is independent for each light emitter based on information from the image processing unit 320a or the like.

(Image Processing of High-Resolution Processor)

Hereinafter, the image processing of the high-resolution processor 351 of the modulated signal generator 350a of the light source control apparatus 110a according to this embodiment will be described with reference to FIGS. 25A to 32D. In FIGS. 25A to 32D, the first resolution is assumed to be 2,400 dpi, and the second resolution is assumed to be 4,800 dpi in the description.

<Resolution Converting Process>

Figure 25A:
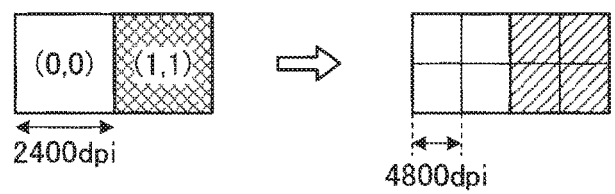
FIGS. 25A and 25B are diagrams that illustrate the operation of a resolution converting process of a thinning processor according to the second embodiment.
Figure 25B:
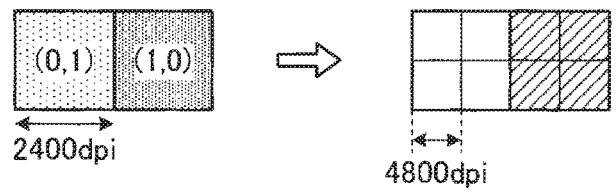

FIGS. 25A and 25B are diagrams that illustrate the operation of the resolution converting process of the thinning processor according to the second embodiment. In the thinning process of the thinning processor 520 of the high-resolution processor 351, a resolution converting process performed by the first converter 521 of the resolution converting path 531 will be described as an example with reference to FIGS. 25A and 25B.

The first converter 521 of the resolution converting path 531 performs a resolution converting process of converting image data having the first resolution (2,400 dpi) received from the input image inverter 500 into image data having the second resolution (4,800 dpi) higher than the first resolution. More specifically, the first converter 521, as illustrated in FIG. 25A, divides a pixel (hereinafter, may be simply referred to as a "pixel having a pixel value of (0, 0)") of which a pixel value relating to image information is "0", and a pixel value relating to tag information is "0" in the image data having the first resolution (2,400 dpi) into a total of four pixels including vertical two pixels×horizontal two pixels to be the second resolution (4,800 dpi) and converts the pixel into only pixels of a pixel value of "0" relating to image information by removing the tag information of each pixel. Similarly, the first converter 521, as illustrated in FIG. 25A, divides a pixel (hereinafter, may be simply referred to as a "pixel having a pixel value of (1, 1)") of which a pixel value relating to image information is "1", and a pixel value relating to tag information is "1" in the image data having the first resolution (2,400 dpi) into a total of four pixels including vertical two pixels×horizontal two pixels to be the second resolution (4,800 dpi) and converts the pixel into only pixels of a pixel value of "1" relating to image information by removing the tag information of each pixel.

In addition, the first converter 521, as illustrated in FIG. 25B, divides a pixel (hereinafter, may be simply referred to as a "pixel having a pixel value of (0, 1)") of which a pixel value relating to image information is "0", and a pixel value relating to tag information is "1" in the image data having the first resolution (2,400 dpi) into a total of four pixels including vertical two pixels×horizontal two pixels to be the second resolution (4,800 dpi) and converts the pixel into only pixels of a pixel value of "0" relating to image information by removing the tag information of each pixel. Similarly, the first converter 521, as illustrated in FIG. 25B, divide a pixel (hereinafter, may be simply referred to as a "pixel having a pixel value of (1, 0)") of which a pixel value relating to image information is "1", and a pixel value relating to tag information is "0" in the image data having the first resolution (2,400 dpi) into a total of four pixels including vertical two pixels×horizontal two pixels to be the second resolution (4,800 dpi) and converts the pixels into only pixels of a pixel value of "1" relating to image information by removing the tag information of each pixel.

In addition, also the process of the second converter 523 of the thinning path 532 performed in a case where the matching signal represents that a target pixel is not a pixel configuring an edge of a thin line or the like is similar to the resolution converting process performed by the first converter 521.

<Inversion Process>

Figure 26:
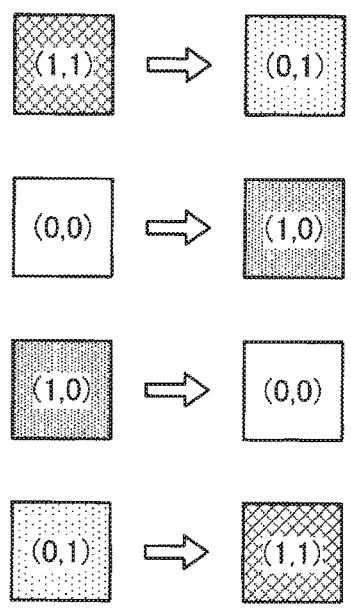
FIG. 26 is a diagram that illustrates the operation of an inversion process of a high-resolution processor according to the second embodiment.

FIG. 26 is a diagram that illustrates the operation of an inversion process of the high-resolution processor according to the second embodiment. The inversion process of the input image inverter 500 and the output image inverter 540 of the high-resolution processor 351 will be described with reference to FIG. 26.

The input image inverter 500 performs an inversion process for image data of two bits having the first resolution output from the image processing unit 320a in a case where an inversion signal is input from the outside. In the inversion process of the image data of this case, a pixel value is converted into "1" (black pixel) in a case where the pixel value relating to image information is "0" (white pixel), and a pixel value is converted into "0" (white pixel) in a case where the pixel value relating to image information is "1" (black pixel), and a pixel value relating to the tag information remains as it is. In other words, as illustrated in FIG. 26, a pixel (a black pixel and a black character) having a pixel value of (1, 1) is converted into a pixel (a white pixel and a white character) having a pixel value of (0, 1), and a pixel (other than a white pixel and a white character) having a pixel value of (0, 0) is converted into a pixel (other than a black pixel and a black character) having a pixel value of (1, 0). In addition, as illustrated in FIG. 26, a pixel (other than a black pixel and a black character) having a pixel value of (1, 0) is converted into a pixel (other than a white pixel and a white character) having a pixel value of (0, 0), and a pixel (a white pixel and a white character) having a pixel value of (0, 1) is converted into a pixel (a black pixel and a black character) having a pixel value of (1, 1).

The input image inverter 500 sends the image data of two bits having the first resolution output from the image processing unit 320a to the thinning processor 520 without any change in a case where an inversion signal is not input from the outside and sends image data acquired by performing the inversion process described above for the image data having the first resolution to the thinning processor 520 in a case where an inversion signal is input.

In addition, the inversion process of the output image inverter 540 is similar to the inversion process of the input image inverter 500 described above.

<Thinning Process>

FIGS. 27A to 28D are diagrams that illustrate examples of the operation of image processing of the thinning path according to the second embodiment. In the thinning process of the thinning processor 520 of the high-resolution processor 351, the operation of the image processing of the thinning path 532 will be focused in description with reference to FIGS. 27A to 28D.

The pattern matcher 522 of the thinning path 532 determines whether or not a target pixel of the image data is a pixel configuring an edge (a corner or a contour) of a thin line or the like based on the arrangement of pixels of the image data having the first resolution (2,400 dpi) received from the input image inverter 500. More specifically, the pattern matcher 522 acquires an image matrix (for example, the partial image having a size of 9×9 illustrated in FIG. 14 described above) that is a partial image having a target pixel as its center from the image data having the first resolution. Then, the pattern matcher 522, by performing pattern matching between each of various patterns stored in a buffer memory not illustrated in the drawing and the acquired image matrix, determines whether or not the target pixel included in the image matrix is a pixel configuring an edge (a corner or a contour) of a thin line or the like. At this time, a pixel of each pattern stored in the buffer memory includes not only a pixel value relating to image information but also a pixel value ("0" or "1") relating to tag information. Accordingly, in the pattern matching using the pattern matcher 522, between the pattern and the image matrix, matching is performed for both pixel values relating to image information and pixel values relating to tag information. Accordingly, in the pattern matching, for each pixel of the image matrix, in a case where pixel values, which relate to image information, of pixels corresponding to pixels having pixel values of "0" and "1" relating to image information of a pattern and pixel values relating to tag information match each other, the image matrix is determined to match the pattern. In addition, the pattern matcher 522 sends a matching signal representing a result (for example, matching a specific pattern or no matching any pattern) of a determination according to the pattern matching and data of a target pixel that is a target for the pattern matching to the second converter 523.

The second converter 523 of the thinning path 532 converts the target pixel of the image data having the first resolution into a pixel pattern (for example, one of the pixel patterns a to n illustrated in FIG. 16 described above) having the second resolution based on the matching signal received from the pattern matcher 522. In other words, the second converter 523 performs a resolution converting process of increasing the resolution of the image data having the first resolution to be the resolution of the image data having the second resolution and performs image processing of thinning or thickening by converting the target pixel into a pixel pattern. More specifically, the second converter 523, in a case where the matching signal represents that a target pixel is a pixel configuring an edge (a corner or a contour) of a thin line or the like, by converting the target pixel of the image data having the first resolution into a pixel pattern corresponding to a pattern represented by the matching signal, increases the resolution and performs image processing of thinning or thickening. At this time, since only pixel values relating to image information are included in a pixel pattern, as a result, in image data after the image processing of thinning or thickening using the second converter 523, the tag information is removed.

In the example illustrated in FIGS. 27A to 27D, an example is illustrated in which, in an edge portion, black pixels corresponding to four pixels are removed (converted into white pixels) in units of the second resolution, and the edge portion is thinned. In addition, among six pixels illustrated in FIGS. 27A to 27D, four pixels have a pixel value (1, 1), and the remaining two pixels have a pixel value (0, 0), and accordingly, FIGS. 27A to 27D illustrate an "edge portion of a black character".

Figure 27A:
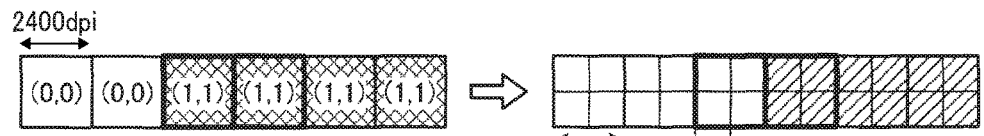
FIGS. 27A to 27D are diagrams that illustrate an example of the operation of image processing of a thinning path according to the second embodiment.
Figure 27B:
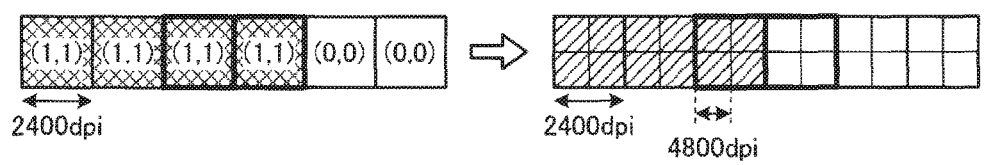
Figure 27C:
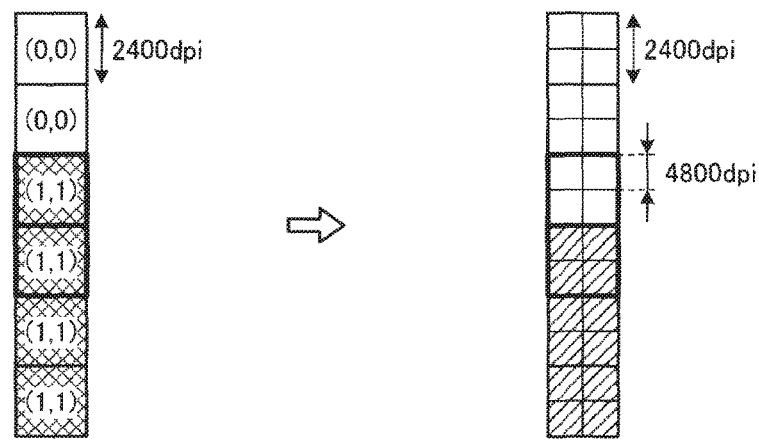
Figure 27D:
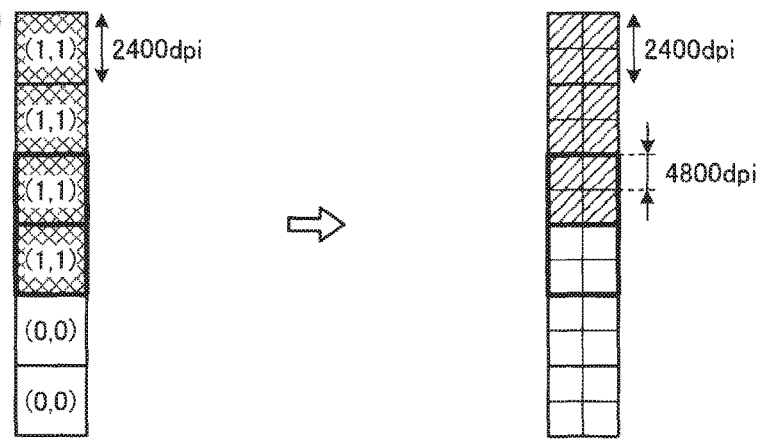

In the case illustrated in FIG. 27A, two pixels disposed in the middle of six pixels of a partial image (first resolution) of which the left side is an edge are respectively replaced by the pixel patterns a and n illustrated in FIG. 16. In the case illustrated in FIG. 27B, two pixels disposed in the middle of six pixels of a partial image (first resolution) of which the right side is an edge are respectively replaced by the pixel patterns n and a illustrated in FIG. 16. In the case illustrated in FIG. 27C, two pixels disposed in the middle of six pixels of a partial image (first resolution) of which the upper side is an edge are respectively replaced by the pixel patterns a and n illustrated in FIG. 16. In the case illustrated in FIG. 27D, two pixels disposed in the middle of six pixels of a partial image (first resolution) of which the lower side is an edge are respectively replaced by the pixel patterns n and a illustrated in FIG. 16.

In the case illustrated in FIGS. 28A to 28D, an example is illustrated in which, in an edge portion, black pixels corresponding to seven pixels are removed (converted into white pixels) in units of the second resolution, and the edge is thinned. Among six pixels illustrated in each of FIGS. 28A to 28D, four pixels have pixel values of (1, 0), and the remaining two pixels have pixel values of (0, 1), and accordingly, FIGS. 28A to 28D illustrate "an edge portion of a white character".

Figure 28A:
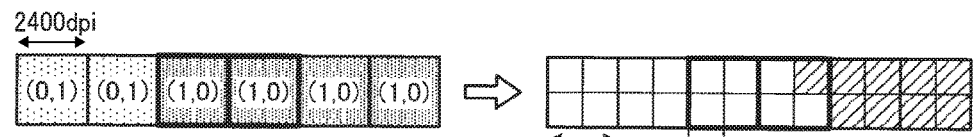
FIGS. 28A to 28D are diagrams that illustrate an example of the operation of image processing of a thinning path according to the second embodiment.
Figure 28B:
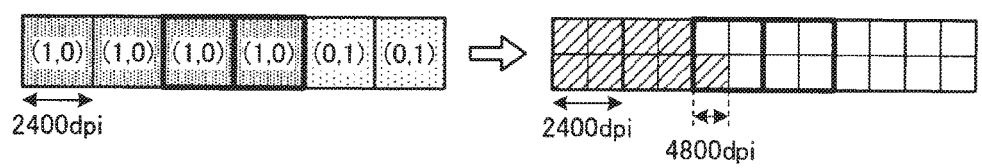
Figure 28C:
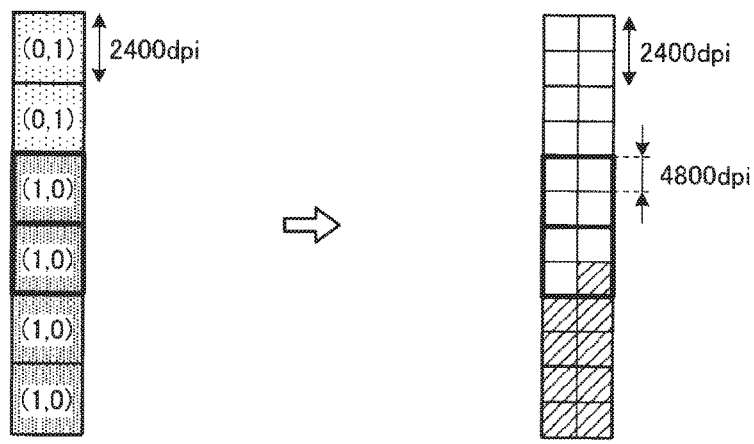
Figure 28D:

In the case illustrated in FIG. 28A, two pixels disposed in the middle of six pixels of a partial image (first resolution) of which the right side is an edge (an edge of a white character) are respectively replaced with the pixel patterns a and c illustrated in FIG. 16. In the case illustrated in FIG. 28B, two pixels disposed in the middle of six pixels of a partial image (first resolution) of which the left side is an edge (an edge of a white character) are respectively replaced with the pixel patterns e and a illustrated in FIG. 16. In the case illustrated in FIG. 28C, two pixels disposed in the middle of six pixels of a partial image (first resolution) of which the lower side is an edge (an edge of a white character) are respectively replaced with the pixel patterns a and d illustrated in FIG. 16. In the case illustrated in FIG. 28D, two pixels disposed in the middle of six pixels of a partial image (first resolution) of which the upper side is an edge (an edge of a white character) are respectively replaced with the pixel patterns b and a illustrated in FIG. 16. As a result, in the image processing of the thinning path 532 illustrated in FIG. 28, image processing of thickening the white character is performed.

In FIGS. 27A to 28D, for the remaining four pixels not matching a specific pattern, a corresponding matching signal represents that each of the pixels is not a pixel configuring an edge of a thin line or the like, and thus, the resolution converting process is performed by the first converter 521 of the resolution converting path 531, and the resolution of each of the pixels is increased to be the second resolution.

<Flow of Image Processing of High-Resolution Processor>

FIGS. 29A to 30D are diagrams that illustrate an example of the operation of image processing (without inversion) of the high-resolution processor according to the second embodiment. FIGS. 31A to 32D are diagrams that illustrate an example of the operation of image processing (with inversion) of the high-resolution processor according to the second embodiment. The flow of the whole image processing of the high-resolution processor 351 will be described with reference to FIGS. 29A to 32D.

First, the operation performed in a case where an inversion signal is not input from the outside to the input image inverter 500 and the output image inverter 540 of the high-resolution processor 351 will be described with reference to FIGS. 29A to 29D. Since an inversion signal is not input from the outside, the input image inverter 500 of the high-resolution processor 351 does not perform an inversion process for image data 1100 ("input image data" illustrated in FIG. 29A) having the first resolution (2,400 dpi) output from the image processing unit 320a but sends the original image data (image data 1101 illustrated in FIG. 29B) to the thinning processor 520. Since an inversion process is not performed for the image data 1100, as illustrated in FIG. 29, in the image data 1101, among pixels of the image data 1100, white pixels (other than a character) having a pixel value of (0, 0) remain to be white pixels (other than a character), and black pixels (character) having a pixel value of (1, 1) remain to be black pixels (character).

The thinning processor 520 of the high-resolution processor 351 performs a thinning process for the image data 1101 received from the input image inverter 500. As described above, for an edge portion of black pixels of the image data 1101, as a result of pattern matching using the thinning path 532, a resolution converting process and image processing of thinning are performed, and the data is converted into image data 1102 ("image data after conversion" illustrated in FIG. 29C) having the second resolution (4,800 dpi). The thinning processor 520 sends the image data 1102 converted from the image data 1101 by the thinning process to the output image inverter 540. In the example illustrated in FIG. 29C, an edge portion of black pixels corresponding to four pixels is removed (converted into white pixels) in units of the second resolution and is thinned.

Since an inversion signal is not input from the outside, the output image inverter 540 of the high-resolution processor 351 does not perform an inversion process for the image data 1102 but outputs the original image data (image data 1103 illustrated in FIG. 29D) to the pulse generator 352.

As above, in the high-resolution processor 351, in a case where an inversion signal is not input, only the thinning process of the thinning processor 520 substantially functions, and, comparing the image data 1100 and the image data 1103 with each other, an edge portion of a black line or a black character is thinned.

Next, the operation performed in a case where an inversion signal is not input from the outside to the input image inverter 500 and the output image inverter 540 of the high-resolution processor 351 will be described with reference to FIGS. 30A to 30D. Since an inversion signal is not input from the outside, the input image inverter 500 of the high-resolution processor 351 does not perform an inversion process for image data 1110 ("input image data" illustrated in FIG. 30A) having the first resolution (2,400 dpi) output from the image processing unit 320a but sends the original image data (image data 1111 illustrated in FIG. 30B) to the thinning processor 520. Since an inversion process is not performed for the image data 1110, as illustrated in FIG. 30B, in the image data 1111, among pixels of the image data 1110, black pixels (other than a character) having a pixel value of (1, 0) remain to be black pixels (other than a character), and white pixels (character) having a pixel value of (0, 1) remain to be white pixels (character).

The thinning processor 520 of the high-resolution processor 351 performs a thinning process for the image data 1111 received from the input image inverter 500. As described above, for an edge portion of black pixels of the image data 1111, as a result of pattern matching using the thinning path 532, a resolution converting process and image processing of thinning are performed, and the data is converted into image data 1112 ("image data after conversion" illustrated in FIG. 30C) having the second resolution (4,800 dpi). The thinning processor 520 sends the image data 1112 converted from the image data 1111 by the thinning process to the output image inverter 540. In the example illustrated in FIG. 30C, an edge portion of black pixels corresponding to seven pixels is removed (converted into white pixels) in units of the second resolution and is thinned.

Since an inversion signal is not input from the outside, the output image inverter 540 of the high-resolution processor 351 does not perform an inversion process for the image data 1112 but outputs the original image data (image data 1113 illustrated in FIG. 30D) to the pulse generator 352.

As above, in the high-resolution processor 351, in a case where an inversion signal is not input, only the thinning process of the thinning processor 520 substantially functions, and, comparing the image data 1110 and the image data 1113 with each other, substantially, edge portions of white lines, white characters, and the like are thickened.

Next, the operation performed in a case where an inversion signal is input from the outside to the input image inverter 500 and the output image inverter 540 of the high-resolution processor 351 will be described with reference to FIGS. 31A to 31D. Since the inversion signal is input from the outside, the input image inverter 500 of the high-resolution processor 351 performs an inversion process for image data 1100 ("input image data" illustrated in FIG. 31A) having the first resolution (2,400 dpi) output from the image processing unit 320a and sends the inverted image data 1101a ("input image data (inverted)" illustrated in FIG. 31B) to the thinning processor 520. In the image data 1101a, as illustrated in FIG. 31(b), among pixels of the image data 1100, white pixels (other than a character) having a pixel value of (0, 0) are inverted into black pixels (other than a character), and black pixels (character) having a pixel value of (1, 1) are inverted into white pixels (character).

The thinning processor 520 of the high-resolution processor 351 performs a thinning process for the image data 1101a received from the input image inverter 500. As described above, for an edge portion of black pixels of the image data 1101a, as a result of pattern matching using the thinning path 532, a resolution converting process and image processing of thinning are performed, and accordingly, the edge portion is converted into image data 1102a ("image data after conversion" illustrated in FIG. 31C) having the second resolution (4,800 dpi). The thinning processor 520 sends the image data 1102a converted from image data 1101a by the thinning process to the output image inverter 540. In the example illustrated in FIG. 31C, an edge portion of black pixels, which are white pixels before the inversion process, corresponding to seven pixels are removed (converted into white pixels) in units of the second resolution and thus is thinned.

Since an inversion signal is input from the outside, the output image inverter 540 of the high-resolution processor 351 performs an inversion process for the image data 1102a and outputs inverted image data 1103a ("output image data (inverted)" illustrated in FIG. 31D) to the pulse generator 352.

As above, in the high-resolution processor 351, in a case where an inversion signal is input, the inversion processes of the input image inverter 500 and the output image inverter 540 function, and the thinning process of the thinning processor 520 functions. Thus, comparing the image data 1100 and the image data 1103a with each other, as a result, an edge portion of a black line, a black character, or the like is thickened.

Next, the operation performed in a case where an inversion signal is input from the outside to the input image inverter 500 and the output image inverter 540 of the high-resolution processor 351 will be described with reference to FIGS. 32A to 32D. Since the inversion signal is input from the outside, the input image inverter 500 of the high-resolution processor 351 performs an inversion process for image data 1110 ("input image data" illustrated in FIG. 32A) having the first resolution (2,400 dpi) output from the image processing unit 320a and sends the inverted image data 1111a ("input image data (inverted)" illustrated in FIG. 32B) to the thinning processor 520. In the image data 1111a, as illustrated in FIG. 32B, among pixels of the image data 1110, black pixels (other than a character) having a pixel value of (1, 0) are inverted into white pixels (other than a character), and white pixels (character) having a pixel value of (0, 1) are inverted into black pixels (character).

The thinning processor 520 of the high-resolution processor 351 performs a thinning process for the image data 1111a received from the input image inverter 500. As described above, for an edge portion of black pixels of the image data 1111a, as a result of pattern matching using the thinning path 532, a resolution converting process and image processing of thinning are performed, and accordingly, the edge portion is converted into image data 1112a ("image data after conversion" illustrated in FIG. 32C) having the second resolution (4,800 dpi). The thinning processor 520 sends the image data 1112a converted from image data 1111a by the thinning process to the output image inverter 540. In the example illustrated in FIG. 32C, an edge portion of black pixels, which are white pixels before the inversion process, corresponding to four pixels are removed (converted into white pixels) in units of the second resolution and thus is thinned.

Since an inversion signal is input from the outside, the output image inverter 540 of the high-resolution processor 351 performs an inversion process for the image data 1112a and outputs inverted image data 1113a ("output image data (inverted)" illustrated in FIG. 32D) to the pulse generator 352.

As above, in the high-resolution processor 351, in a case where an inversion signal is input, the inversion processes of the input image inverter 500 and the output image inverter 540 function, and the thinning process of the thinning processor 520 functions. Thus, comparing the image data 1110 and the image data 1113a with each other, as a result, an edge portion of a white line, a white character, or the like is thinned.

As above, in this embodiment, in addition to the thinning processor 520 having the functions of the resolution converting process and a thinning process of thinning or thickening an edge portion of a line, a character, or the like, the input image inverter 500 and the output image inverter 540 each having the function of the inversion process are included on the former stage side and the later stage side of the thinning processor 520. In addition, in the thinning process, in each pixel configuring image data, tag information based on the attribute information is included, and pattern matching is performed not only for a pixel value relating to the image information but also for a pixel value relating to the tag information. In this way, by including the tag information in the image data, in a case where an inversion signal is not input, black lines can be thinned, and white lines can be thickened. On the other hand, in a case where an inversion signal is input, black lines can be thickened, and white lines can be thinned. In other words, by using the tag information, it can be clearly designated whether a character is to be thinned or thickened. Accordingly, the improvement of reproducibility of thin lines and the improvement of reproducibility of characters can be realized, and it can be designated whether characters are to be thinned or thickened by using the tag information.

In addition, for example, in the examples described with reference to FIGS. 29A to 30D, while the operation of thinning all the black pixels (black characters are thinned in the case illustrated in FIGS. 29A to 29D, and white characters are thickened in the case illustrated in FIGS. 30A to 30D), the meaning of the pixel (a character, other than a character, or the like) is different according to the tag information, and thus, the intensity of the thinning process can be changed based on the tag information. In addition, the intensity of thinning (or thickening) of characters or the like can be changed based on the tag information. In other words, since the intensity of thinning (or thickening) can be associated with the tag information, the setting of the intensity does not need to be changed in the middle of the process.

In addition, the function of the thinning processor 520 having the function of the thinning process is not changed but is used as it is, and the input image inverter 500 and the output image inverter 540 each having the function of the inversion process are included on the former stage side and the later stage side. Accordingly, an increase in the circuit scale of the thinning processor 520 can be suppressed.

Third Embodiment

An image forming apparatus according to a third embodiment will be described with points different from the image forming apparatus according to the second embodiment focused on. In the second embodiment, the operation of removing tag information in thinned or thickened image data by the thinning process performed by the high-resolution processor 351 for the image data configured by a pixel including a pixel value relating to the tag information in addition to a pixel value relating to image information has been described. In this embodiment, an example of the operation using the tag information for a process of a later stage without removing the tag information also after the thinning process will be described. The whole configuration of the image forming apparatus and the configuration of a light scanning apparatus according to this embodiment are similar to those according to the first embodiment.

(Configuration of Functional Block of Modulated Signal Generator)

Figure 33:
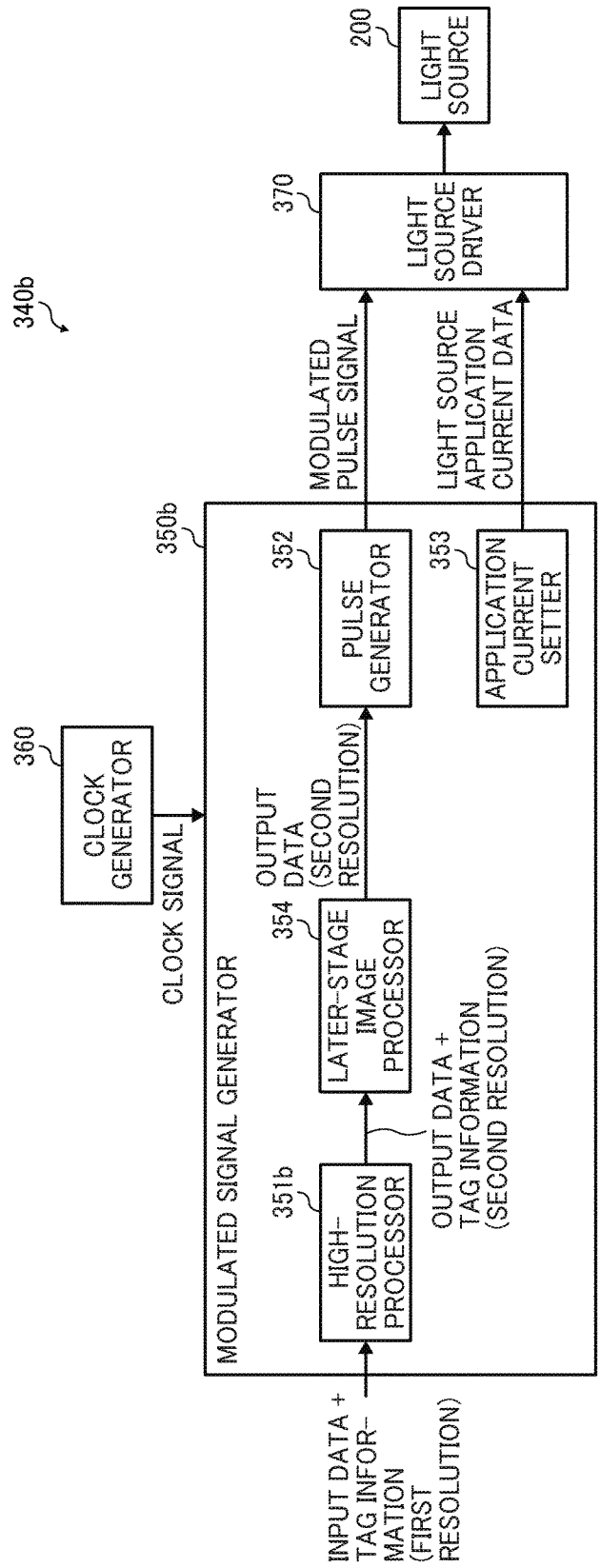
FIG. 33 is a diagram that illustrates an example of the configuration of functional blocks of a drive control unit of a light source control apparatus according to a third embodiment.

FIG. 33 is a diagram that illustrates an example of the configuration of functional blocks of a drive control unit of a light source control apparatus according to the third embodiment. The configuration of functional blocks of a modulated signal generator 350*b* of a drive control unit 340*b* included in the light source control apparatus according to this embodiment will be described with reference to FIG. 33. The light source control apparatus according to this embodiment has a configuration in which the drive control unit 340*a* is replaced by a drive control unit 340*b* (drive control device) in the configuration of the light source control apparatus 110*a* according to the second embodiment illustrated in FIG. 24.

As illustrated in FIG. 33, the modulated signal generator 350*b* of the drive control unit 340*b* includes: a high-resolution processor 351*b*; a pulse generator 352; an application current setter 353; and a later-stage image processor 354. Here, the functions of the pulse generator 352 and the application current setter 353 are similar to those described in the first embodiment. In addition, an "image processing apparatus" according to the present invention, for example, corresponds to the modulated signal generator 350*b* or the high-resolution processor 351*b*.

The high-resolution processor 351*b* increases the resolution (resolution converting process) of image data ("input data+tag information (first resolution) illustrated in FIG. 33) having the first resolution output from the image processing unit 320*a* to be the resolution of image data having resolution (second resolution) higher than the first resolution, sequentially selects target pixels from the image data having the first resolution, and, in a case where the target pixel is a pixel configuring an edge (a corner or a contour) of a thin line or the like, performs image processing of thinning or thickening. In this case, the high-resolution processor 351*b* does not remove the tag information included in the image data having the first resolution but converts the image data into image data having the second resolution. The high-resolution processor 351*b* sends the image data ("output data+tag information (second resolution)" illustrated in FIG. 33) having the second resolution including the tag information, for which the image processing has been performed, to the later-stage image processor 354. The high-resolution processor 351*b*, similarly to the high-resolution processor 351 illustrated in FIG. 9 described above, includes an input image inverter 500, a thinning processor 520, and an output image inverter 540. Here, the functions of the input image inverter 500 and the output image inverter 540 are similar to those described in the second embodiment.

The later-stage image processor 354 receives image data having the second resolution from the high-resolution processor 351*b* and performs image processing (hereinafter, may be referred to as "later-stage image processing") by using the tag information included in the image data. The later-stage image processor 354 sends the image data (second resolution) for which the later-stage image processing has been performed to the pulse generator 352. An example of the later-stage image processing will be described later with reference to FIGS. 41A to 41C.

(Image Processing of High-Resolution Processor)

Hereinafter, the image processing of the high-resolution processor 351*b* of the modulated signal generator 350*b* of the light source control apparatus according to this embodiment will be described with reference to FIGS. 34A to 40D. In FIGS. 34A to 40(*d*), the first resolution is assumed to be 2,400 dpi, and the second resolution is assumed to be 4,800 dpi in the description.

<Resolution Converting Process>

Figure 34A:
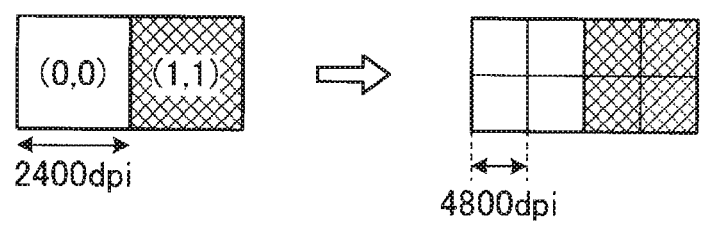
FIGS. 34A and 34B are diagrams that illustrate the operation of a resolution converting process of a thinning processor according to the third embodiment.
Figure 34B:
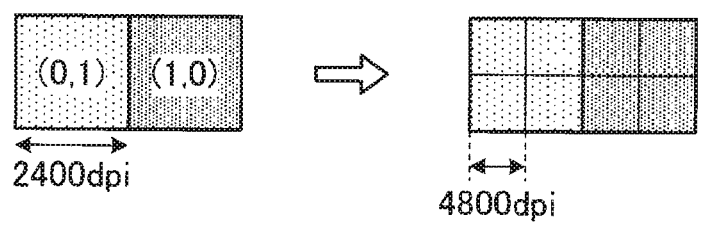

FIGS. 34A and 34B are diagrams that illustrate the operation of the resolution converting process of the thinning processor according to the third embodiment. In the thinning process of the thinning processor 520 of the high-resolution processor 351*b*, a resolution converting process performed by the first converter 521 of the resolution converting path 531 will be described as an example with reference to FIGS. 34A and 34B.

The first converter 521 of the resolution converting path 531 performs a resolution converting process of converting image data having the first resolution (2,400 dpi) received from the input image inverter 500 into image data having the second resolution (4,800 dpi) higher than the first resolution. More specifically, the first converter 521, as illustrated in FIG. 34A, divides a pixel having a pixel value of (0, 0) in the image data having the first resolution (2,400 dpi) into a total of four pixels including vertical two pixels×horizontal two pixels to be the second resolution (4,800 dpi) and converts the pixel into four pixels having a pixel value of (0, 0) by taking over the pixel value. Similarly, the first converter 521, as illustrated in FIG. 34A, divides a pixels having a pixel value of (1, 1) in the image data having the first resolution (2,400 dpi) into a total of four pixels including vertical two pixels×horizontal two pixels to be the second resolution (4,800 dpi) and converts the pixel into four pixels having a pixel value of (1, 1) by taking over the pixel value.

In addition, the first converter 521, as illustrated in FIG. 34B, divides a pixel having a pixel value of (0, 1) in the image data having the first resolution (2,400 dpi) into a total of four pixels including vertical two pixels×horizontal two pixels to be the second resolution (4,800 dpi) and converts the pixel into four pixels having a pixel value of (0, 1) by taking over the pixel value. Similarly, the first converter 521, as illustrated in FIG. 34B, divides a pixel having a pixel value of (1, 0) in the image data having the first resolution (2,400 dpi) into a total of four pixels including vertical two pixels×horizontal two pixels to be the second resolution (4,800 dpi) and converts the pixel into four pixels having a pixel value of (1, 0) by taking over the pixel value.

In addition, also the process of the second converter 523 of the thinning path 532 performed in a case where the matching signal represents that a target pixel is not a pixel configuring an edge of a thin line or the like is similar to the resolution converting process performed by the first converter 521.

<Thinning Process>

FIGS. 35A to 36D are diagrams that illustrate examples of the operation of image processing of the thinning path according to the third embodiment. In the thinning process of the thinning processor 520 of the high-resolution processor 351b, the operation of the image processing of the thinning path 532 will be focused in description with reference to FIGS. 35A to 36D.

The pattern matcher 522 of the thinning path 532 determines whether or not a target pixel of image data is a pixel configuring an edge (a corner or a contour) of a thin line or the like based on the arrangement of pixels of the image data having the first resolution (2,400 dpi) received from the input image inverter 500. More specifically, the pattern matcher 522 acquires an image matrix (for example, a partial image having a size of 9×9 illustrated in FIG. 14) that is a partial image having a target pixel as its center from the image data having the first resolution. Then, the pattern matcher 522, by performing pattern matching between each of various patterns stored in a buffer memory not illustrated in the drawing and the acquired image matrix, determines whether or not the target pixel included in the image matrix is a pixel configuring an edge (a corner or a contour) of a thin line or the like. At this time, each pixel of the pattern stored in the buffer memory includes not only a pixel value relating to image information but also a pixel value ("0" or "1") relating to tag information. Accordingly, in the pattern matching using the pattern matcher 522, between each pattern and the image matrix, matching is performed for both pixel values relating to pixel information and pixel values relating to tag information. Accordingly, in the pattern matching, for each pixel of the image matrix, in a case where pixel values, which relate to image information, of pixels corresponding to pixels having pixel values of "0" and "1" relating to image information of a pattern and pixel values relating to tag information match each other, the image matrix is determined to match the pattern. In addition, the pattern matcher 522 sends a matching signal representing a result (for example, matching a specific pattern or no matching any pattern) of a determination according to the pattern matching and data of a target pixel that is a target for the pattern matching to the second converter 523.

The second converter 523 of the thinning path 532 converts the target pixel of the image data having the first resolution into a pixel pattern having the second resolution based on the matching signal received from the pattern matcher 522. The pixel pattern of this case includes a pixel value relating to tag information together with a pixel value relating to image information as pixel values of a pixel. In other words, the second converter 523 performs a resolution converting process of increasing the resolution of the image data having the first resolution to be the resolution of the image data having the second resolution and performs image processing of thinning or thickening by converting the target pixel into a pixel pattern. More specifically, the second converter 523, in a case where the matching signal represents that a target pixel is a pixel configuring an edge (a corner or a contour) of a thin line or the like, by converting the target pixel of the image data having the first resolution into a pixel pattern corresponding to a pattern represented by the matching signal, increases the resolution and performs image processing of thinning or thickening. At this time, since the pixel values of the image information and the tag information are included in the pixel pattern, in a pixel of the image data after the image processing of thinning or thickening using the second converter 523, the tag information is included.

In the example illustrated in FIGS. 35A to 35D, an example is illustrated in which, in an edge portion, black pixels corresponding to four pixels are removed (converted into white pixels) in units of the second resolution, and the edge portion is thinned. In addition, among six pixels illustrated in FIGS. 35A to 35D, four pixels have a pixel value (1, 1), and the remaining two pixels have a pixel value (0, 0), and accordingly, FIGS. 35A to 35D illustrate an "edge portion of a black character".

Figure 35A:
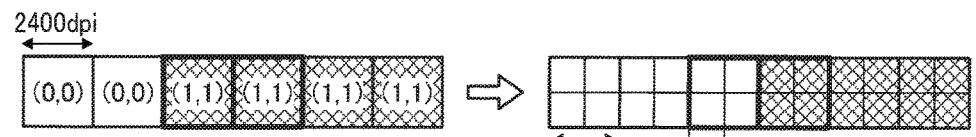
FIGS. 35A to 35D are diagrams that illustrate an example of the operation of image processing of a thinning path according to the third embodiment.
Figure 35B:
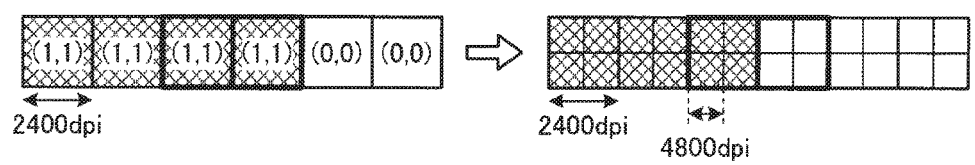
Figure 35C:
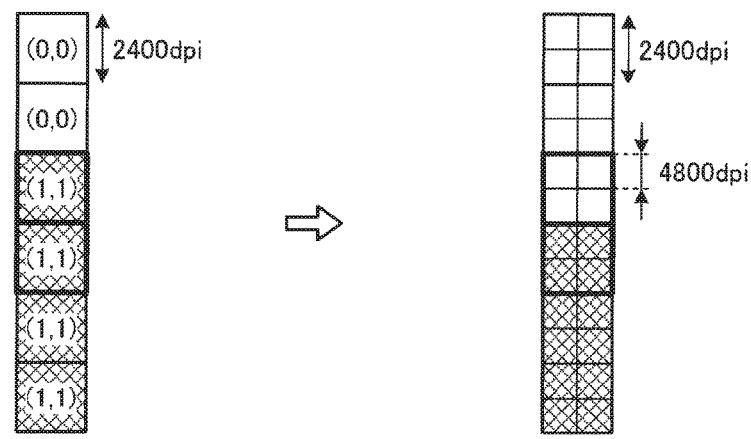
Figure 35D:
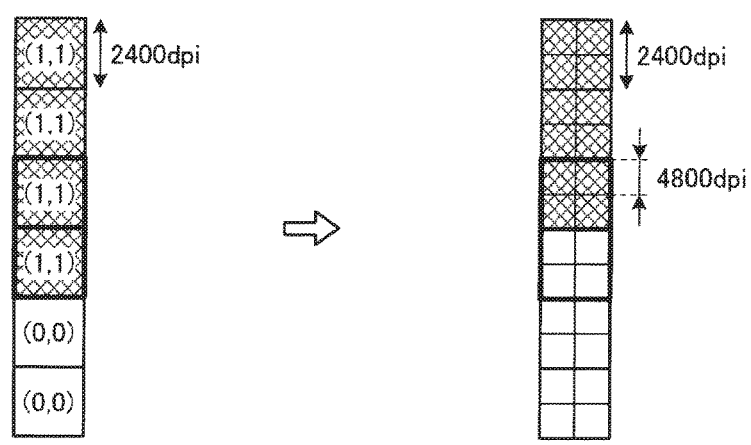

In the case illustrated in FIG. 35A, a third pixel from the left side among six pixels of a partial image (first resolution) of which the left side is an edge is replaced by four divided pixels having a pixel value of (0, 0). In addition, a fourth pixel from the left side is replaced by four divided pixels having a pixel value of (1, 1). In the case illustrated in FIG. 35B, a third pixel from the left side among six pixels of a partial image (first resolution) of which the right side is an edge is replaced by four divided pixels having a pixel value of (1, 1). In addition, a fourth pixel from the left side is replaced by four divided pixels having a pixel value of (0, 0). In the case illustrated in FIG. 35C, a third pixel from the upper side among six pixels of a partial image (first resolution) of which the upper side is an edge is replaced by four divided pixels having a pixel value of (0, 0). In addition, a fourth pixel from the upper side is replaced by four divided pixels having a pixel value of (1, 1). In the case illustrated in FIG. 35D, a third pixel from the upper side among six pixels of a partial image (first resolution) of which the lower side is an edge is replaced by four divided pixels having a pixel value of (1, 1). In addition, a fourth pixel from the lower side is replaced by four divided pixels having a pixel value of (0, 0).

In the case illustrated in FIGS. 36A to 36D, an example is illustrated in which, in an edge portion, black pixels corresponding to seven pixels are removed (converted into white pixels) in units of the second resolution, and the edge is thinned. Among six pixels illustrated in each of FIGS. 36A to 36D, four pixels have pixel values of (1, 0), and the remaining two pixels have pixel values of (0, 1), and accordingly, FIGS. 36A to 36D illustrate "an edge portion of a white character".

Figure 36A:
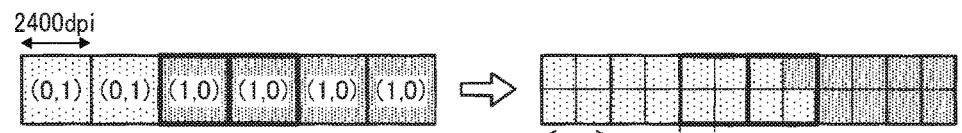
FIGS. 36A to 36D are diagrams that illustrate an example of the operation of image processing of a thinning path according to the third embodiment.

In the case illustrated in FIG. 36A, a third pixel from the left side among six pixels of a partial image (first resolution) of which the right side is an edge (an edge of a white character) is replaced by four divided pixels having a pixel value of (0, 1). In addition, a fourth pixel from the left side is replaced by four divided pixels of which pixel values of the upper left, the lower left, and the lower right sides are (0, 1) and of which a pixel value of the upper right side is (1, 0).

Figure 36B:
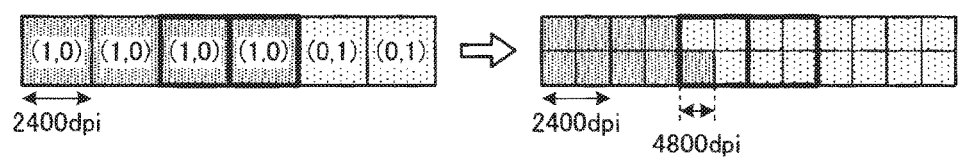

In the case illustrated in FIG. 36B, a third pixel from the left side among six pixels of a partial image (first resolution) of which the left side is an edge (an edge of a white character) is replaced by four divided pixels of which pixel values of the upper left, the upper right, and the lower right sides are (0, 1) and a pixel value of the lower left side is (1, 0). In addition, a fourth pixel from the left side is replaced by four divided pixels each having a pixel value of (0, 1).

Figure 36C:
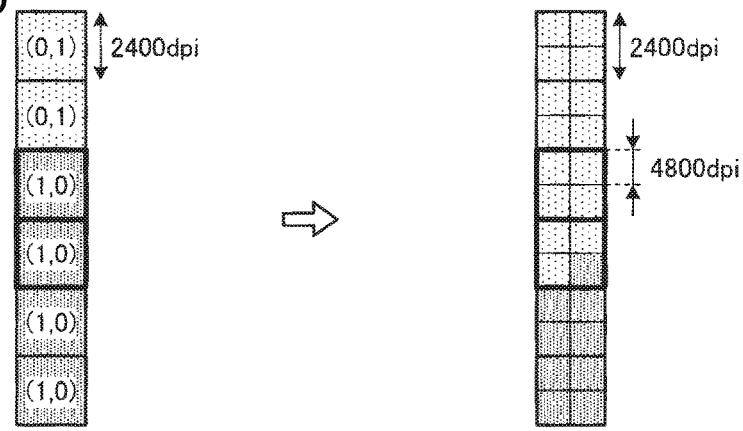

In the case illustrated in FIG. 36C, a third pixel from the upper side among six pixels of a partial image (first resolution) of which the lower side is an edge (an edge of a white character) is replaced by four divided pixels each having a pixel value of (0, 1). In addition, a fourth pixel from the upper side is replaced by four divided pixels of which pixel values of the upper left, the lower left, and the upper right sides are (0, 1) and a pixel value of the lower right side is (1, 0).

Figure 36D:
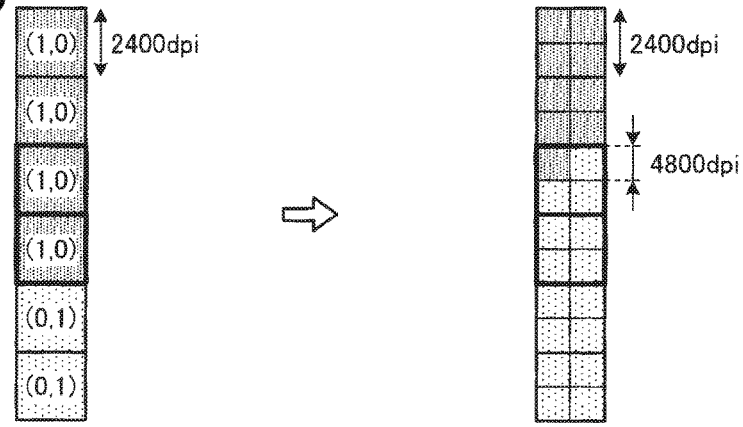

In the case illustrated in FIG. 36D, a third pixel from the upper side among six pixels of a partial image (first resolution) of which the upper side is an edge (an edge of a white character) is replaced by four divided pixels of which pixel values of the lower left, the upper right, and the lower right sides are (0, 1) and a pixel value of the upper left side is (1, 0). In addition, a fourth pixel from the upper side is replaced by four divided pixels each having a pixel value of (0, 1). As a result, in the image processing of the thinning path 532 illustrated in FIGS. 36A to 36D, image processing of thickening a white character is performed.

In FIGS. 35A to 36D, for the remaining four pixels not matching a specific pattern, a corresponding matching signal represents that each of the pixels is not a pixel configuring an edge of a thin line or the like, and thus, the resolution converting process is performed by the first converter 521 of the resolution converting path 531, and the resolution of each of the pixels is increased to be the second resolution.

<Flow of Image Processing of High-Resolution Processor>

FIGS. 37A to 38D are diagrams that illustrate an example of the operation of image processing (without inversion) of the high-resolution processor according to the third embodiment. FIGS. 39A to 40D are diagrams that illustrate an example of the operation of image processing (with inversion) of the high-resolution processor according to the third embodiment. The flow of the whole image processing of the high-resolution processor 351*b* will be described with reference to FIGS. 37A to 40D.

First, the operation performed in a case where an inversion signal is not input from the outside to the input image inverter 500 and the output image inverter 540 of the high-resolution processor 351*b* will be described with reference to FIGS. 37A to 37D. Since an inversion signal is not input from the outside, the input image inverter 500 of the high-resolution processor 351*b* does not perform an inversion process for image data 1200 ("input image data" illustrated in FIG. 37A) having the first resolution (2,400 dpi) output from the image processing unit 320*a* but sends the original image data (image data 1201 illustrated in FIG. 37B) to the thinning processor 520. Since an inversion process is not performed for the image data 1200, as illustrated in FIG. 37B, in the image data 1201, among pixels of the image data 1200, white pixels (other than a character) having a pixel value of (0, 0) remain to be white pixels (other than a character), and black pixels (character) having a pixel value of (1, 1) remain to be black pixels (character).

The thinning processor 520 of the high-resolution processor 351*b* performs a thinning process for the image data 1201 received from the input image inverter 500. As described above, for an edge portion of black pixels of the image data 1201, as a result of pattern matching using the thinning path 532, a resolution converting process and image processing of thinning are performed, and the data is converted into image data 1202 ("image data after conversion" illustrated in FIG. 37C) having the second resolution (4,800 dpi). The thinning processor 520 sends the image data 1202 converted from the image data 1101 by the thinning process to the output image inverter 540. In the example illustrated in FIG. 37C, an edge portion of black pixels corresponding to four pixels is removed (converted into white pixels) in units of the second resolution and is thinned.

Since an inversion signal is not input from the outside, the output image inverter 540 of the high-resolution processor 351*b* does not perform an inversion process for the image data 1202 but outputs the original image data (image data 1203 illustrated in FIG. 37D) to the later-stage image processor 354.

As above, in the high-resolution processor 351*b*, in a case where an inversion signal is not input, only the thinning process of the thinning processor 520 substantially functions, and, comparing the image data 1200 and the image data 1203 with each other, an edge portion of a black line or a black character is thinned.

Next, the operation performed in a case where an inversion signal is not input from the outside to the input image inverter 500 and the output image inverter 540 of the high-resolution processor 351*b* will be described with reference to FIGS. 38A to 38D. Since an inversion signal is not input from the outside, the input image inverter 500 of the high-resolution processor 351*b* does not perform an inversion process for image data 1210 ("input image data" illustrated in FIG. 38A) having the first resolution (2,400 dpi) output from the image processing unit 320*a* but sends the original image data (image data 1211 illustrated in FIG. 38B) to the thinning processor 520. Since an inversion process is not performed for the image data 1210, as illustrated in FIG. 38B, in the image data 1211, among pixels of the image data 1210, black pixels (other than a character) having a pixel value of (1, 0) remain to be black pixels (other than a character), and white pixels (character) having a pixel value of (0, 1) remain to be white pixels (character).

The thinning processor 520 of the high-resolution processor 351*b* performs a thinning process for the image data 1211 received from the input image inverter 500. As described above, for an edge portion of black pixels of the image data 1211, as a result of pattern matching using the thinning path 532, a resolution converting process and image processing of thinning are performed, and the data is converted into image data 1212 ("image data after conversion" illustrated in FIG. 38C) having the second resolution (4,800 dpi). The thinning processor 520 sends the image data 1212 converted from the image data 1211 by the thinning process to the output image inverter 540. In the example illustrated in FIG. 38C, an edge portion of black pixels corresponding to seven pixels is removed (converted into white pixels) in units of the second resolution and is thinned.

Since an inversion signal is not input from the outside, the output image inverter 540 of the high-resolution processor 351*b* does not perform an inversion process for the image data 1212 but outputs the original image data (image data 1213 illustrated in FIG. 38D) to the later-stage image processor 354.

As above, in the high-resolution processor 351*b*, in a case where an inversion signal is not input, only the thinning process of the thinning processor 520 substantially functions, and, comparing the image data 1210 and the image data 1213 with each other, substantially, edge portions of white lines, white characters, and the like are thickened.

Next, the operation performed in a case where an inversion signal is input from the outside to the input image inverter 500 and the output image inverter 540 of the high-resolution processor 351*b* will be described with reference to FIGS. 39A to 39D. Since the inversion signal is input from the outside, the input image inverter 500 of the high-resolution processor 351*b* performs an inversion process for image data 1200 ("input image data" illustrated in FIG. 39A) having the first resolution (2,400 dpi) output from the image processing unit 320*a* and sends the inverted image data 1201*a* ("input image data (inverted)" illustrated in FIG. 39B) to the thinning processor 520. In the image data 1201*a*, as illustrated in FIG. 39B, among pixels of the image data 1200, white pixels (other than a character) having a pixel value of (0, 0) are inverted into black pixels (other than a character), and black pixels (character) having a pixel value of (1, 1) are inverted into white pixels (character).

The thinning processor 520 of the high-resolution processor 351*b* performs a thinning process for the image data 1201*a* received from the input image inverter 500. As described above, for an edge portion of black pixels of the image data 1201*a*, as a result of pattern matching using the thinning path 532, a resolution converting process and image processing of thinning are performed, and accordingly, the edge portion is converted into image data 1202*a* ("image data after conversion" illustrated in FIG. 39C) having the second resolution (4,800 dpi). The thinning processor 520 sends the image data 1202*a* converted from image data 1201*a* by the thinning process to the output image inverter 540. In the example illustrated in FIG. 39C, an edge portion of black pixels, which are white pixels before the inversion process, corresponding to seven pixels are removed (converted into white pixels) in units of the second resolution and thus is thinned.

Since an inversion signal is input from the outside, the output image inverter 540 of the high-resolution processor 351*b* performs an inversion process for the image data 1202*a* and outputs inverted image data 1203*a* ("output image data (inverted)" illustrated in FIG. 39C) to the later-stage image processor 354.

As above, in the high-resolution processor 351*b*, in a case where an inversion signal is input, the inversion processes of the input image inverter 500 and the output image inverter 540 function, and the thinning process of the thinning processor 520 functions. Thus, comparing the image data 1200 and the image data 1203*a* with each other, as a result, an edge portion of a black line, a black character, or the like is thickened.

Next, the operation performed in a case where an inversion signal is input from the outside to the input image inverter 500 and the output image inverter 540 of the high-resolution processor 351*b* will be described with reference to FIGS. 40A to 40D. Since the inversion signal is input from the outside, the input image inverter 500 of the high-resolution processor 351*b* performs an inversion process for image data 1210 ("input image data" illustrated in FIG. 40A) having the first resolution (2,400 dpi) output from the image processing unit 320*a* and sends the inverted image data 1211*a* ("input image data (inverted)" illustrated in FIG. 40B) to the thinning processor 520. In the image data 1211*a*, as illustrated in FIG. 40B, among pixels of the image data 1210, black pixels (other than a character) having a pixel value of (1, 0) are inverted into white pixels (other than a character), and white pixels (character) having a pixel value of (0, 1) are inverted into black pixels (character).

The thinning processor 520 of the high-resolution processor 351*b* performs a thinning process for the image data 1211*a* received from the input image inverter 500. As described above, for an edge portion of black pixels of the image data 1211*a*, as a result of pattern matching using the thinning path 532, a resolution converting process and image processing of thinning are performed, and accordingly, the edge portion is converted into image data 1212*a* ("image data after conversion" illustrated in FIG. 40C) having the second resolution (4,800 dpi). The thinning processor 520 sends the image data 1212*a* converted from image data 1211*a* by the thinning process to the output image inverter 540. In the example illustrated in FIG. 40C, an edge portion of black pixels, which are white pixels before the inversion process, corresponding to four pixels are removed (converted into white pixels) in units of the second resolution and thus is thinned.

Since an inversion signal is input from the outside, the output image inverter 540 of the high-resolution processor 351*b* performs an inversion process for the image data 1212*a* and outputs inverted image data 1213*a* ("output image data (inverted)" illustrated in FIG. 40D) to the later-stage image processor 354.

As above, in the high-resolution processor 351*b*, in a case where an inversion signal is input, the inversion processes of the input image inverter 500 and the output image inverter 540 function, and the thinning process of the thinning processor 520 functions. Thus, comparing the image data 1210 and the image data 1213*a* with each other, as a result, an edge portion of a white line, a white character, or the like is thinned.

(Later-Stage Image Processing of Later-Stage Image Processor)

FIGS. 41A to 41C are diagrams that illustrate an example of the operation of image processing of the later-stage image processor of the modulated signal generator according to the third embodiment. An example of the later-stage image processing of the later-stage image processor 354 of the modulated signal generator 350*b* will be described with reference to FIGS. 41A to 41C.

The later-stage image processor 354 receives image data 1300 illustrated in FIG. 41A that is output image data for which image processing has been performed by the high-resolution processor 351*b*. The image data 1300, as illustrated in FIG. 41A, is assumed to be image data having 4,800 dpi (second resolution) in both the main-scanning direction and the sub-scanning direction. The later-stage image processor 354, for example, as later-stage image processing, as illustrated in FIG. 41B, determines a figure (here, tag information is assumed to be information representing not a character but a figure) or not based on the tag information included in the image data 1300, detects an edge of a figure portion, and further adds information designating the light intensities of the edge portion and a portion other than the edge portion to the tag information of the image data 1300 to generate image data 1301. The later-stage image processor 354 sends the generated image data 1301 to the pulse generator 352.

The pulse generator 352 generates a direction signal directing that the light intensity (second light intensity) of the light source 200 of a pixel corresponding to the edge portion among pixels relating to the figure is higher than the light intensity (first light intensity) of the light source 200 of a pixel corresponding to the portion other than the edge portion based on the information designating the light intensities included in the tag information of the image data 1301 received from the later-stage image processor 354 and sends the generated direction signal to the application current setter 353. The application current setter 353 generates light source application current data representing a set value of a current flowing through the light source 200 based on the direction signal received from the pulse generator 352 and outputs the generated light source application current data to the light source driver 370. In this way, by configuring the light intensity (second light intensity) of the edge portion to be higher than the light intensity (first light intensity) of a portion other than the edge portion, an effect of improving the sharpness of the edge portion is expected.

In addition, the later-stage image processor 354, as another example of the later-stage image processing, as illustrated in FIG. 41C, determines a figure or not based on the tag information included in the image data 1300, detects an edge of the figure portion, and performs the process of sharpening a predetermined edge portion in units of the second resolution. In parallel with this, the later-stage image processor 354 further adds information designating the light intensities of an edge portion of the remaining figure portion and a portion other than the edge portion to the tag information of the image data 1300 to generate image data 1301a. The later-stage image processor 354 sends the generated image data 1301a to the pulse generator 352. The process for the image data 1301a performed by the pulse generator 352 and the application current setter 353 is similar to the process for the image data 1301 described above. Accordingly, by sharpening the edge portion of the original figure of the image data, an effect of improving the sharpness of an edge without fattening the figure can be expected.

As above, in this embodiment, the image data is sent to the later stage side (the later-stage image processor 354) with the tag information not being removed but remaining in the image data after the thinning process. Accordingly, in addition to the effect of improvement of the reproducibility of thin lines and the improvement of reproducibility of characters according to the image processing of the high-resolution processor 351b, additional image processing using the tag information can be performed.

Fourth Embodiment

An image forming apparatus according to a fourth embodiment will be described with points different from the image forming apparatus according to the first embodiment focused on. In the first embodiment, the thinning process has been described in which the resolution converting process and the image processing of thinning are performed by the thinning processor 520. In this embodiment, in the thinning process, an operation of further performing a smoothing process in addition to the resolution converting process and the image processing of thinning will be described. The whole configuration of the image forming apparatus and the configuration of a light scanning apparatus according to this embodiment are similar to those according to the first embodiment.

(Configuration of Functional Block of Thinning Processor)

Figure 42:
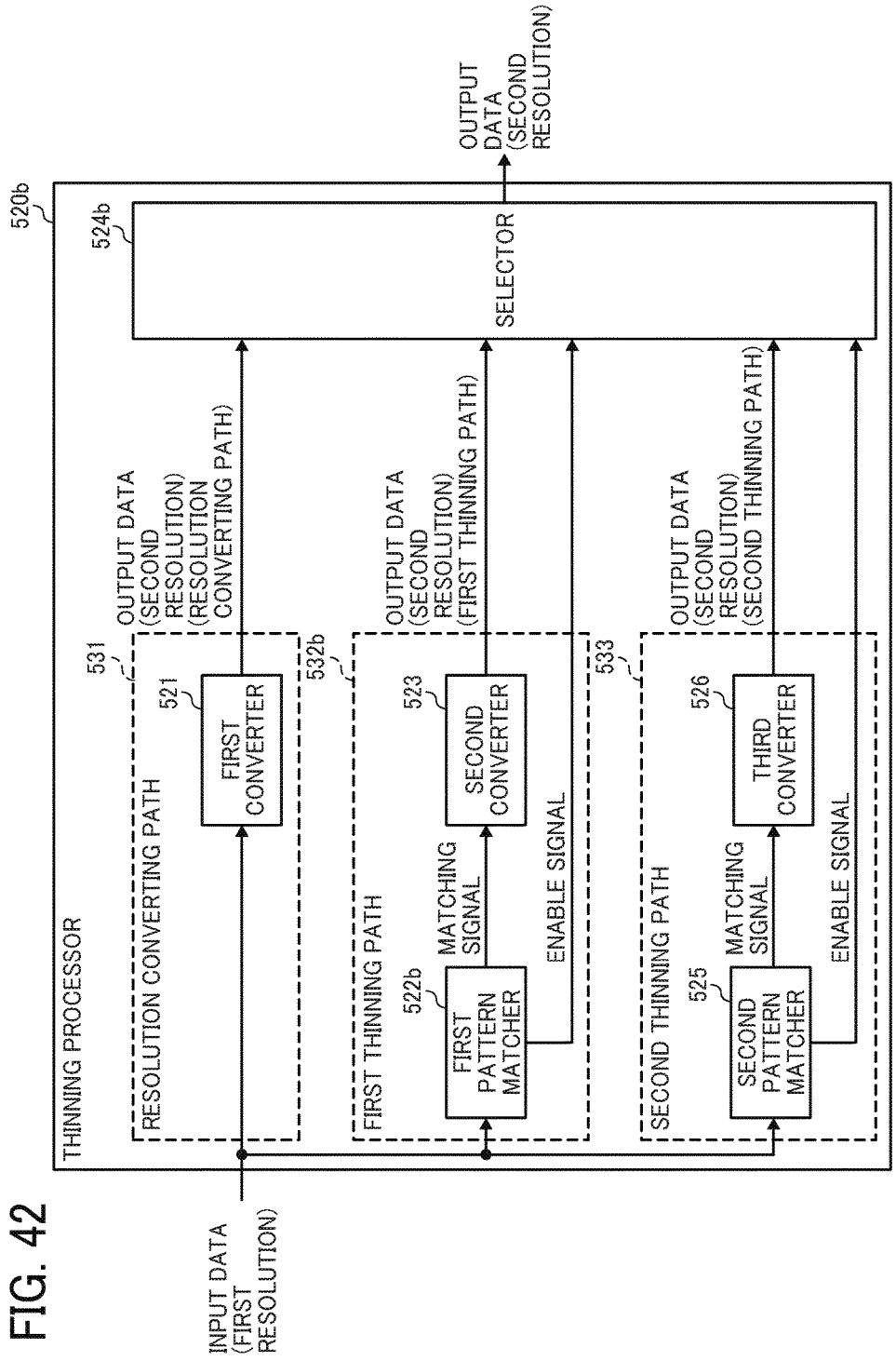
FIG. 42 is a diagram that illustrates an example of the configuration of functional blocks of a thinning processor of a high-resolution processor according to a fourth embodiment.

FIG. 42 is a diagram that illustrates an example of the configuration of functional blocks of a thinning processor of a high-resolution processor according to a fourth embodiment. The configuration of the functional blocks of the thinning processor 520b of the high-resolution processor 351 according to this embodiment will be described with reference to FIG. 42.

As illustrated in FIG. 42, the thinning processor 520b of the high-resolution processor 351 according to this embodiment includes a first converter 521, a first pattern matcher 522b (first matcher), a second converter 523 (first thinning converter), a selector 524b (selector), a second pattern matcher 525 (second matcher, or second matching circuit), and a third converter 526 (second thinning converter, or third converting circuit). Among these, functional blocks in which image processing is performed by the first converter 521 will be referred to as a resolution converting path 531, and functional blocks in which image processing is performed by the first pattern matcher 522b and the second converter 523 will be referred to as a first thinning path 532b. In addition, functional blocks in which image processing is performed by the second pattern matcher 525 and the third converter 526 will be referred to as a second thinning path 533.

The function of the resolution converting path 531 is a function similar to that of the resolution converting path 531 according to the first embodiment illustrated in FIG. 10. In addition, the function of the first pattern matcher 522b is a function similar to that of the pattern matcher 522 according to the first embodiment. In other words, the function of the first thinning path 532b is a function similar to that of the thinning path 532 according to the first embodiment illustrated in FIG. 10.

Next, the second thinning path 533 will be described. The second pattern matcher 525 of the second thinning path 533 determines whether or not a target pixel of the image data is a pixel configuring an edge (a corner or a contour) and a level difference based on the arrangement of pixels of image data having the first resolution received from the input image inverter 500. More specifically, the second pattern matcher 525 acquires an image matrix (for example, a partial image having a size of 13×13 illustrated in FIG. 43 to be described later) that is a partial image having a target pixel as the center from the image data having the first resolution. Accordingly, as target pixels are sequentially selected from the image data having the first resolution by the second pattern matcher 525, the arrangement of pixels configuring the acquired image matrix becomes different. A pixel value of a pixel configuring the image matrix is a value ("0" or "1") of one bit. The second pattern matcher 525 performs pattern matching between each of various patterns (for example, see FIGS. 44A to 44C to be described later) stored in a buffer memory not illustrated in the drawing and the acquired image matrix, thereby determining whether or not a target pixel included in the image matrix is a pixel configuring an edge (a corner or a contour) and a level difference. Here, the size of the image matrix is determined based on the size of the pattern used for the pattern matching described above. In addition, the second pattern matcher 525 sends a matching signal representing a result (for example, matching a specific pattern or no matching any pattern) of a determination according to the pattern matching and data of the target pixel that is a target for the pattern matching to the third converter 526. Furthermore, the second pattern matcher 525 outputs an enable signal to the selector 524b in a case where the image matrix matches one pattern as the result of the determination according to the pattern matching. In addition, the buffer memory in which the patterns described above are stored, for example, may be included in a one-chip single integrated device realizing the drive control unit 340 and be configured to be able to refer to an integrated circuit realizing the second pattern matcher 525.

The third converter 526 of the second thinning path 533 converts a target pixel of image data having the first resolution into a specific pixel pattern (for example, see FIG. 45C to be described later) having the second resolution based on a matching signal received from the second pattern matcher 525. In other words, the third converter 526 performs a resolution converting process of increasing the resolution of the image data having the first resolution to be the resolution of image data having the second resolution and performs image processing of thinning by converting a target pixel into a pixel pattern and a smoothing process that is image process smoothing the level difference. More specifically, the third converter 526, in a case where a matching signal represents that a target pixel is a pixel configuring an edge (a corner or a contour) of a thin line or the like and a level difference, increases the resolution by converting the target pixel of the image data having the first resolution into a pixel pattern corresponding to a pattern represented by the matching signal and performs image processing of thinning and the smoothing process. On the other hand, the third converter 526, in a case where the matching signal represents that the target pixel is not a pixel configuring an edge of a thin line or the like and a level difference, increases the resolution (substantially, a process similar to the resolution converting process performed by the first converter 521) of the target pixel of the image data having the first resolution to be the second resolution. In this way, by associating a pixel pattern replacing the target pixel with each pattern used for pattern matching, the intensity of thinning can be increased or decreased. The third converter 526 sends the converted image data (output data of the second thinning path illustrated in FIG. 42) having the second resolution to the selector 524*b*.

The selector 524*b* selects image data output to the output image inverter 540 from image data having the second resolution output from the resolution converting path 531, in other words, output from the first converter 521, image data having the second resolution output from the first thinning path 532*b*, in other words, output from the second converter 523, and image data having the second resolution output from the second thinning path 533, in other words, output from the third converter 526. More specifically, in a case where there is an input of an enable signal from the second pattern matcher 525, the selector 524*b* outputs the image data having the second resolution for which image processing has been performed by the second thinning path 533. On the other hand, in a case where there is no input of an enable signal from the second pattern matcher 525, and there is an input of an enable signal from the first pattern matcher 522*b*, the selector 524*b* outputs the image data having the second resolution for which image processing has been performed by the first thinning path 532*b*. In addition, in a case where there is no input of an enable signal from any one of the first pattern matcher 522*b* and the second pattern matcher 525, the selector 524*b* outputs the image data having the second resolution for which the image processing (resolution converting process) has been performed by the resolution converting path 531.

Here, while the selector 524*b* prioritizes the enable signal supplied from the second pattern matcher 525 in the description presented above when image data to be output is selected from among the image data output by the resolution converting path 531, the first thinning path 532*b*, and the second thinning path 533, the priority is not limited thereto, but the image data to be output may be selected based on the other priority levels.

While the selector 524*b* selects whether image data from the resolution converting path 531, image data from the first thinning path 532*b*, or image data from the second thinning path 533 is output based on the presence/absence of the inputs of enable signals from the first pattern matcher 522*b* and the second pattern matcher 525, the selection is not limited thereto. For example, the selector 524*b* may switch this selection function to be valid or invalid based on the presence/absence of the input of a thinning control signal from the outside not illustrated in the drawing. In other words, the selector 524*b* may select the resolution converting path 531 regardless of the presence/absence of the input of an enable signal in a case where a thinning control signal is not input and perform the switching among the selection of the resolution converting path 531, the selection of the first thinning path 532*b*, and the selection of the second thinning path 533 based on the presence/absence of the input of an enable signal in a case where a thinning control signal is input.

Details of the thinning process performed by the thinning processor 520*b* will be described later with reference to FIGS. 43 to 48D.

(Image Processing of High-Resolution Processor)

Hereinafter, the image processing of the high-resolution processor 351 of the modulated signal generator 350 of the light source control apparatus 110 according to this embodiment will be described with reference to FIGS. 43 to 48D. In FIGS. 43 to 48D, the first resolution is assumed to be 2,400 dpi, and the second resolution is assumed to be 4,800 dpi in the description.

<Thinning Process>

Figure 43:
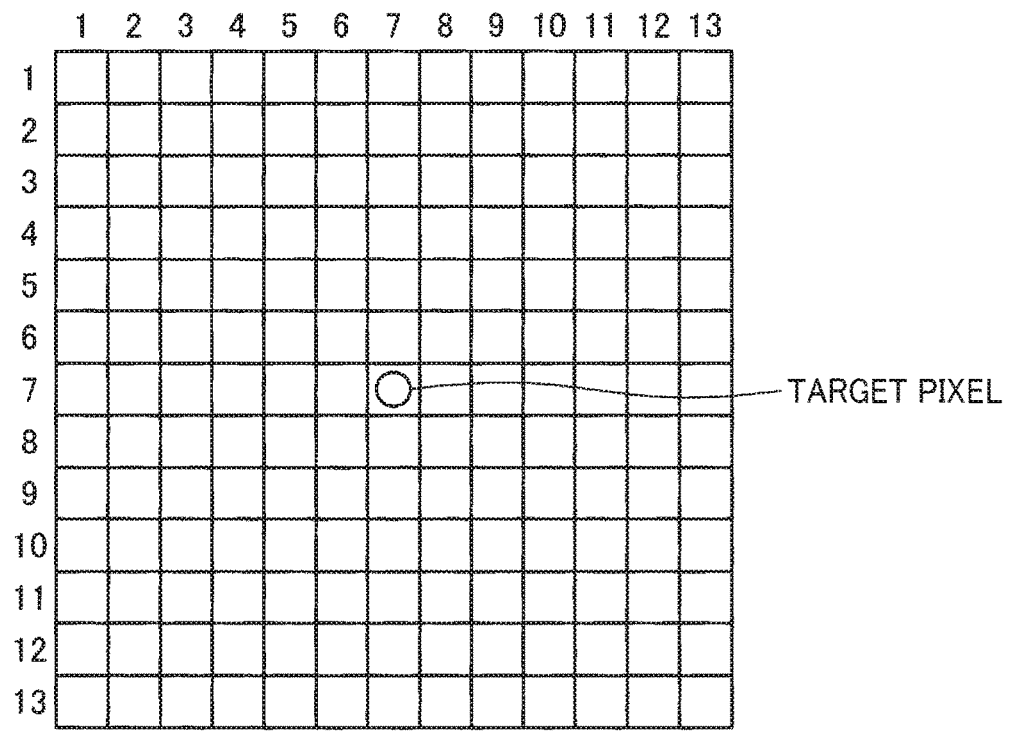
FIG. 43 is a diagram that illustrates an example of an image matrix according to the fourth embodiment.
Figures 44A, 44B:
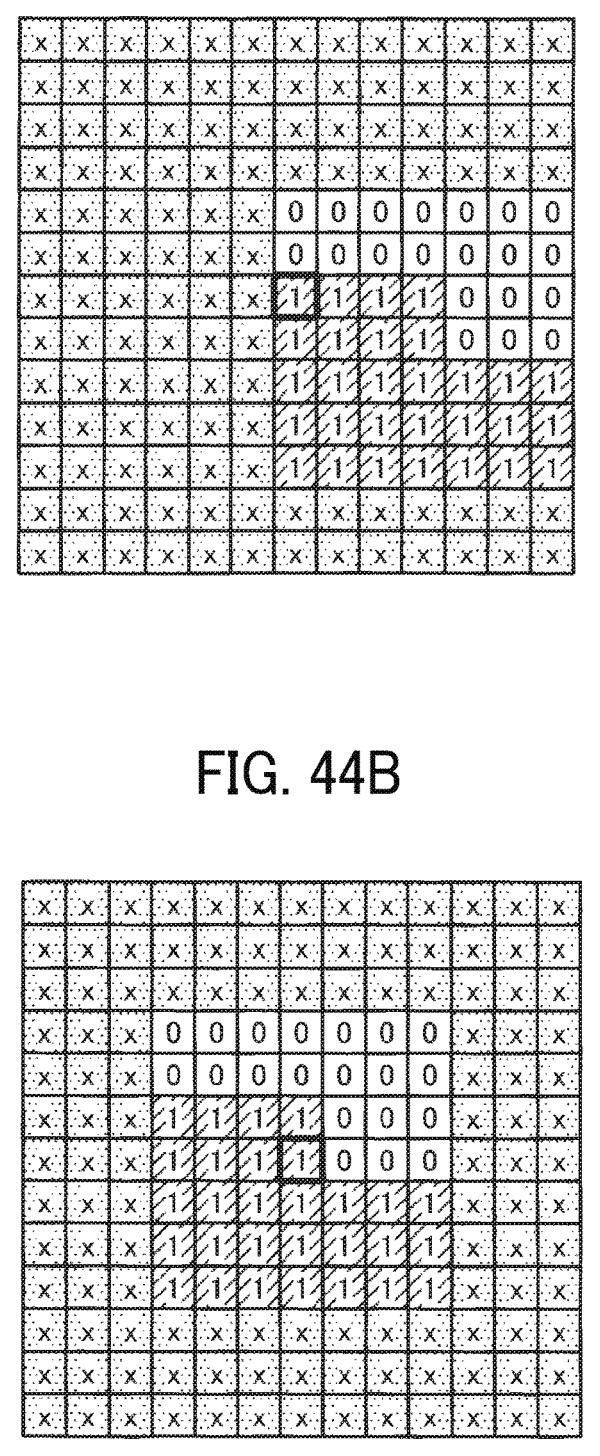
Figure 44C:
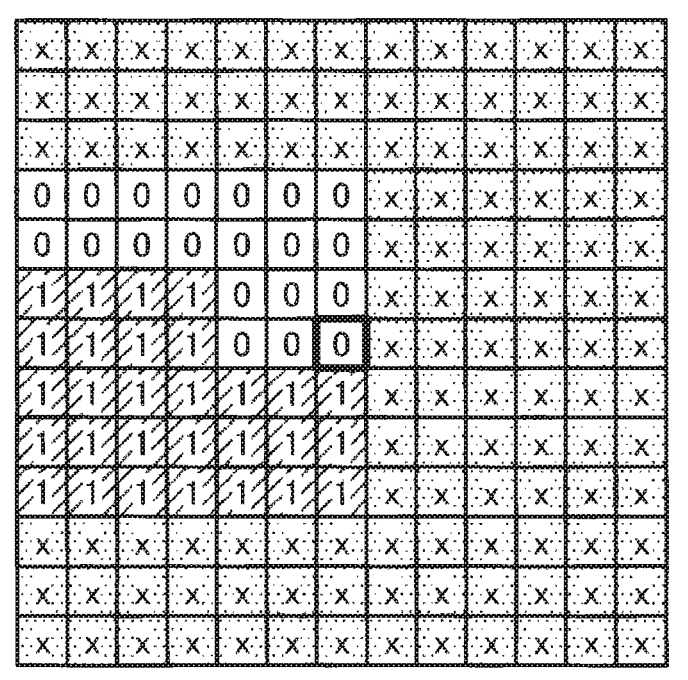
Figure 45A:
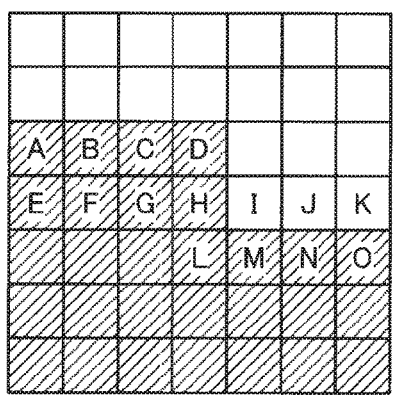
FIGS. 45A to 45C are diagrams that illustrate a specific operation of image processing of a second thinning path according to the fourth embodiment.
Figure 45B:
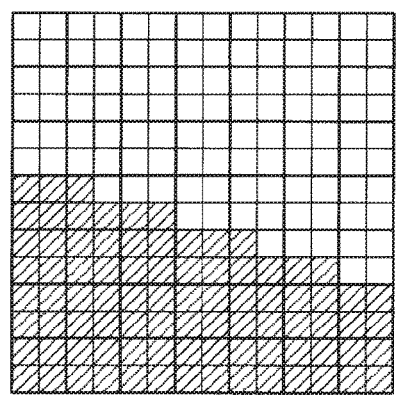
Figure 45C:
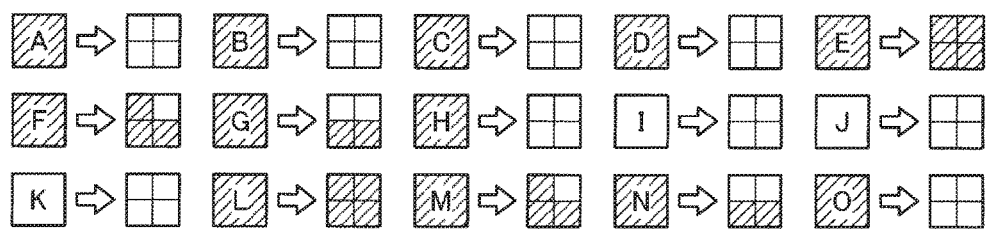
Figure 46A:
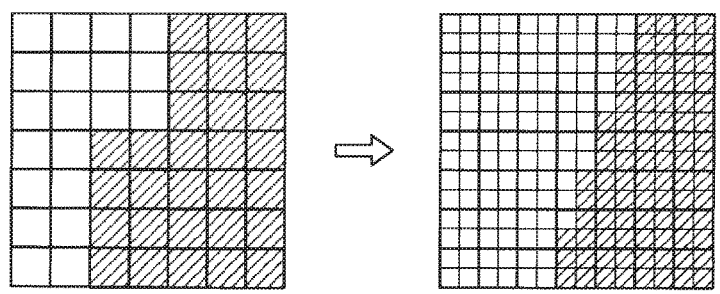
FIGS. 46A to 46D are diagrams that illustrate an example of the operation of image processing of a second thinning path according to the fourth embodiment.
Figure 46B:
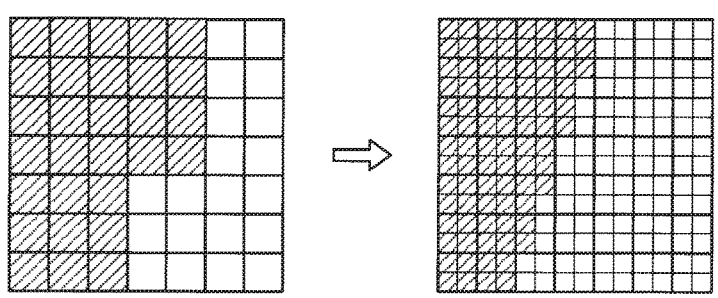
Figure 46C:
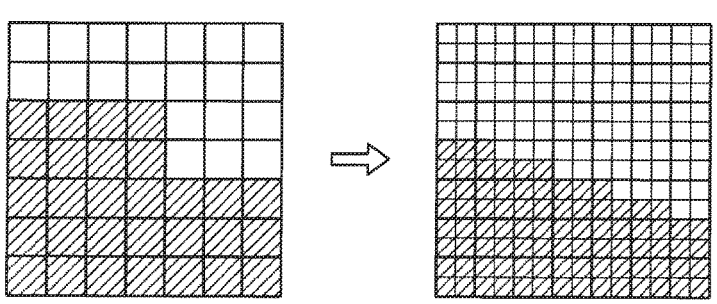
Figure 46D:
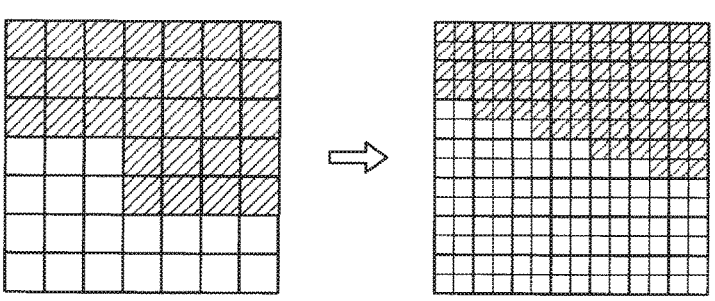

FIG. 43 is a diagram that illustrates an example of the image matrix according to the fourth embodiment. FIGS. 44A to 44C are diagrams that illustrate an example of a pattern used for a pattern matching process according to the fourth embodiment. FIGS. 45A to 45C are diagrams that illustrate a specific operation of image processing of the second thinning path according to the fourth embodiment. FIGS. 46A to 46D are diagrams that illustrate an example of the operation of image processing of the second thinning path according to the fourth embodiment. In the thinning process of the thinning processor 520*b* of the high-resolution processor 351, the operation of image processing of the second thinning path 533 will be focused on in the description with reference to FIGS. 43 to 46D.

The second pattern matcher 525 of the second thinning path 533, as described above, determines whether or not a target pixel of image data is a pixel configuring an edge (a corner or a contour) and a level difference based on the arrangement of pixels of the image data having the first resolution (2,400 dpi) received from the input image inverter 500. More specifically, the second pattern matcher 525 acquires an image matrix (for example, a partial image having a size of 13×13 illustrated in FIG. 43) that is a partial image having a target pixel as its center from the image data having the first resolution. Then, the second pattern matcher 525, by performing pattern matching between each of various patterns (for example, patterns as illustrated in FIGS. 44A to 44C) stored in a buffer memory not illustrated in the drawing and the acquired image matrix, determines whether or not the target pixel included in the image matrix is a pixel configuring an edge (a corner or a contour) and a level difference. In the patterns illustrated in FIGS. 44A to 44C, a pixel of which the pixel value is represented as "X" represents a pixel of which the pixel value is ignored, in other words, a pixel of which the pixel value may be either "0" or "1". Accordingly, in the pattern matching, in a case where pixel values of pixels corresponding to pixels of which the pixel values are "0" and "1" in the pattern match each of the pixels of the image matrix, the image matrix is determined to match the pattern. In addition, the second pattern matcher 525 sends a matching signal representing a result (for example, matching a specific pattern or no matching any of the patterns) of a determination according to the pattern matching and data of the target pixel that is a target for the pattern matching to the third converter 526.

The third converter 526 of the second thinning path 533 converts the target pixel of the image data having the first resolution into a specific pixel pattern (for example, the pixel pattern illustrated in FIG. 45C) having the second resolution based on the matching signal received from the second pattern matcher 525. In other words, the third converter 526 performs a resolution converting process of increasing the resolution of the image data having the first resolution to be the resolution of the image data having the second resolution and performs image processing of thinning by converting the target pixel into a pixel pattern and a smoothing process. More specifically, the third converter 526, in a case where the matching signal represents that a target pixel is a pixel configuring an edge (a corner or a contour) and a level difference, by converting the target pixel of the image data having the first resolution into a pixel pattern corresponding to a pattern represented by the matching signal, increases the resolution and performs image processing of thinning and a smoothing process.

For example, FIG. 45A illustrates a partial image (first resolution) of which the upper side forms an edge and a level difference, and image matrixes of pixels A to O are assumed to be pixels matching specific patterns according to pattern matching. For example, the image matrix of the pixel A matches a pattern illustrated in FIG. 44A, the image matrix of the pixel H matches a pattern illustrated in FIG. 44B, and the image matrix of the pixel K matches a pattern illustrated in FIG. 44C. The third converter 526 replaces the pixels A to O matching the specific patterns with pixel patterns (see FIG. 45C) corresponding to the patterns matched by the pixels to acquire image data having the second resolution illustrated in FIG. 45B. In addition, for the remaining pixels (pixels other than the pixels A to O) not matching the specific patterns in FIG. 45A, since corresponding matching signals represent that the pixels are not pixels each configuring an edge and a level difference, the resolution converting process is performed by the first converter 521 of the resolution converting path 531, whereby the resolution of the pixels is increased to be the second resolution.

As above, in the case illustrated in FIGS. 45A and 45B, the edge portion and the level difference are thinned in units of the second resolution and are smoothed.

FIGS. 46A to 46D illustrate an example in which each edge portion is thinned in units of the second resolution and are smoothed. In the case illustrated in FIG. 46A, in a partial image (first resolution) of which the left side forms an edge and a level difference, each pixel forming the edge and the level difference is replaced with a pixel pattern corresponding to a matching pattern. In the case illustrated in FIG. 46B, in a partial image (first resolution) of which the right side forms an edge and a level difference, each pixel forming the edge and the level difference is replaced with a pixel pattern corresponding to a matching pattern. In the case illustrated in FIG. 46C, in a partial image (first resolution) of which the upper side forms an edge and a level difference, each pixel forming the edge and the level difference is replaced with a pixel pattern corresponding to a matching pattern. In the case illustrated in FIG. 46D, in a partial image (first resolution) of which the lower side forms an edge and a level difference, each pixel forming the edge and the level difference is replaced with a pixel pattern corresponding to a matching pattern. In this way, by associating each pattern used for the pattern matching with a different image pattern as a pixel pattern replacing the target pixel, the intensity of the thinning and the smoothing process can be increased or decreased in the vertical direction and the horizontal direction.

<Flow of Image Processing of High-Resolution Processor>

FIGS. 47A to 47D are diagrams that illustrate an example of the operation of image processing (without inversion) of the high-resolution processor according to the fourth embodiment. FIGS. 48A to 48D are diagrams that illustrate an example of the operation of image processing (with inversion) of the high-resolution processor according to the fourth embodiment. The flow of the whole image processing of the high-resolution processor 351 will be described with reference to FIGS. 47A to 48D.

Figure 47B:
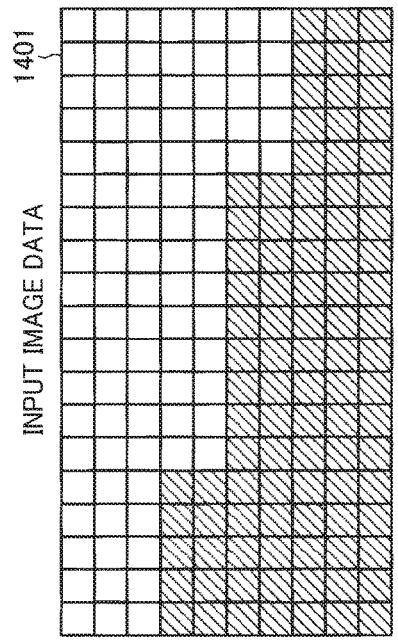
FIGS. 47A to 47D are diagrams that illustrate an example of the operation of image processing (with inversion) of the high-resolution processor according to the fourth embodiment.
Figure 47D:
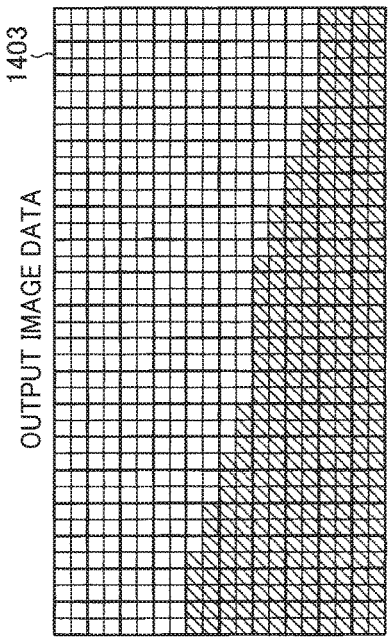

First, the operation performed in a case where an inversion signal is not input from the outside to the input image inverter 500 and the output image inverter 540 of the high-resolution processor 351 will be described with reference to FIGS. 47A to 47D. Since an inversion signal is not input from the outside, the input image inverter 500 of the high-resolution processor 351 does not perform an inversion process for image data 1400 ("input image data" illustrated in FIG. 47A) having the first resolution (2,400 dpi) output from the image processing unit 320 but sends the original image data (image data 1401 illustrated in FIG. 47B) to the thinning processor 520b. Since an inversion process is not performed for the image data 1400, as illustrated in FIG. 47B, in the image data 1401, among pixels of the image data 1400, white pixels having a pixel value of "0" remain to be white pixels, and black pixels having a pixel value of "1" remain to be black pixels.

The thinning processor 520b of the high-resolution processor 351 performs a thinning process for the image data 1401 received from the input image inverter 500. As described above, for a portion of an edge portion of black pixels of the image data 1401 and a level difference, as a result of pattern matching using the second thinning path 533, a resolution converting process, image processing of thinning, and a smoothing process are performed, and the data is converted into image data 1402 ("image data after conversion" illustrated in FIG. 47C) having the second resolution (4,800 dpi). The thinning processor 520b sends the image data 1402 converted from the image data 1401 by the thinning process to the output image inverter 540. In the example illustrated in FIG. 47C, a portion of the edge portion of black pixels and the level difference is removed (converted into white pixels) in units of the second resolution and is thinned and smoothed.

Since an inversion signal is not input from the outside, the output image inverter 540 of the high-resolution processor 351 does not perform an inversion process for the image data 1402 but outputs the original image data (image data 1403 illustrated in FIG. 47D) to the pulse generator 352.

Figure 47A:
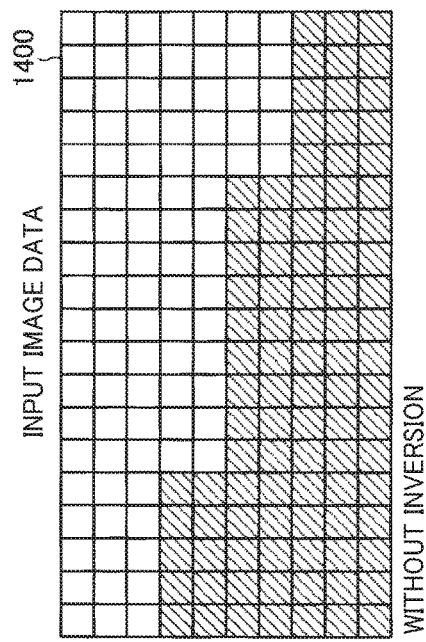
Figure 47C:
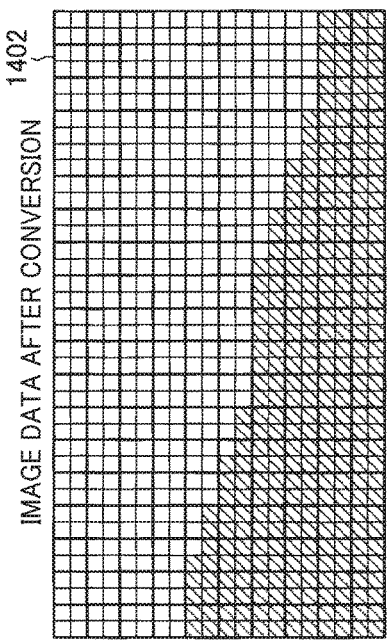

As above, in the high-resolution processor 351, in a case where an inversion signal is not input, only the thinning process of the thinning processor 520b substantially functions, and, comparing the image data 1400 and the image data 1403 with each other, a portion of an edge of a black line, a black character, or the like and a level difference is thinned and smoothed. On the other hand, in a case where an image illustrated in FIG. 47A represents a portion of an edge of a white line, a white character, or the like and a level difference, comparing the image data 1400 and the image data 1403 with each other, an edge portion of a white line, a white character, or the like and a level difference is substantially thickened by the thinning process of the thinning processor 520b and is smoothed.

Figure 48B:
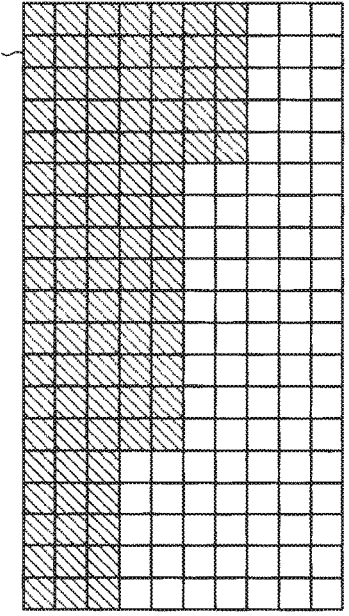
FIGS. 48A to 48D are diagrams that illustrate an example of the operation of image processing (with inversion) of the high-resolution processor according to the fourth embodiment.

Next, the operation performed in a case where an inversion signal is input from the outside to the input image inverter 500 and the output image inverter 540 of the high-resolution processor 351 will be described with reference to FIGS. 48A to 48D. Since the inversion signal is input from the outside, the input image inverter 500 of the high-resolution processor 351 performs an inversion process for image data 1400 ("input image data" illustrated in FIG. 48A) having the first resolution (2,400 dpi) output from the image processing unit 320 and sends the inverted image data 1401a ("input image data (inverted)" illustrated in FIG. 48B) to the thinning processor 520b. In the image data 1401a, as illustrated in FIG. 48B, among pixels of the image data 1400, white pixels having a pixel value of "0" are inverted into black pixels, and black pixels having a pixel value of "1" are inverted into white pixels.

The thinning processor 520b of the high-resolution processor 351 performs a thinning process for the image data 1401a received from the input image inverter 500. As described above, for a portion of an edge of black pixels and a level difference of the image data 1401a, as a result of pattern matching using the second thinning path 533, a resolution converting process is performed, and image processing of thinning and a smoothing process are performed, and accordingly, the portion is converted into image data 1402a ("image data after conversion" illustrated in FIG. 48C) having the second resolution (4,800 dpi). The thinning processor 520b sends the image data 1402a converted from image data 1401a by the thinning process to the output image inverter 540. In the example illustrated in FIG. 48C, a portion of an edge of black pixels, which are white pixels before the inversion process, and a level difference is removed (converted into white pixels) in units of the second resolution and thus is thinned and smoothed.

Figure 48D:
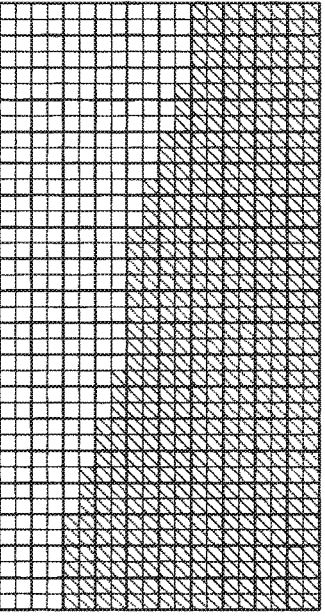

Since an inversion signal is input from the outside, the output image inverter 540 of the high-resolution processor 351 performs an inversion process for the image data 1402a and outputs inverted image data 1403a ("output image data (inverted)" illustrated in FIG. 48D) to the pulse generator 352.

Figure 48A:
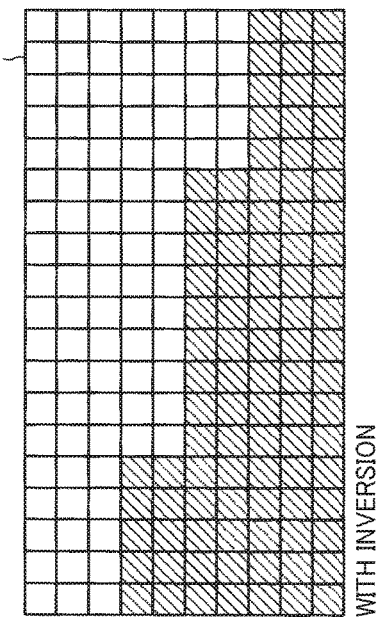
Figure 48C:
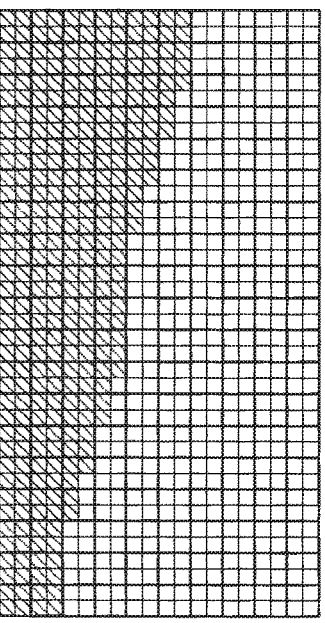

As above, in the high-resolution processor 351, in a case where an inversion signal is input, the inversion processes of the input image inverter 500 and the output image inverter 540 function, and the thinning process of the thinning processor 520 functions. Thus, comparing the image data 1400 and the image data 1403a with each other, as a result, a portion of an edge of a black line, a black character, or the like and a level difference is thickened and smoothed. On the other hand, in a case where the image illustrated in FIG. 48A represents a portion of an edge of a white line, a white character, or the like, and a level difference, comparing the image data 1400 and the image data 1403a with each other, by performing the inversion processes of the input image inverter 500 and the output image inverter 540 and a thinning process of the thinning processor 520, a portion of an edge of a white line, a white character, or the like and a level difference is substantially thinned and smoothed.

As above, in this embodiment, in addition to the thinning processor 520b having the functions of the resolution converting process and a thinning process of performing thinning of an edge portion of a black line, a character, or the like and a smoothing process together, the input image inverter 500 and the output image inverter 540 each having the function of the inversion process are included on the former stage side and the later stage side of the thinning processor 520b. Accordingly, in a case where an inversion signal is not input, a black line, a black character, or the like can be thinned, and a white line, a white character, or the like can be thickened. On the other hand, in a case where an inversion signal is input, a black line, a black character, or the like can be thickened, and a white line, a white character, or the like can be thinned. In addition, in each case, a portion of a level difference can be smoothed. Accordingly, further improvement of reproducibility of thin lines and further improvement of reproducibility of characters can be realized.

In addition, in the second thinning path 533 of the thinning processor 520b, the thinning of an edge portion of a black line, a black character, or the like and the smoothing process are performed together. Accordingly, processes of two stages such as a smoothing process after thinning or thinning after a smoothing process is not necessary, and accordingly, the number of processes of the image processing can be decreased.

In addition, the function of the thinning processor 520b having the function of the thinning process is not changed but is used as it is, and the input image inverter 500 and the output image inverter 540 each having the function of the inversion process are included on the former stage side and the later stage side. Accordingly, an increase in the circuit scale of the thinning processor 520b can be suppressed.

In addition, by controlling the input of an inversion signal to the high-resolution processor 351, switching between thinning or thickening of black lines and thinning or thickening of white lines can be performed, and accordingly, the practical use of the image forming apparatus 1 can be improved.

While the thinning processor 520b, as illustrated in FIG. 42, is configured to include the resolution converting path 531, the first thinning path 532b, and the second thinning path 533, the configuration is not limited thereto. For example, the thinning processor 520b may be configured to include the resolution converting path 531 and the second thinning path 533 (thinning path).

In addition, the second thinning path 533 having the function of the smoothing process in addition to the resolution converting process and the image processing of thinning according to this embodiment may be applied also to the second embodiment and the third embodiment.

In addition, in each of the embodiments described above, in a case where at least any one of the functional units of the light source control apparatus 110 of the image forming apparatus 1 is realized by executing a program, the program may be built in a ROM or the like in advance. Furthermore, a program executed by the image forming apparatus 1 according to each of the embodiments described above may be configured to be provided with being recorded on a computer-readable recording medium such as a compact disc-ROM (CD-ROM), a flexible disk (FD), a compact disk-recordable (CD-R), or a digital versatile disc (DVD) as a file of an installable form or an executable form. In addition, a program executed by the image forming apparatus 1 according to each of the embodiments described above may be configured to be stored on a computer connected to a network such as the Internet and provided by being downloaded through the network. Furthermore, a program executed by the image forming apparatus 1 according to each of the embodiments described above may be configured to be provided or distributed through a network such as the Internet. In addition, a program executed by the image forming apparatus 1 according to each of the embodiments described above has a module configuration including at least one of the functional units described above, and, as actual hardware, a CPU reads a program from the ROM described above and executes the program, each functional unit described above is loaded into a main storage device and is generated.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An image processing apparatus comprising:
first inverter circuitry to output image data having a first resolution, as image data having pixel values that are inverted or image data having unprocessed pixel values, in accordance with an inversion signal;
a processor to
receive the image data output from the first inverter circuitry, convert the received image data from the first resolution to a second resolution, and output a first signal for selection having the second resolution and
receive the image data output from the first inverter circuitry and perform a thinning process of thinning pixels of edge portions of the image data in units of the second resolution, the processor performing the thinning process by
determining whether or not an image matrix having the first resolution matches one of a plurality of patterns and outputting a matching determination result, and
performing a thinning process, upon the output matching determination result indicating that the image matrix matches one of the plurality of patterns, to replace a target pixel of the first resolution in the image matrix with a pixel pattern having the second resolution, and outputting a second signal for selection having the second resolution; and
selecting either the first signal for selection having the second resolution, or the second signal for selection having the second resolution, based upon the matching determination result, and outputting the selected signal; and
a second inverter circuitry to output the image data having the second resolution, based upon the output selected signal, as image data having pixel values that are inverted or image data having unprocessed pixel values, in accordance with the inversion signal.

2. The image processing apparatus of claim 1, wherein, upon determining that the image matrix matches one of the plurality of patterns, selecting and outputting the second signal for selection.

3. The image processing apparatus of claim 1, wherein the target pixel of the image matrix determined to match the one of the plurality of patterns is replaced with the pixel pattern corresponding to the matched one of the plurality of patterns.

4. The image processing apparatus of claim 1,
wherein the determining of whether or not the image matrix matches one of the plurality of patterns includes determining an edge direction of the target pixel of the image matrix, and
wherein an intensity of the thinning process is changed in accordance with the determined edge direction.

5. The image processing apparatus of claim 1,
wherein the image data having the first resolution includes a first pixel value of image information and a second pixel value, representing tag information corresponding to attribute information of the image data, and
wherein the determining whether or not the image matrix having the first resolution matches one of the plurality of patterns including the first pixel value and the second pixel value.

6. The image processing apparatus of claim 5,
wherein the first inverter circuitry is configured to invert the first pixel value out of pixel values of a pixel of the image data having the first resolution and is configured not to invert the second pixel value upon the inversion signal being valid, and
wherein the second inverter circuitry is configured to invert the first pixel value out of pixel values of a pixel of the image data having the second resolution and is configured not to invert the second pixel value upon the inversion signal being valid.

7. The image processing apparatus of claim 5,
wherein the target pixel, having the first resolution, of the image matrix determined to match one of the plurality of patterns is replaced with the pixel pattern including the first pixel value and the second pixel value.

8. A drive control apparatus comprising:
the image processing apparatus of claim 1;
a pulse generator to generate a modulated pulse signal, from the image data including the second resolution and output from the image processing apparatus, to control turning on and off of a light source;
an application current setter configured to set a value of a current to flow through the light source; and
a light source driver to drive the light source in accordance with the modulated pulse signal generated by the pulse generator and a set value of the current set by the application current setter.

9. The drive control apparatus of claim 8, wherein the image processing apparatus, the pulse generator, the application current setter, and the light source driver are included in a single integrated device.

10. A light source control apparatus comprising:
an interface to acquire image data having first resolution;
a processor to perform image processing on the image data having the first resolution acquired by the interface; and
the drive control apparatus of claim 8 to receive the image data having the first resolution, subjected to the image processing by the processor.

11. An image forming apparatus comprising:
the light source to emit light;
the light source control apparatus of claim 10 to control driving of the light source; and
a latent image forming device to irradiate a photoconductor with the light emitted by the light source to form a latent image on the photoconductor corresponding to the image data having the second resolution.

12. An image processing apparatus, comprising:
a first inverter circuitry to output image data having a first resolution, as image data having pixel values that are inverted or image data having unprocessed pixel values, in accordance with an inversion signal;
a processor to
receive the image data output from the first inverter circuitry, convert the received image data from the first resolution to a second resolution, and output a first signal for selection having the second resolution, and
receive the image data output from the first inverter circuitry and perform a thinning and smoothing process of thinning pixels of edge portions of the image data in units of the second resolution, the processor performing the thinning and smoothing process by determining whether or not an image matrix having the first resolution matches one of a plurality of patterns and outputting a matching determination result, performing, upon the matching determination result indicating that the image matrix matches one of the plurality of patterns, the thinning process and performing a smoothing process to replace a target pixel of the first resolution in the image matrix with a pixel pattern having the second resolution, and outputting a second signal for selection having the second resolution, and selecting and outputting either the first signal for selection having the second resolution or the second signal for selection having the second resolution, based upon the matching determination result; and a second inverter circuitry to output the image data having the second resolution, subsequent to the thinning process, as image data having pixel values that are inverted or image data having unprocessed pixel values, in accordance with the inversion signal.

13. An image processing apparatus comprising:

means for outputting binary image data having a first resolution, as image data having pixel values that are inverted or image data having unprocessed pixel values, in accordance with an inversion signal;

means for converting the output image data from the first resolution to a second resolution and outputting a first signal for selection having the second resolution and for performing a thinning process of thinning pixels of edge portions of the image data having the second resolution in units of the second resolution, the means for converting the output image data and for performing a thinning process including means for determining whether or not an image matrix having the first resolution matches one of a plurality of patterns and outputting a matching determination result, and means for performing a thinning process, upon the output matching determination result indicating that the image matrix matches one of the plurality of patterns, to replace a target pixel of the first resolution in the image matrix with a pixel pattern having the second resolution, and outputting a second signal for selection having the second resolution; and means for selecting either the first signal for selection having the second resolution, or the second signal for selection having the second resolution, based upon the matching determination result, and for outputting the selected signal; and means for outputting the image data having the second resolution, based upon the output selected signal, as image data having pixel values that are inverted or image data having unprocessed pixel values, in accordance with the inversion signal.

14. The image processing apparatus of claim 13, wherein the means for performing a thinning process is for replacing the target pixel of the image matrix determined to match the one of the plurality of patterns with the pixel pattern corresponding to the matched one of the plurality of patterns.

15. The image processing apparatus of claim 13, wherein the means for determining is for determining whether or not the image matrix matches one of the plurality of patterns to determine an edge direction of the target pixel of the image matrix, and wherein the means for performing a thinning process is for changing an intensity of the thinning process in accordance with the determined edge direction.

16. A drive control apparatus comprising:

the image processing apparatus of claim 13;

a pulse generator to generate a modulated pulse signal, from the image data including the second resolution and output from the image processing apparatus, to control turning on and off of a light source;

an application current setter configured to set a value of a current to flow through the light source; and a light source driver to drive the light source in accordance with the modulated pulse signal generated by the pulse generator and a set value of the current set by the application current setter.

17. A light source control apparatus comprising:

an interface to acquire image data having first resolution;

a processor to perform image processing on the image data having the first resolution acquired by the interface; and the drive control apparatus of claim 16 to receive the image data having the first resolution, subjected to the image processing by the processor.

18. An image processing method comprising:

outputting binary image data, from first inverter circuitry, having a first resolution, as image data having pixel values that are inverted or image data having unprocessed pixel values, in accordance with an inversion signal;

receiving the image data output from the first inverter circuitry, converting the received image data from the first resolution to a second resolution, and outputting a first signal for selection having the second resolution;

receiving the image data output from the first inverter circuitry and performing a thinning process of thinning pixels of edge portions of the image data in units of the second resolution, the thinning process including determining whether or not an image matrix having the first resolution matches one of a plurality of patterns and outputting a matching determination result, performing, upon the matching determination result indicating that the image matrix matches one of the plurality of patterns, the thinning process and performing a smoothing process to replace a target pixel of the first resolution in the image matrix with a pixel pattern having the second resolution, and outputting a second signal for selection having the second resolution, and selecting either the first signal for selection having the second resolution or the second signal for selection having the second resolution, based upon the matching determination result, and outputting the selected signal; and outputting, from second inverter circuitry, the image data having the second resolution based upon the output selected signal, as image data having pixel values that are inverted or image data having unprocessed pixel values, in accordance with the inversion signal.

19. The image processing method of claim 18, wherein the performing of the thinning process includes replacing the target pixel of the image matrix determined to match the one of the plurality of patterns with the pixel pattern corresponding to the matched one of the plurality of patterns.

20. The image processing method of claim 18,
wherein the determining includes determining whether or not the image matrix matches one of the plurality of patterns to determine an edge direction of the target pixel of the image matrix, and
wherein the performing includes changing an intensity of the thinning process in accordance with the determined edge direction.

\* \* \* \* \*